(12) United States Patent
Nishizeki et al.

(10) Patent No.: US 7,390,840 B2
(45) Date of Patent: Jun. 24, 2008

(54) ACTIVE RAY CURABLE COMPOSITION, ACTIVE RAY CURABLE INK, IMAGE FORMING METHOD AND INKJET RECORDING APPARATUS UTILIZING THE SAME

(75) Inventors: Masato Nishizeki, Hachioji (JP); Norio Miura, Sagamihara (JP); Kimihiko Ookubo, Hachioji (JP); Takeshi Kurata, Tama (JP)

(73) Assignee: Konica Minolta Medical & Graphic, Inc. (JP)

( * ) Notice: Subject to any disclaimer, the term of this patent is extended or adjusted under 35 U.S.C. 154(b) by 289 days.

(21) Appl. No.: 11/077,490

(22) Filed: Mar. 10, 2005

(65) Prior Publication Data

US 2005/0215657 A1    Sep. 29, 2005

(30) Foreign Application Priority Data

Mar. 23, 2004 (JP) ............................. 2004-084654
Dec. 17, 2004 (JP) ............................. 2004-365747

(51) Int. Cl.
*C08F 2/46* (2006.01)
*C08J 3/28* (2006.01)

(52) U.S. Cl. .................. 522/168; 522/170; 522/178; 522/181; 106/31.13; 428/32.1; 428/32.26; 427/492; 427/508; 427/510; 427/511

(58) Field of Classification Search .............. 522/167, 522/168, 169, 170, 178, 181; 106/31.13; 428/32.26, 32.1; 427/492, 508, 510, 511
See application file for complete search history.

(56) References Cited

U.S. PATENT DOCUMENTS

| 6,232,361 | B1 * | 5/2001 | Laksin et al. ............... 522/84 |
| 6,844,130 | B2 * | 1/2005 | Nishikubo et al. .......... 430/258 |
| 7,169,446 | B2 * | 1/2007 | Nishizeki et al. ........... 427/466 |
| 2004/0252171 | A1 * | 12/2004 | Nishizeki et al. ........... 347/100 |

* cited by examiner

*Primary Examiner*—Sanza L. McClendon
(74) *Attorney, Agent, or Firm*—Lucas & Mercanti, LLP

(57) ABSTRACT

An active ray curable composition, including an epoxy compound which is represented by Formula (A) and an oxetane compound, The active ray curable compound exhibiting a viscosity of 1 to 500 mPa·s at 25° C.:

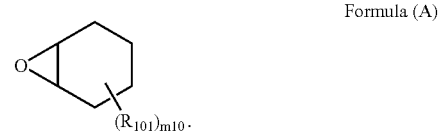

Formula (A)

20 Claims, 2 Drawing Sheets

ACTIVE RAY CURABLE COMPOSITION, ACTIVE RAY CURABLE INK, IMAGE FORMING METHOD AND INKJET RECORDING APPARATUS UTILIZING THE SAME

FIELD OF THE INVENTION

The present invention relates to an active ray curable composition, and particularly to an active ray curable composition which exhibits a low viscosity and cures at a high sensitivity, as well as forming a coated layer exhibiting excellent adhesion, hardness and flexibility, and an active ray curable ink, an image forming method and an inkjet recording apparatus utilizing the same.

BACKGROUND OF THE INVENTION

Previously, curable compositions, cured by active energy rays such as ultraviolet rays and electron rays or by heat, have been applied in practice for various applications of such as paint for plastic, paper, woodwork and inorganic materials; adhesives, printing ink, printed circuit boards and electrical insulation. In recent years, desired have been further improvements of weather-proofing and adhesion, of printing ink, paint and adhesives among them. Further, there is an ultraviolet ray curable inkjet ink which cures by ultraviolet rays as inkjet ink employing these active ray curable compositions. An inkjet recording method employing the ultraviolet curable ink has become noted these recent years with respect to relatively low odor, rapid drying and the capability of recording on a recording medium exhibiting no ink absorbability, and disclosed is such an ultraviolet curable inkjet ink (for example, please refer to patent documents 1 and 2). In this application, inkjet ink is required to have a low viscosity and to form a stronger and more flexible layer. Provision of plasticity by addition of a plastisizer in inkjet ink is disclosed (for example, please refer to patent document 3). However, these plasticizers are for fusing type ink and there is no description for ultraviolet curable inkjet ink.

Further, when utilizing such ink, a problem is that the curing sensitivity tending to vary depending on the type of recording materials and printing environment.

Since ink utilizing a radical polymerizing compound exhibits an oxygen inhibition effect, curing is inhibited and is especially caused when an ink liquid drop quantity is low. Further, ink utilizing a cationic polymerizing compound (for example, refer to patent documents 4-7) exhibits no oxygen inhibition effect, however, it is easily affected by water content (humidity) at the molecular level.

Patent document 1: JP-A 6-200204 (hereinafter, JP-A refers to Unexamined Japanese Patent Application Publication)
Patent document 2: Japanese Translated PCT Patent Publication 2000-504778
Patent-document 3: JP-A 8-3493
Patent document 4: JP-A 2001-220526
Patent document 5: JP-A 2002-188025
Patent document 6: JP-A 2002-317139
Patent document 7: JP-A 2003-55449

SUMMARY OF THE INVENTION

This invention has been made in view of the above problems.

An object of the present invention is to provide active ray curable composition which has a low viscosity and a high sensitivity, being capable of forming a coated layer provided with high hardness as well as flexibility under various printing environment, particularly, under high humidity; an active ray curable ink, an image forming method and an inkjet recording apparatus, employing the same.

Specifically, this active ray curable ink contains a specific compound having an oxetane ring and an epoxy compound having an oxirane ring in the molecule.

DETAILED DESCRIPTION OF THE INVENTION

Figure 1:
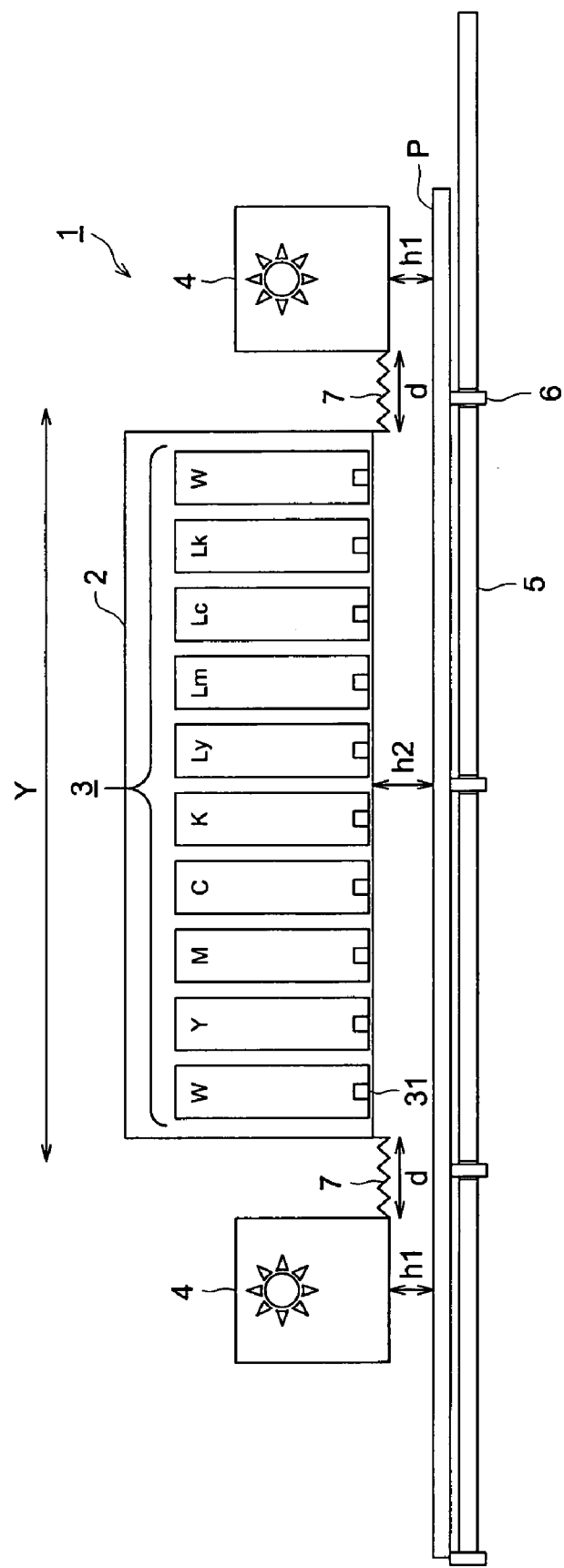
FIG. 1 is a front view drawing showing a primary portion of a recording apparatus of this invention.

The above objects of this invention can be achieved by the following constitutions.

Item 1. An active ray curable composition, comprising an epoxy compound represented by Formula (A) and an oxetane compound, the active ray curable composition exhibiting a viscosity of 1-500 mPa·s at 25° C.:

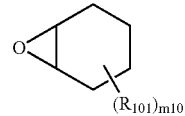

Formula (A)

wherein, $R_{101}$ is a substituent containing polymerizing group with a cation or a radical, and m10 is an integer of 1-4.

Item 2. The active ray curable composition of Item 1 above, wherein the oxetane compound is unsaturated at the 2-position of an oxetane ring.

Item 3. The active ray curable composition of Item 1 above, further comprising an epoxy compound represented by Formula (B):

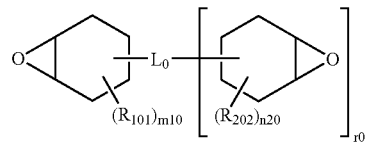

Formula (B)

wherein, $R_{201}$ and $R_{202}$ each are a substituent, and m20 and n20 each are an integer of 0-2, r0 is an integer of 1-3, and $L_0$ is a single bond or a linking group having 1-15 carbon atoms and a valency of r0+1, provided that the linking group may contain an oxygen atom or a sulfur atom in the main chain.

Item 4. The active ray curable composition of any one of Items 1-3, wherein the epoxy compound represented by Formula (A) is a compound represented by Formula (A-I):

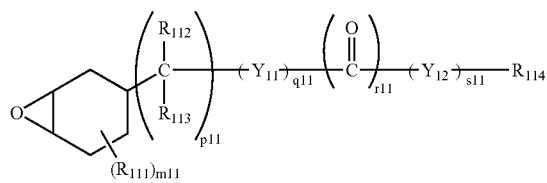

Formula (A-I)

wherein, $R_{111}$ is a substituent, m11 is an integer of 0-3, $R_{112}$, $R_{113}$ and $R_{114}$ each are independently a hydrogen atom, a substituted or unsubstituted alkyl group, $Y_{11}$ and $Y_{12}$ each are independently O or S, p11 is an integer of 0-2, q11 is an integer of 0 or 1, r11 is an integer of 0 or 1, and s11 is an integer of 0 or 1.

Item 5. The active ray curable composition of any one of Items 1-3, wherein the epoxy compound represented by Formula (A) is a compound represented by Formula (A-II):

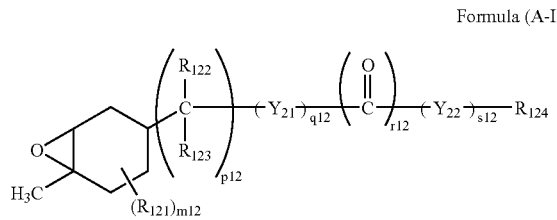

Formula (A-II)

wherein, $R_{121}$ is a substituent, m12 is an integer of 0-2, $R_{122}$, $R_{123}$ and $R_{124}$ each are independently a hydrogen atom or a substituted or unsubstituted alkyl group, $Y_{21}$ and $Y_{22}$ each are independently O or S, p12 is an integer of 0-2, q12, r12 and s12 each are an integer of 0 or 1.

Item 6. The active ray curable composition of any one of Items 1-3, wherein the epoxy compound represented by Formula (A) is a compound represented by Formula (A-III), (A-IV) or (A-V):

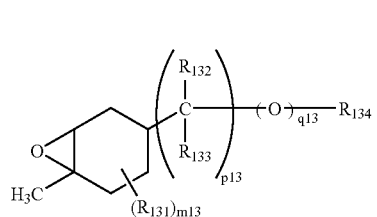

Formula (A-III)

wherein, $R_{131}$ is a substituent, m13 is an integer of 0-2, $R_{132}$, $R_{133}$ and $R_{134}$ each are independently a hydrogen atom, or a substituted or unsubstituted alkyl group, p13 is an integer of 0-2, and q13 is an integer of 0 or 1;

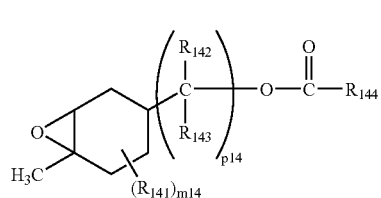

Formula (A-IV)

wherein, $R_{141}$ is a substituent, and m14 is an integer of 0-2, $R_{142}$, $R_{143}$ and $R_{144}$ each are independently a hydrogen atom, or a substituted or unsubstituted alkyl group, and p14 is an integer of 0-2; or

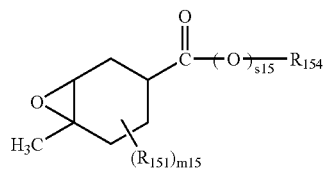

Formula (A-V)

wherein, $R_{151}$ is a substituent, and m15 is an integer of 0-2, $R_{154}$ is a hydrogen atom, or a substituted or unsubstituted alkyl group, s15 is 0 or 1.

Item 7. The active ray curable composition of any one of Items 1-3, wherein the epoxy compound represented by Formula (A) is a compound represented by Formula (A-VI):

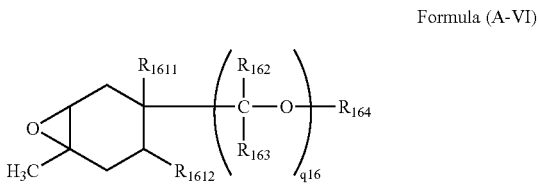

Formula (A-VI)

wherein, $R_{1611}$ and $R_{1612}$ each are independently a hydrogen atom or an alkyl group having 1-6 carbon atoms, $R_{162}$, $R_{163}$ and $R_{164}$ each are independently a hydrogen atom, or a substituted or unsubstituted alkyl group, q16 is an integer of 0 or 1.

Item 8. The active ray curable composition of any one of Items 3-7, wherein the epoxy compound represented by Formula (B) is a compound represented by Formula (B-I) or (B-II):

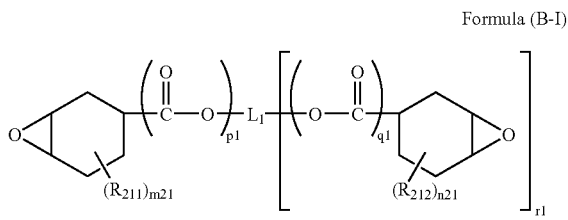

Formula (B-I)

wherein, $R_{211}$ and $R_{212}$ each are a substituent, m21 and n21 each are an integer of 0-2, p21 and q21 each are an integer of 0 or 1, r1 is an integer of 1-3, and $L_1$ is a single bond or a linking group having 1-15 carbon atoms and a valency of r1+1, provided that the linking group may contain an oxygen atom or a sulfur atom in the main chain; or

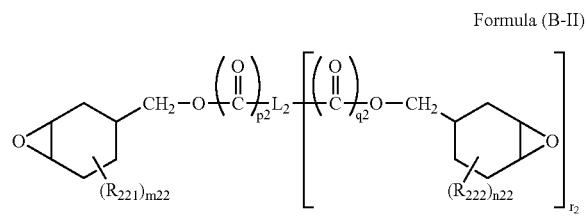

Formula (B-II)

wherein, $R_{221}$ and $R_{222}$ each are a substituent, m22 and n22 each are an integer of 0-2, p22 and q22 each are an integer of 0 or 1, r2 is an integer of 1-3, and $L_2$ is a single bond or a linking group having 1-15 carbon atoms and a valency of r2+1, provided that the linking-group may contain an oxygen atom or a sulfur atom in the main chain.

Item 9. The active ray curable composition of any one of Items 3-7, wherein the epoxy compound represented by Formula (B) is a compound represented by Formula (B-III) or (B-IV):

Formula (B-III)

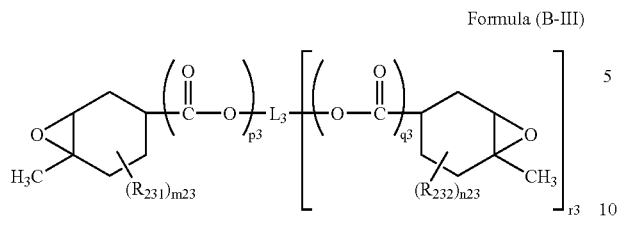

wherein, $R_{231}$ and $R_{232}$ each are a substituent, m23 and n23 each are an integer of 0 or 1, p23 and q23 each are an integer of 0 or 1, r3 is an integer of 1-3, and $L_3$ is a single bond or a linking group having 1-15 carbon atoms and a valency of r3+1, provided that the linking group may contain an oxygen atom or a sulfur atom in the main chain;

Formula (B-IV)

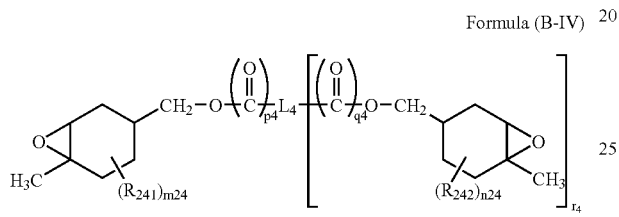

wherein, $R_{241}$ and $R_{242}$ each are a substituent, m24 and n24 each are an integer of 0-1, p24 and q24 each are an integer of 0-1, r4 is an integer of 1-3, and $L_4$ is a single bond or a linking group having 1-15 carbon atoms and a valency of r4+1, provided that the linking group may contain an oxygen atom or a sulfur atom in the main chain.

Item 10. The active ray curable composition of any one of Items 2-9, wherein the oxetane compound which is unsubstituted at the 2-position of the oxetane ring is a poly-functional oxetane compound provided with at least two oxetane rings.

Item 11. The active ray curable composition of any one of Items 1-10, wherein the active ray curable composition comprises a compound which generates an acid by irradiation of active rays.

Item 12. The active ray curable composition of Item 11, wherein the compound which generates an acid by irradiation of active rays is an onium salt compound.

Item 13. The active ray curable composition of Item 11, wherein the compound which generates an acid by irradiation of active rays is a sulfonium salt compound.

Item 14. The active ray curable composition of Item 13, wherein the sulfonium compound is a sulfonium salt compound represented by Formula (I-1), (I-2) or (I-3):

Formula (I-1)

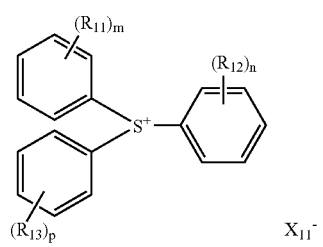

wherein, $R_{11}$, $R_{12}$ and $R_{13}$ each are a substituent, m, n and p each are an integer of 0-2, and $X_{11}^-$ is a counter ion;

Formula (I-2)

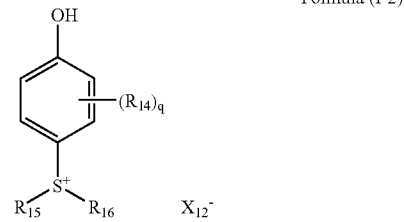

wherein, $R_{14}$ is a substituent, q is an integer of 0-2, $R_{15}$ and $R_{16}$ each are a substituted or unsubstituted alkyl group, a substituted or unsubstituted alkenyl group, a substituted or unsubstituted alkinyl group, or a substituted or unsubstituted aryl group, and $X_{12}^-$ is a counter ion; or Formula (I-3)

wherein, $R_{17}$ is a substituent, r is an integer of 0-3, $R_{18}$ is a hydrogen atom, or a substituted or unsubstituted alkyl group, $R_{19}$ and $R_{19}$ each are a substituted or unsubstituted alkyl group, a substituted or unsubstituted alkenyl group, a substituted or unsubstituted alkinyl group or a substituted or unsubstituted aryl group, and $X_{13}^-$ is a counter ion.

Item 15. An active ray curable ink comprising the active ray curable composition of any one of Items 1-14.

Item 16. The active ray curable ink of Item 15, having a viscosity of 7-40 mPa·s at 25° C.

Item 17. The active ray curable ink of Item 15 or 16, further comprising a pigment.

Item 18. A method of forming an image, comprising the steps of:

ejecting the active ray curable ink of any one of Items 15-17 from an inkjet recording head onto a recording material; and irradiating the ejected droplets of the ink with active rays, wherein the irradiating step is carried out between 0.01 and 2.0 seconds after the ejected droplets of the ink reached on the recording material.

Item 19. The method of forming an image, comprising the steps of:

ejecting the active ray curable ink of any one of Items 15-17 from an inkjet recording head onto a recording material; and irradiating the ejected droplets of the ink with active rays, wherein a minimum ink droplet volume ejected from each nozzle of the inkjet recording head is 2-15 pl.

Item 20. An inkjet recording apparatus which is employed for the method of forming an image of Item 18 or 19, wherein ink is ejected after the active ray curable ink and the recording head have been heated within the range of 35-100° C.

Item 21. The inkjet recording apparatus which is employed for the method of forming an image of Item 18 or 19, wherein the ink is ejected onto the recording material which is heated within the range of 35-60° C.

The inventors, as a result of extensive study in view of the above problem, have found that a strong and flexible cured layer can be formed to provide a high quality image not being affected by environmental humidity even with a light source of low illuminance, in the case of utilizing an active ray curable composition containing both of an alicyclic epoxy compound, which is provided with no reactive functional groups of cationic polymerizing or radial polymerizing other than one oxirane ring in the molecule, and an oxetane compound, which led to this invention.

The alicyclic epoxy compound, which is provided with no reactive functional groups other than one oxirane ring in the molecule, provides the generated polymer structure with moderate flexibility by an oxirane ring in the molecule being incorporated in a curing reaction as well as leaves no low molecular weight compounds in a cured layer after the curing reaction because of having a non-reactive substituent. In the case of adding a plasticizer into the active ray curable composition, it is difficult to provide a cured layer with sufficient flexibility because a plenty amount of plasticizer cannot be added due to a problem of such as bleeding of a plasticizer on the cured composition layer surface which is caused by migration of a plasticizer, which is not incorporated into a curing reaction, in the layer. In the case of utilizing an epoxy compound of this invention in combination with an oxetane compound, a strong and flexible cured layer can be formed.

Higher sensitive active ray curable composition can be prepared and the hardness of a formed cured layer can be enhanced, by utilizing a compound of poly-functional not less than bi-functional as an oxetane compound of this invention.

In the active ray curable composition of this invention, it is possible to improve more preferably the reactivity and to enhance the strength of a cured layer by further incorporating a bi-functional alicyclic epoxy compound as a cationic polymerizing compound which is utilized together with a mono-functional epoxy compound and an oxetane compound. When employing the active ray curable composition of this invention as an active ray curable ink, a high quality image can be obtained, which satisfies various properties described above.

This invention has been able to provide active ray curable composition which has a low viscosity and a high sensitivity as well as forms a highly hard and flexible coated layer under various printing environment, particularly, even under a highly humid circumstance, an active ray curable ink, an image forming method and an inkjet recording apparatus, utilizing the same.

In the following paragraphs, the most preferable embodiment to practice this invention will be described, however, this invention is not limited thereto. The details of this invention are described below.

In foregoing Formula (A), $R_{101}$ is a substituent including no cationic polymerizing or radial polymerizing reactive functional groups. Examples of the substituent include a halogen atom (such as a chlorine atom, a bromine atom or a fluorine atom), an alkyl group having 1-20 carbon atoms (such as a methyl group, an ethyl group, a propyl group, an isopropyl group and a butyl group), a cycloalkyl group having 3-6 carbon atoms (such as a cyclopropyl group, a cyclobutyl group, a cyclopentyl group or a cyclohexyl group), an alkoxy group having 1-20 carbon atoms (such as a methoxy group, an ethoxy group, an n-propoxy group, an iso-propoxy group, an n-butoxy group or a tert-butoxy group), an acyl group having 2-20 carbon atoms (such as an acetyl group, a propionyl group or a trifluoroacetyl group), an acyloxy group having 2-20 carbon atoms (such as an acetoxy group, a propionyloxy group or a trifluoroacetoxy group), an acylthio group having 2-20 carbon atoms (such as an acetylthio group, a propionylthio group or a trifluoroacetylthio group), and an alkoxycarbonyl group having 2-20 carbon atoms (such as a methoxycarbonyl group, an ethoxycarbonyl group or a tert-butoxycarbonyl group). These substituents may be further provided with a substituent. The substituent includes a halogen atom (such as a chlorine atom, a bromine atom and a fluorine atom), an alkoxy group having 1-20 carbon atoms (such as a methoxy group, an ethoxy group, an n-propoxy group, an iso-propoxy group, an n-butoxy group or a tert-butoxy group), an acyl group having 1-20 carbon atoms (such as an acetyl group, a propionyl group or a trifluoroacetyl group), an acyloxy group having 1-20 carbon atoms (such as an acetoxy group, a propionyloxy group or a trifluoroacetoxy group), an alkoxycarbonyl group having 1-20 carbon atoms (such as a methoxycarbonyl group, an ethoxycarbonyl group or a tert-butoxycarbonyl group), an alkylthiocarbonyl group having 1-20 carbon atoms (such as a methylthiocarbonyl group, an ethylthiocarbonyl group or a tert-butylthiocarbonyl group), an aryloxycarbonyl group, an alkylsulfonyl group, an arylsulfonyl group, a cyano group and a nitro group. Preferable substituents are a halogen atom, an alkoxy group, an acyloxy group and an alkoxycarbonyl group.

Specifically preferable alicyclic epoxides are compounds represented by followimg Formula (A-I) with respect to forming a highly hard cured layer and enhancing the adhesion of the cured layer with a substrate.

Formula (A-I)

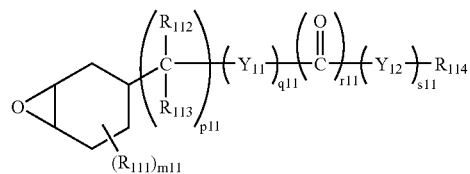

In Formula (A-I), $R_{111}$ is a substituent, m11 is an integer of 0-3, $R_{112}$, $R_{113}$ and $R_{114}$ each are independently a hydrogen atom, or a substituted or unsubstituted alkyl group. $Y_{11}$ and $Y_{12}$ each are independently O or S, p11 is an integer of 0-2, q11, r11 and s11 each are an integer of 0 or 1.

Alicyclic epoxy compounds represented by Formula (A-I) will now be described.

In Formula (A-I), $R_{111}$ is a substituent. Examples of the substituent include a halogen atom (such as a chlorine atom, a bromine atom and a fluorine atom), an alkyl group having 1-20 carbon atoms (such as a methyl group, an ethyl group, a propyl group, an isopropyl group and a butyl group), an alkoxy group having 1-20 carbon atoms (such as a methoxy group, an ethoxy group, an n-propoxy group, an iso-propoxy group, an n-butoxy group and a tert-butoxy group), an acyl group (such as an acetyl group, a propionyl group and a trifluoroacetyl group), an acyloxy group having 1-20 carbon atoms (such as an acetoxy group, a propionyloxy group and a trifluoroacetoxy group), and an alkoxycarbonyl group having 1-20 carbon atoms (such as a methoxycarbonyl group, an ethoxycarbonyl group and a tert-butoxycarbonyl group), an alkylthiocarbonyl group having 2-20 carbon atoms (such as a methylthiocarbonyl group, an ethylthiocarbonyl group and a tert-butylthiocarbonyl group), an aryloxycarbonyl group, an alkylsulfonyl group, an arylsulfonyl group, a cyano group and a nitro group. Preferable substituents are an alkyl group, an alkoxy group and an alkoxycarbonyl group.

$R_{112}$, $R_{113}$ and $R_{114}$ each are a hydrogen atom, or a substituted or unsubstituted alkyl group. Examples of an alkyl group include the groups identical to the examples of alkyl groups of $R_{111}$ described above. Examples of the substituent of an alkyl group provided with a substituent include a halogen atom (such as a chlorine atom, a bromine atom or a fluorine atom), an alkoxy group having 1-20 carbon atoms (such as a methoxy group, an ethoxy group, an n-propoxy group, an iso-propoxy group, an n-butoxy group or a tertbutoxy group), an acyl groups (such as an acetyl group, a propionyl group or a trifluoroacetyl group), an acyloxy group having 1-20 carbon atoms (such as an acetoxy group, a propionyloxy group or a trifluoroacetoxy group), an alkoxycarbonyl group having 1-20 carbon atoms (such as a methoxycarbonyl group, an ethoxycarbonyl group or a tert-butoxycarbonyl group), an alkylthiocarbonyl group having 2-20 carbon atoms (such as a methylthiocarbonyl group, an ethylthiocarbonyl group or a tert-butylthiocarbonyl group), an aryloxycarbonyl group, an alkylsulfonyl group, an arylsulfonyl group, a cyano group and a nitro group. Preferable substituents are an alkoxy group and an alkoxycarbonyl group.

$Y_{11}$ and $Y_{12}$ each are O or S, and preferably O.

m11 is an integer of 0-3, and preferably 1 or 2, p11 is an integer of 0-2, and q11, r11 and s11 each are an integer of 0 or 1.

Specifically preferable alicyclic epoxides are compounds represented by following Formula (A-II), with respect to forming a cured layer which exhibits high hardness and improved adhesion to a substrate.

Formula (A-II)

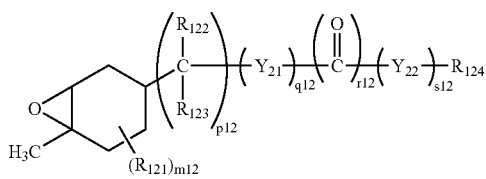

In Formula (A-II), $R_{121}$ is a substituent, m12 is an integer of 0-2, $R_{122}$, $R_{123}$ and $R_{124}$ each are independently a hydrogen atom, and a substituted or unsubstituted alkyl group, $Y_{21}$ and $Y_{22}$ each are independently O or S, p12 is an integer of 0-12, q12, r12 and s12 each are an integer of 0 or 1.

Alicyclic epoxy compounds represented by Formula (A-II) will now be described.

In Formula (A-II), $R_{121}$ is a substituent. Examples of the substituent include a halogen atom (such as a chlorine atom, a bromine atom and a fluorine atom), an alkyl group having 1-20 carbon atoms (such as a methyl group, an ethyl group, a propyl group, an isopropyl group and a butyl group), an alkoxy group having 1-20 carbon atoms (such as a methoxy group, an ethoxy group, an n-propoxy group, an iso-propoxy group, an n-butoxy group and a tert-butoxy group), an acyl group (such as an acetyl group, a propionyl group and a trifluoroacetyl group), an acyloxy group having 1-20 carbon atoms (such as an acetoxy group, a propionyloxy group and a trifluoroacetoxy group), and an alkoxycarbonyl group having 1-20 carbon atoms (such as a methoxycarbonyl group, an ethoxycarbonyl group and a tert-butoxycarbonyl group), an alkylthiocarbonyl group having 2-20 carbon atoms (such as a methylthiocarbonyl group, an ethylthiocarbonyl group and a tert-butylthiocarbonyl group), an aryloxycarbonyl group, an alkylsulfonyl group, an arylsulfonyl group, a cyano group and a nitro group. Preferable substituents are an alkyl group, an alkoxy group and an alkoxycarbonyl group.

$Y_{22}$ is O or S, and preferably O.

m12 is an integer of 0-2, and preferably 0 or 1. p12 is an integer of 0-2, and q12, r12 and s12 each are an integer of 0 or 1.

$R_{122}$, $R_{123}$ and $R_{124}$ each are a hydrogen atom, or a substituted or unsubstituted alkyl group. Examples of an alkyl group include the groups identical to the examples of alkyl groups of $R_{111}$ described above. Examples of the substituent of an alkyl group provided with a substituent include a halogen atom (such as a chlorine atom, a bromine atom or a fluorine atom), an alkoxy group having 1-20 carbon atoms (such as a methoxy group, an ethoxy group, an n-propoxy group, an iso-propoxy group, an n-butoxy group or a tert-butoxy group), an acyl group (such as an acetyl group, a propionyl group or a trifluoroacetyl group), an acyloxy group having 1-20 carbon atoms (such as an acetoxy group, an propionyloxy group or a trifluoroacetoxy group), an alkoxycarbonyl group having 1-20 carbon atoms (such as a methoxycarbonyl group, an ethoxycarbonyl group or a tert-butoxycarbonyl group), an alkylthiocarbonyl group having 2-20 carbon atoms (such as a methylthiocarbonyl group, an ethylthiocarbonyl group or a tert-butylthiocarbonyl group), an aryloxycarbonyl group, an alkylsulfonyl group, an arylsulfonyl group, a cyano group and a nitro group. Preferable substituents are the alkoxy and alkoxycarbonyl groups.

Furthermore preferable alicyclic epoxides are compounds represented by following Formula (A-III), (A-IV) or (A-V), with respect to high curing sensitivity, improved adhesion to a substrate of a cured layer as well as that the curing sensitivity being hardly ever affected by variations of printing environment.

Formula (A-III)

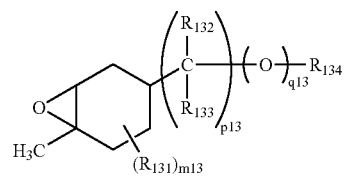

In Formula (A-III), $R_{131}$ is a substituent, m13 is an integer of 0-2, $R_{132}$, $R_{133}$ and $R_{134}$ each are independently a hydrogen atom, a substituted or unsubstituted alkyl group, p13 is an integer of 0-2, and q13 is an integer of 0 or 1.

Formula (A-IV)

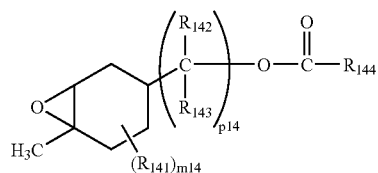

In Formula (A-IV), $R_{141}$ is a substituent, m14 is an integer of 0-2, $R_{142}$, $R_{143}$ and $R_{144}$ each are independently a hydrogen atom or a substituted or unsubstituted alkyl group, and p14 is an integer of 0-2.

Formula (A-V)

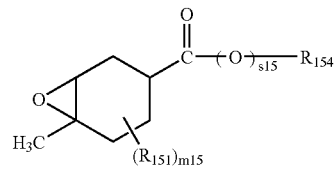

In Formula (A-V), $R_{151}$ is a substituent, m15 is an integer of 0-2, $R_{154}$ is a hydrogen atom, a substituted or unsubstituted alkyl group, and s15 is 0 or 1.

Alicyclic epoxy compounds represented by Formula (A-III), (A-IV) or (A-V) will now be described.

In Formulas (A-III), (A-IV) and (A-V), $R_{131}$, $R_{141}$ and $R_{151}$ each are a substituent. Examples of the substituent include a halogen atom (such as a chlorine atom, a bromine atom and a fluorine atom), an alkyl group having 1-20 carbon atoms (such as a methyl group, an ethyl group, a propyl group, an isopropyl group and a butyl group), an alkoxy group having 1-20 carbon atoms (such as a methoxy group, an ethoxy group, an n-propoxy group, an iso-propoxy group, an n-butoxy group and a tert-butoxy group), an acyl group (such as an acetyl group, a propionyl group and a trifluoroacetyl group), an acyloxy group having 1-20 carbon atoms (such as an acetoxy group, a propionyloxy group and a trifluoroacetoxy group), and an alkoxycarbonyl group having 1-20 carbon atoms (such as a methoxycarbonyl group, an ethoxycarbonyl group and a tert-butoxycarbonyl group), an alkylthiocarbonyl group having 2-20 carbon atoms (such as a methylthiocarbonyl group, an ethylthiocarbonyl group and a tert-butylthiocarbonyl group), an aryloxycarbonyl group, an alkylsulfonyl group, an arylsulfonyl group, a cyano group and a nitro group. Preferable substituents are the alkyl, alkoxy and alkoxycarbonyl groups.

m13, m14 and m15 each are an integer of 0-2, and preferably 0 or 1. p13 and p14 each are an integer of 0-2, and q13 and s15 each are an integer of 0 or 1.

$R_{132}$, $R_{133}$, $R_{134}$, $R_{142}$, $R_{143}$, $R_{144}$ and $R_{154}$ each are a hydrogen atom, or a substituted or unsubstituted alkyl group. Examples of an alkyl group include the groups identical to the examples of alkyl groups of $R_{111}$ described above. Examples of the substituent of an alkyl group provided with a substituent include a halogen atom (such as a chlorine atom, a bromine atom or a fluorine atom), an alkoxy group having 1-20 carbon atoms (such as a methoxy group, an ethoxy group, an n-propoxy group, an iso-propoxy group, an n-butoxy group or a tert-butoxy group), an acyl group (such as an acetyl group, a propionyl group or a trifluoroacetyl group), an acyloxy group having 1-20 carbon atoms (such as an acetoxy group, an propionyloxy group or a trifluoroacetoxy group), an alkoxycarbonyl group having 1-20 carbon atoms (such as a methoxycarbonyl group, an ethoxycarbonyl group or a tert-butoxycarbonyl group), an alkylthiocarbonyl group having 2-20 carbon atoms (such as a methylthiocarbonyl group, an ethylthiocarbonyl group or a tert-butylthiocarbonyl group), an aryloxycarbonyl group, an alkylsulfonyl group, an arylsulfonyl group, a cyano group and a nitro group. Preferable substituents are the alkoxy and alkoxycarbonyl groups.

Specifically preferable alicyclic epoxides are compounds represented by foregoing Formula (A-IV), with respect to high curing sensitivity, improved adhesion to a substrate of a cured layer as well as the curing sensitivity being hardly ever affected by variations of printing environment.

Formula (A-VI)

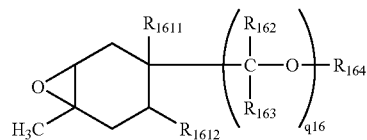

In Formula (A-VI), $R_{1611}$ and $R_{1612}$ each are independently a hydrogen atom, a substituted or unsubstituted alkyl group, $R_{162}$, $R_{163}$ and $R_{164}$ each are independently a hydrogen atom, a substituted or unsubstituted alkyl group, and q16 is an integer of 0 or 1.

Alicyclic epoxy compounds represented by Formula (A-IV) will now be described.

In Formula (A-VI), $R_{1611}$ and $R_{1612}$ each are a hydrogen atom or an alkyl group having 1-6 carbon atoms (such as a methyl group, an ethyl group, a propyl group, an isopropyl group, a butyl group, a sec-butyl group, a t-butyl group, a pentyl group or a hexyl group), and preferable alkyl group includes a methyl group, an ethyl group and a propyl group.

$R_{162}$, $R_{163}$ and $R_{164}$ each are independently a hydrogen atom or a substituted or unsubstituted alkyl group. Examples of an alkyl group include the groups identical to the examples of alkyl groups of $R_{111}$ described above. Examples of the substituent of an alkyl group provided with a substituent include a halogen atom (such as a chlorine atom, a bromine atom and a fluorine atom), an alkoxy group having 1-20 carbon atoms (such as a methoxy group, an ethoxy group, an n-propoxy group, an iso-propoxy group, an n-butoxy group or a tert-butoxy group), an acyl group (such as an acetyl group, a propionyl group or a trifluoroacetyl group), an acyloxy group having 1-20 carbon atoms (such as an acetoxy group, an propionyloxy group or a trifluoroacetoxy group), an alkoxycarbonyl group having 1-20 carbon atoms (such as a methoxycarbonyl group, an ethoxycarbonyl group or a tert-butoxycarbonyl group), an alkylthiocarbonyl group having 2-20 carbon atoms (such as a methylthiocarbonyl group, an ethylthiocarbonyl group or a tert-butylthiocarbonyl group), an aryloxycarbonyl group, an alkylsulfonyl group, an arylsulfonyl group, a cyano group and a nitro group. Preferable substituents are the alkoxy and alkoxycarbonyl groups.

q16 is an integer of 0 or 1.

In the following pages, specific examples of a mono-functional epoxy compound will be shown, however, this invention is not limited thereto.

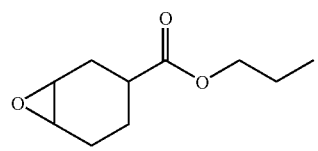

SEP-1

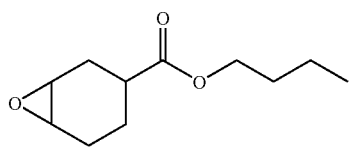

SEP-2

-continued
SEP-3 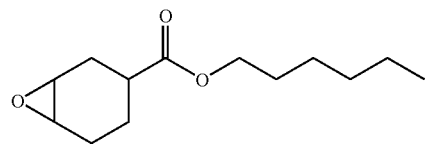
SEP-4 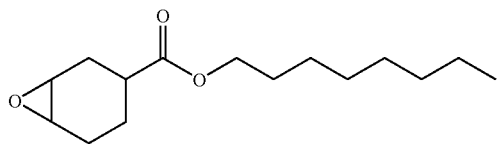
SEP-5 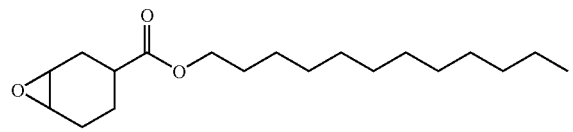
SEP-6 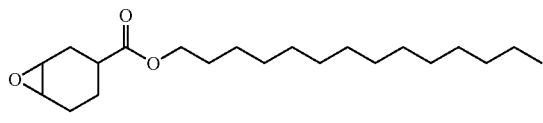
SEP-7 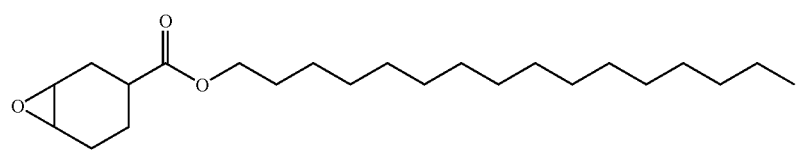
SEP-8 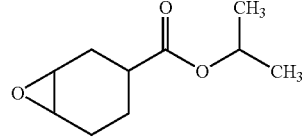
SEP-9 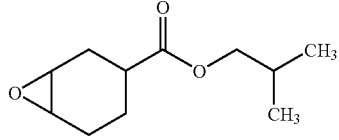
SEP-10 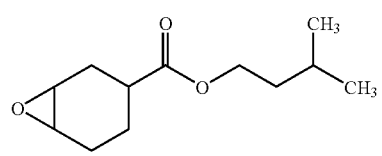
SEP-11 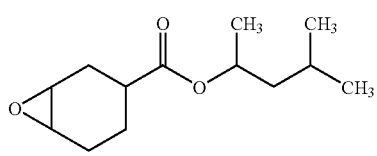
SEP-12 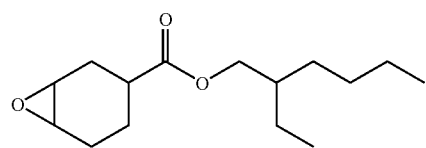
SEP-13 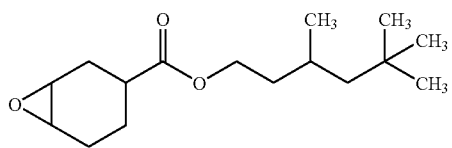
SEP-14 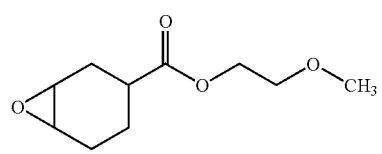
SEP-15 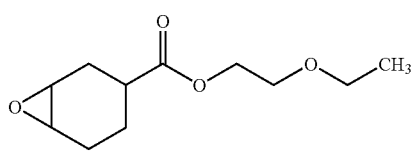
SEP-16 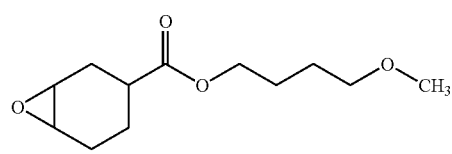
SEP-17 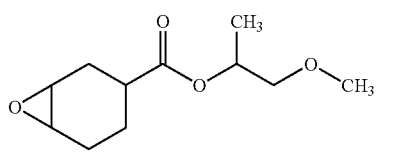
SEP-18 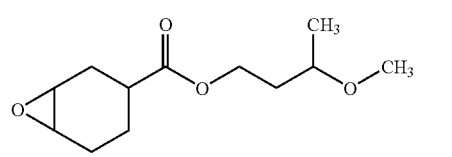
SEP-19 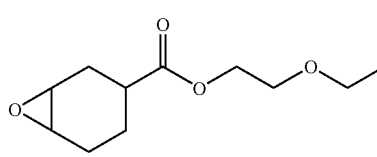
SEP-20 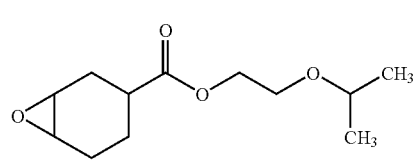
SEP-21 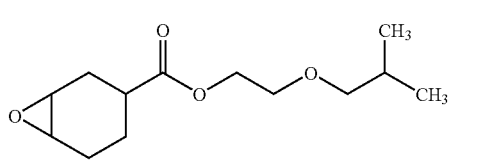

-continued
SEP-22
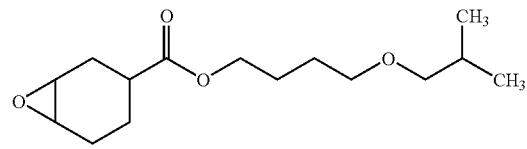
SEP-23
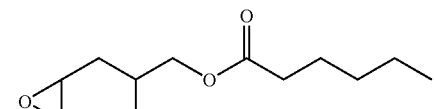
SEP-24
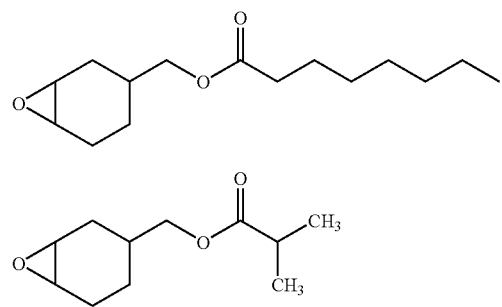
SEP-25
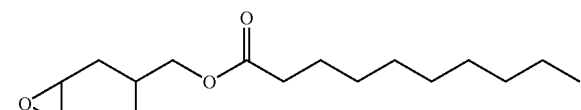
SEP-26
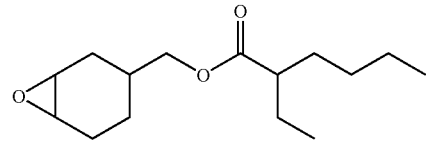
SEP-27
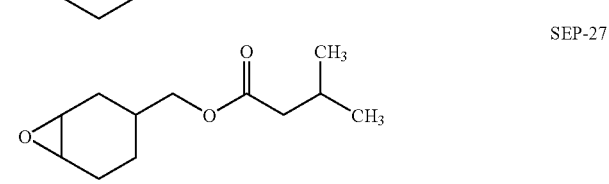
SEP-28
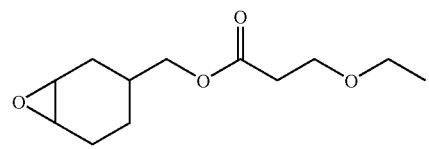
SEP-29
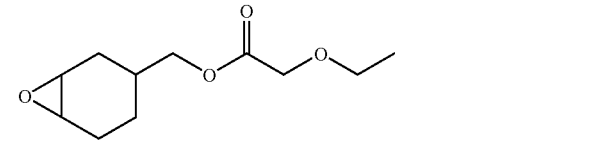
SEP-30
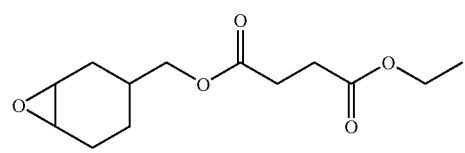
SEP-31
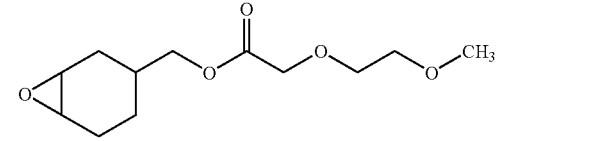
SEP-32
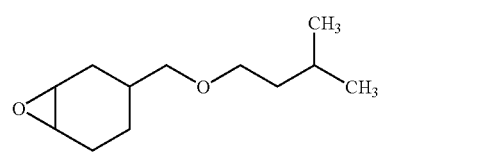
SEP-33
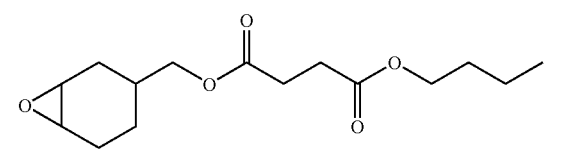
SEP-34
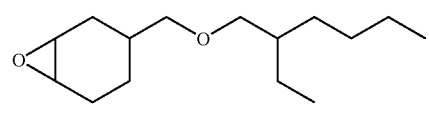
SEP-35
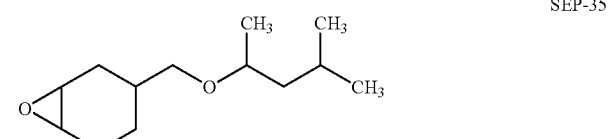
SEP-36
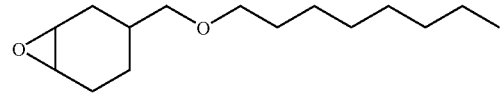
SEP-37
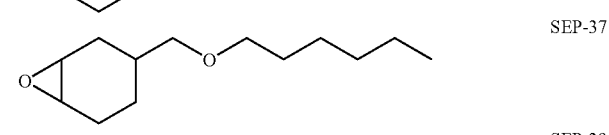
SEP-38
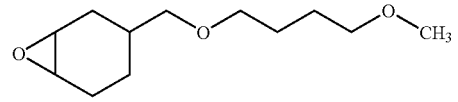
SEP-39
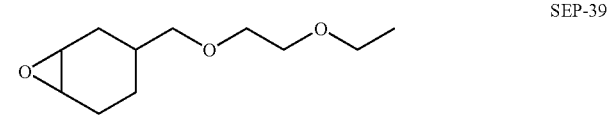
SEP-40
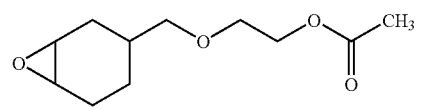
SEP-41
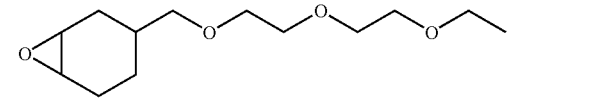
SEP-42
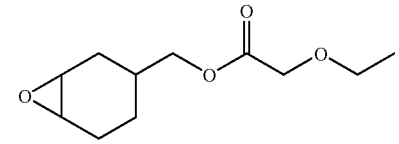
SEP-43
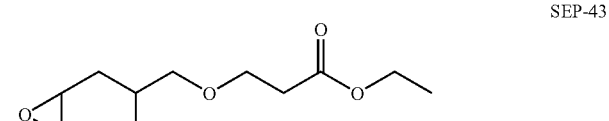

-continued
SEP-44
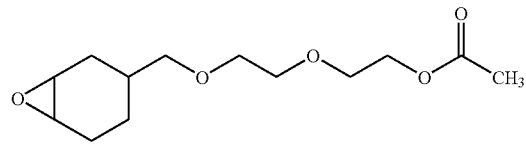
SEP-45
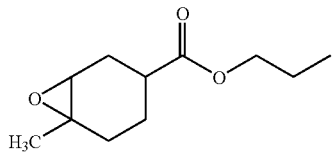
SEP-46
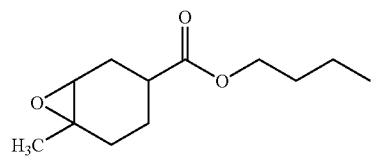
SEP-47
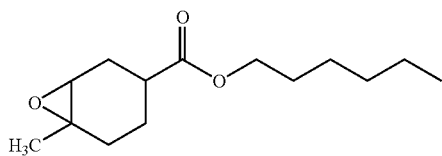
SEP-48
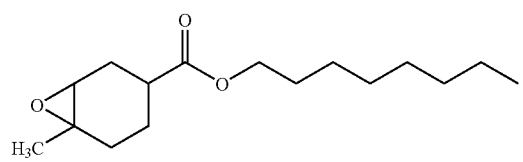
SEP-49
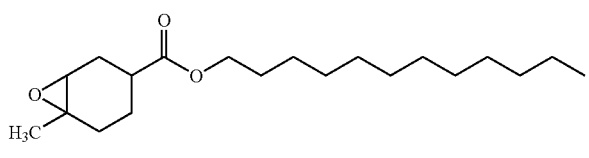
SEP-50
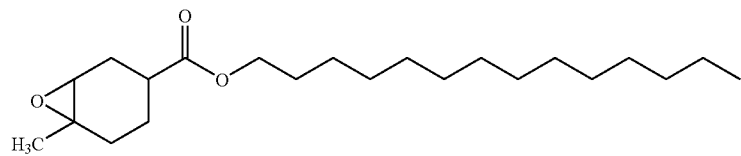
SEP-51
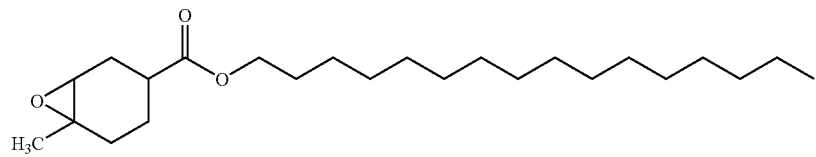
SEP-52
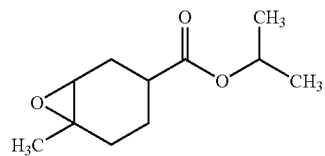
SEP-53
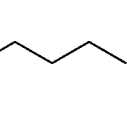
SEP-54
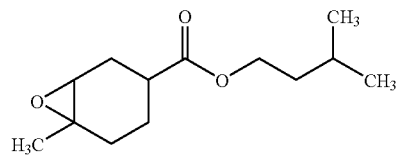
SEP-55
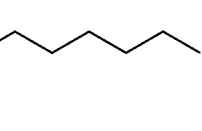
SEP-56
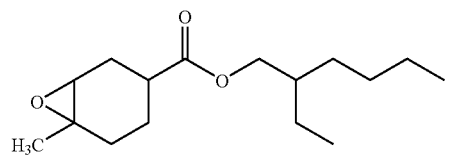
SEP-57
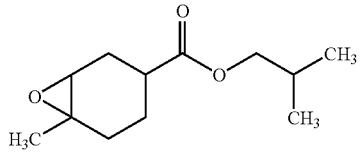
SEP-58
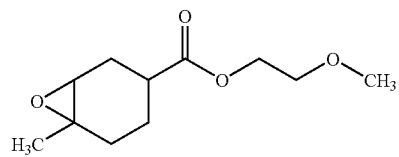
SEP-59
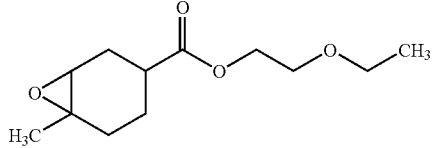

-continued
SEP-60 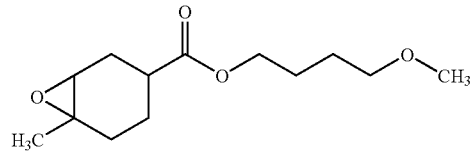 SEP-61 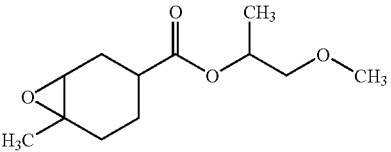
SEP-62 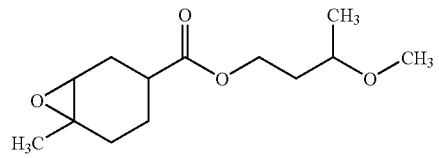 SEP-63 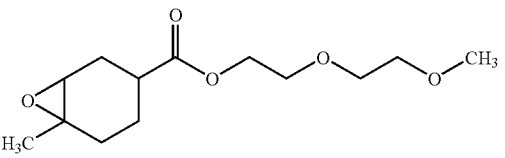
SEP-64 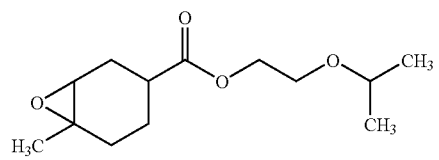 SEP-65 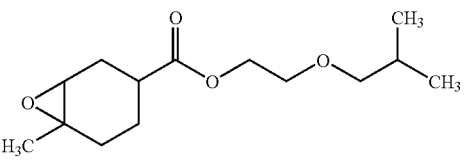
SEP-66 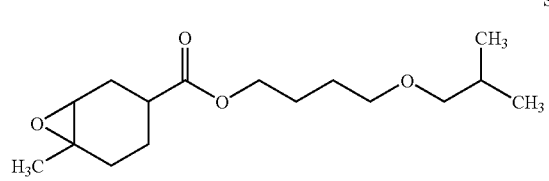 SEP-67 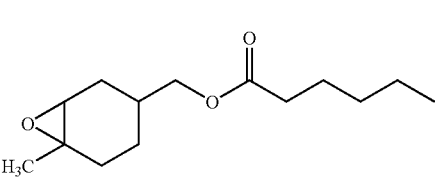
SEP-68 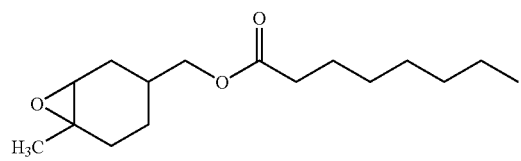 SEP-69 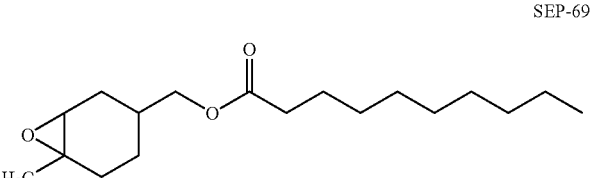
SEP-70 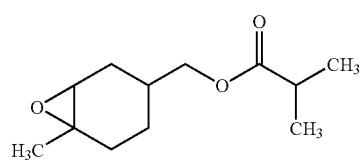 SEP-71 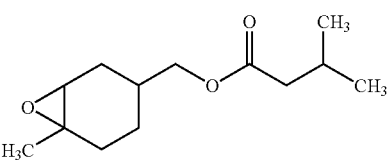
SEP-72 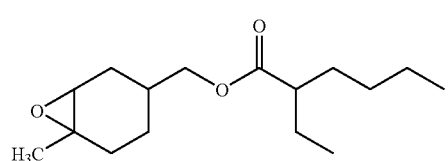 SEP-73 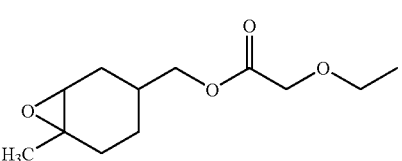
SEP-74 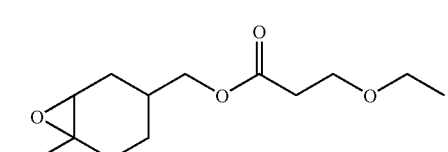 SEP-75 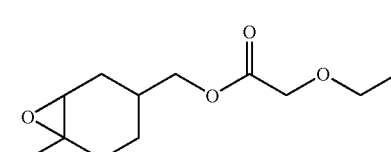
SEP-76 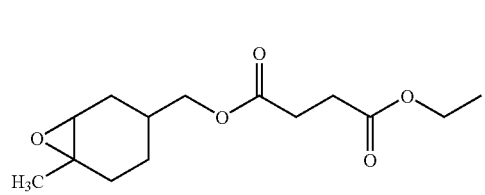 SEP-77 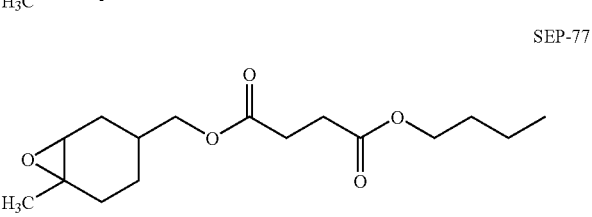

-continued
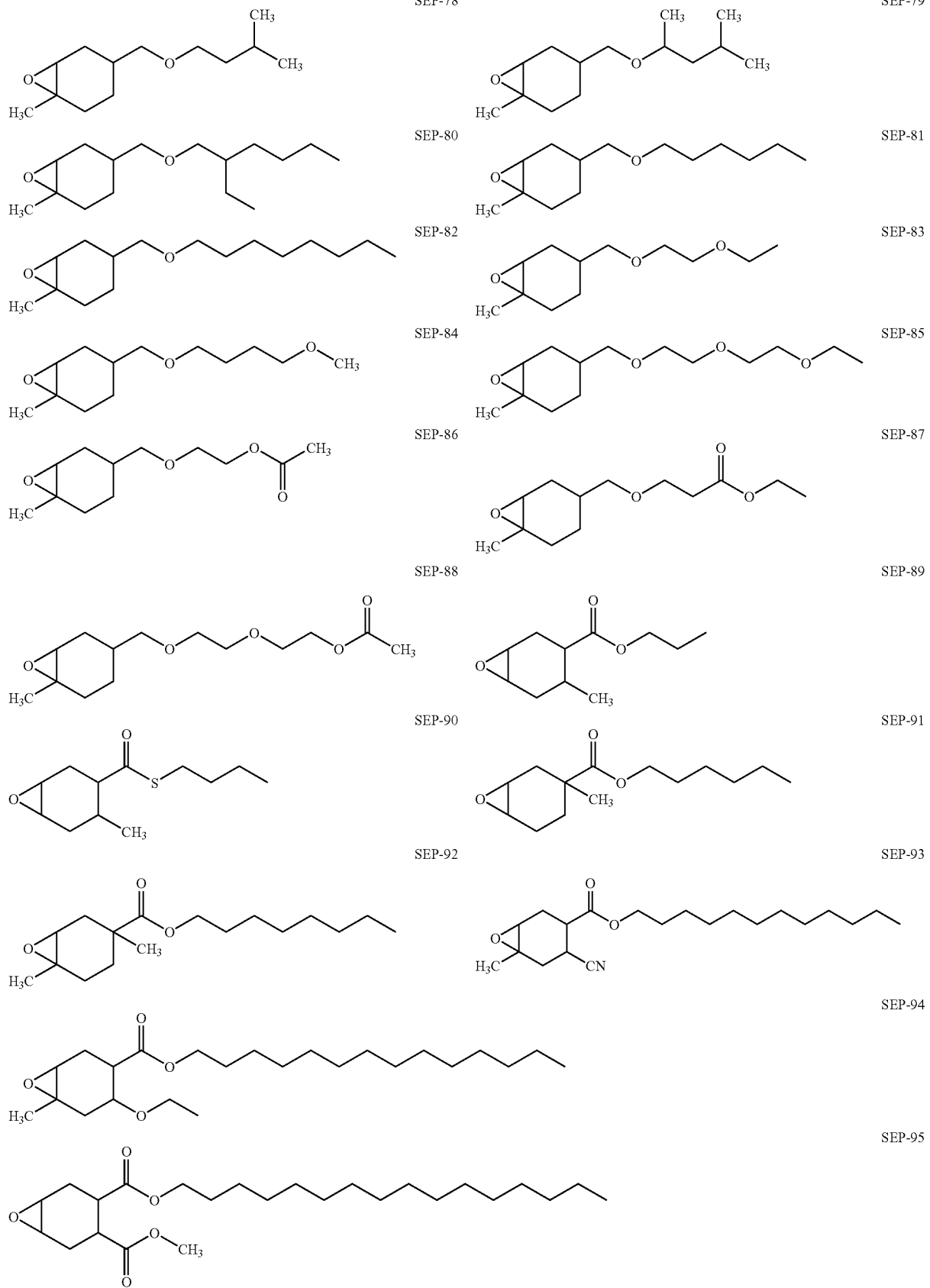

-continued
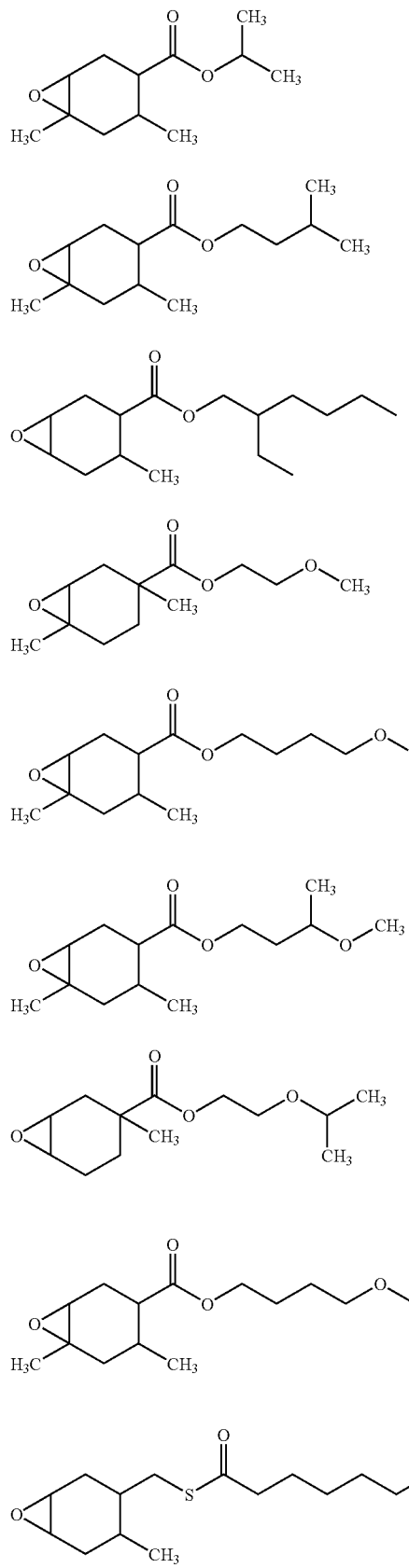
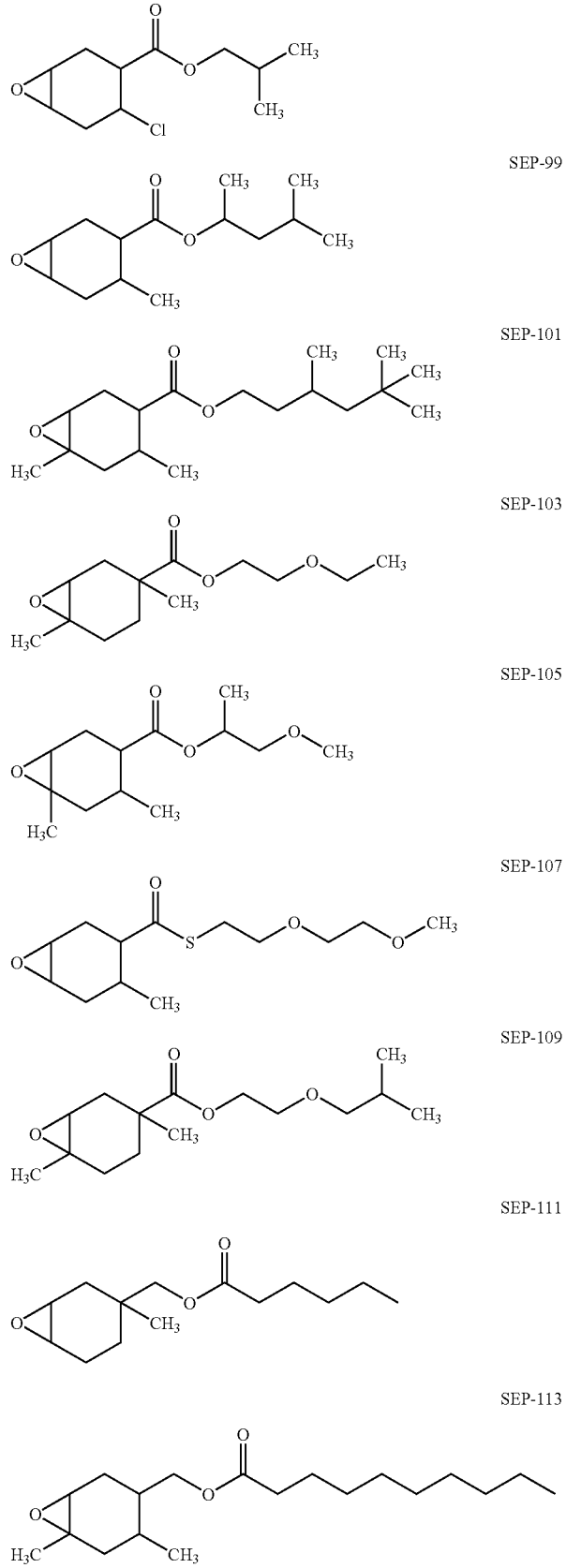

-continued
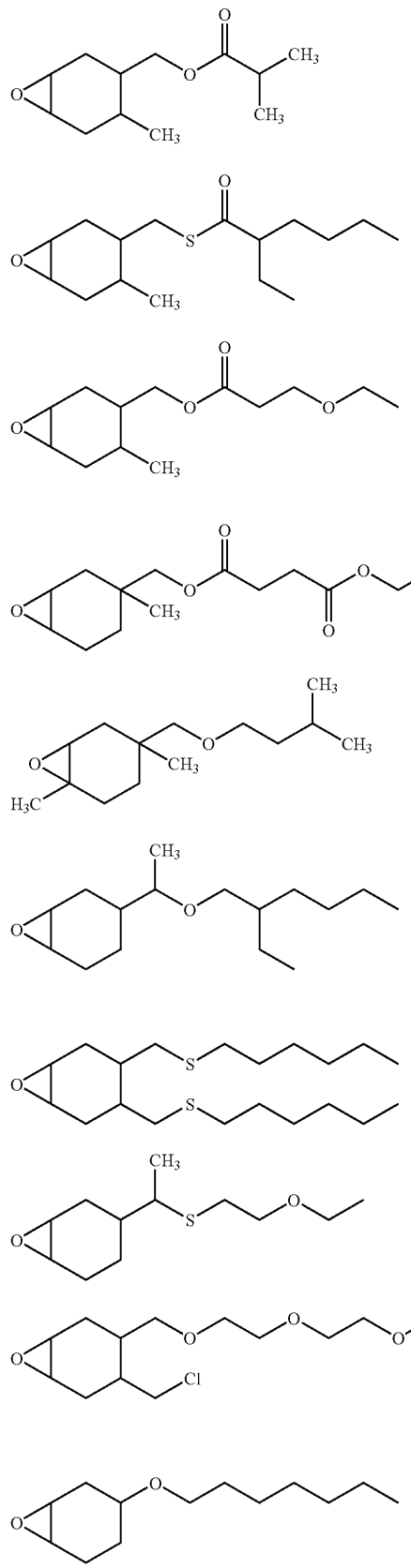
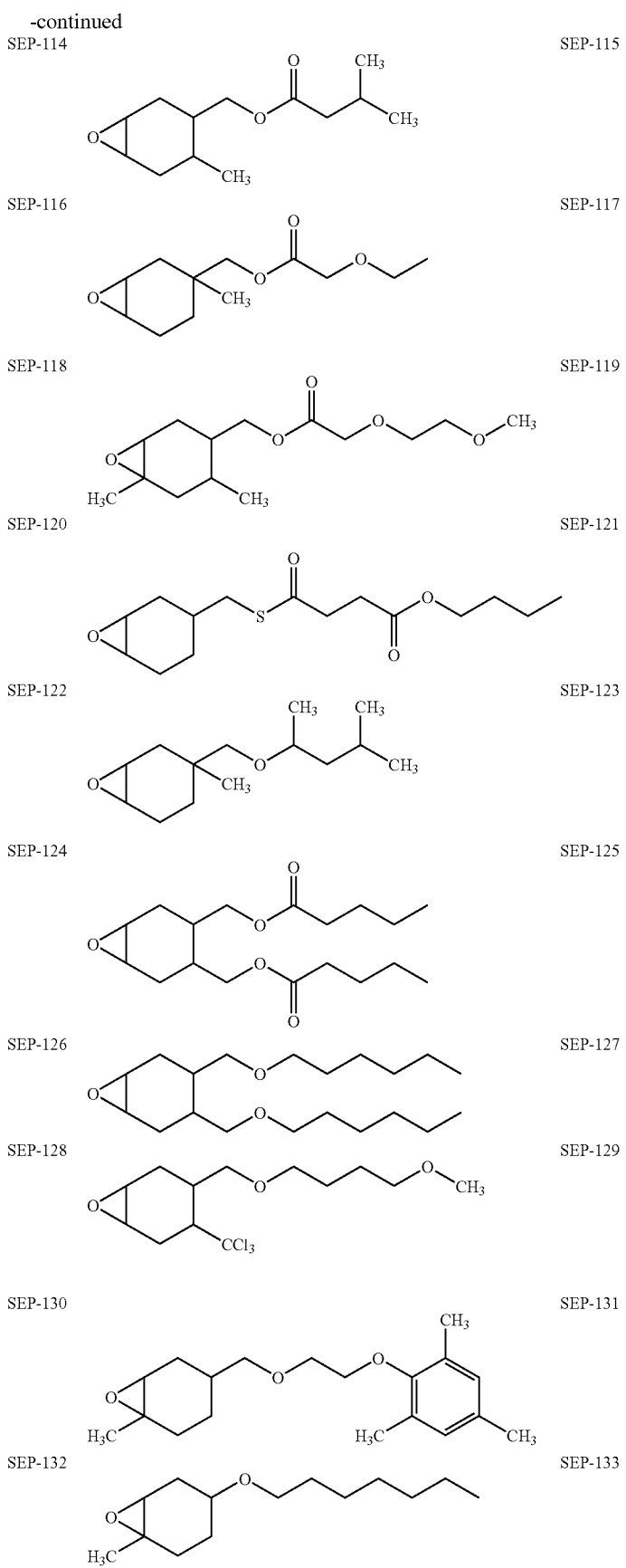

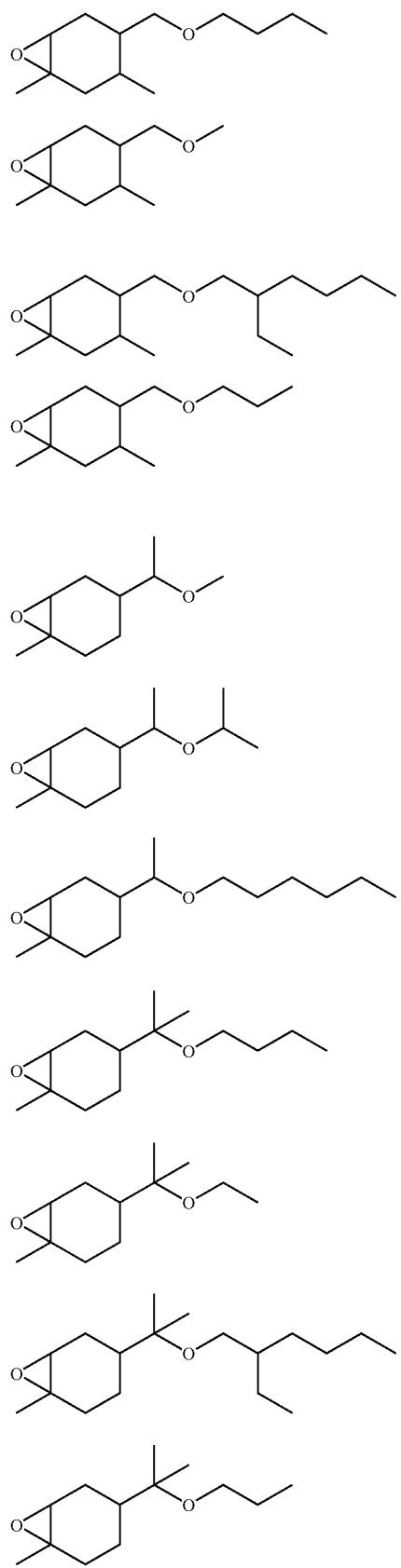

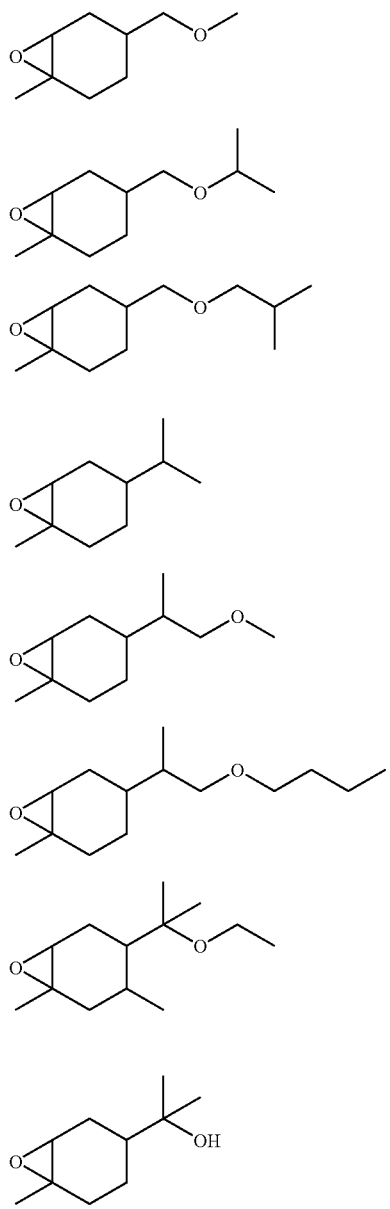
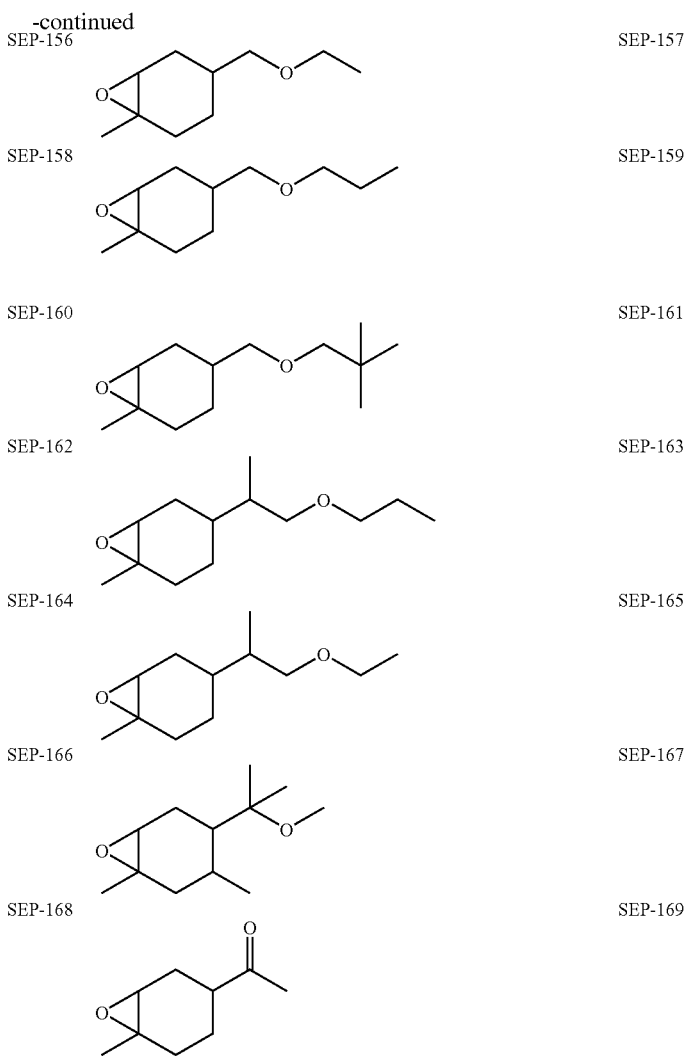

The addition amount of a mono-functional epoxy compound is preferably 10-20 weight %. When it is less than 10 weight %, the cured layer is provided with insufficient flexibility, while it exceeds 20 weight %, the physical properties of the layer after curing are weak, rendering the composition unviable. In this invention, epoxy compounds may be utilized either alone or in appropriate combinations of at least two types.

These alicyclic epoxy compounds can be prepared irrespective to the manufacturing method, however, they may be synthesized referring to literatures such as Experimental Chemistry 20, 4th edition, Organic Synthesis II, 213-, (1992) published by Maruzen K. K.; The Chemistry of Heterocyclic Compounds—Small Ring Heterocycles, part 3, Oxiranes, edited by Alfred Hasfner, published by John & Wiley and Sons, An Interscience Publication, New York (1985); Yoshimura, Adhesion vol. 29, No. 12, pg. 32 (1985); Yoshimura, Adhesion vol. 30, No. 5, pg. 42 (1986); Yoshimura, Adhesion vol. 30, No. 7, pg. 42 (1986); JP-A Nos. 11-100378, 4-36263 and 4-69360.

(Oxetane Compound)

The active ray curable compound of this invention, it is characterized by employing an oxetane compound together with an epoxy compound represented by Formula (A) as photopolymerization compounds, and it is preferable to employ an oxetane compound, without substituent at the 2-position of the oxetane ring, together with the epoxy compound.

In the following, an oxetane compound, the 2-position of which is not substituted, will be described.

Examples of oxetane compounds, the 2-position of which is not substituted, include compounds represented by following Formula (101).

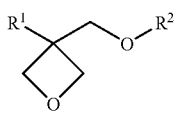

Formula (101)

In Formula (101), $R^1$ is a hydrogen atom, alkyl groups having 1-6 carbon atoms such as a methyl group, an ethyl group, a propyl group and a butyl group, fluoroalkyl groups having 1-6 carbon atoms; allyl groups, aryl groups, furyl groups or thienyl groups. $R^2$ is alkyl groups having 1-6 carbon atoms such as a methyl group, an ethyl group, a propyl group and a butyl group; alkenyl groups having 2-6 carbon atoms such as a 1-propenyl group, a 2-propenyl group, a 2-methyl-1-propenyl group, a 2-methyl-2-propenyl group, a 1-butenyl group and a 3-butenyl group; groups provided with an aromatic ring such as a phenyl group, a benzyl group, a fluorobenzyl group, a methoxybenzyl group and a phenoxyethyl group; alkylcarbonyl groups having 2-6 carbon atoms such as an ethylcarbonyl group, a propylcarbonyl group and a butylcarbonyl group; alkoxycarbonyl groups having 2-6 carbon atoms such as an ethoxycarbonyl group, a propoxycarbonyl group and a butoxycarbonyl group; or N-alkylcarbamoyl groups having 2-6 carbon atoms such as an ethylcarbamoyl group, a propylcarbamoyl group, a butylcarbamoyl group and a pentylcarbamoyl group.

An oxetane compound employed in this invention is specifically preferably a compound incorporating two oxetane rings because the obtained composition exhibits superior stickiness as well as excellent working property due to the low viscosity.

Examples of compounds having two oxetane rings include compounds represented by following Formula (102).

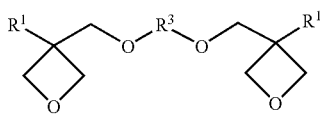

Formula (102)

In Formula (102), $R^1$ is a group similar to the one in above-described Formula (101). $R^3$ is, for example, a linear or branched alkylene group such as an ethylene group, a propylene group or a butylenes group; a linear or branched poly(alkyleneoxy) group such as an poly(ethyleneoxy) group and a poly(propyleneoxy) group; a linear or branched unsaturated hydrocarbon group such as a propenylene group, a methylpropenylene group and a butenylene group; a carbonyl group or an alkylene group containing a carbonyl group; an alkylene group containing a carboxyl group; or an alkylene group containing a carbamoyl group.

$R^3$ is also a polyvalent group selected from the groups represented by following Formulas (103), (104) and (105).

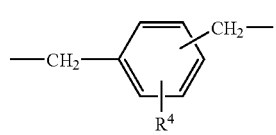

Formula (103)

In Formula (103), $R^4$ is a hydrogen atom, alkyl groups having 1-4 carbon atoms such as a methyl group, an ethyl group, a propyl group and a butyl group, alkoxy groups having 1-4 carbon atoms such as a methoxy group, an ethoxy group, a propoxy group and a butoxy group, halogen atoms such as a chlorine atom and a bromine atom, a nitro group, a cyano group, a mercapto group, a lower alkylcarboxyl group, a carboxyl group or a carbamoyl group.

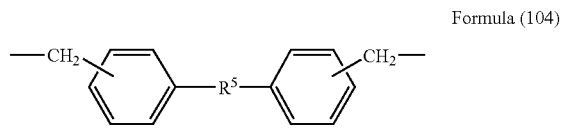

Formula (104)

In Formula (104), $R^5$ is an oxygen atom, a sulfur atom, a methylene group, NH, SO, $SO_2$, $C(CF_3)_2$ or $C(CH_3)_2$.

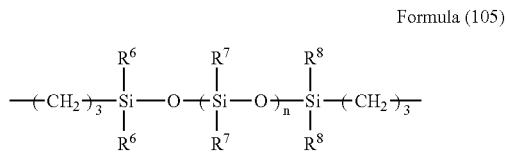

Formula (105)

In Formula (105), $R^6$ is an alkyl group having 1-4 carbon atoms such as a methyl group, an ethyl group, a propyl group and a butyl group, or aryl groups, while "n" is an integer of 0-2000. $R^7$ is an alkyl group having 1-4 carbon atoms such as a methyl group, an ethyl group, a propyl group and a butyl group, or aryl groups. $R^7$ also includes a group selected from those represented by following Formula (106).

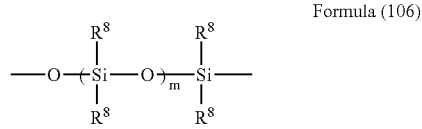

Formula (106)

In Formula (106), $R^8$ is an alkyl group having 1-4 carbon atoms such as a methyl group, an ethyl group, a propyl group and a butyl group, or aryl groups, while "m" is an integer of 0-100.

Examples of compounds provided with two oxetane rings include the following compounds.

Exemplified Compound 11

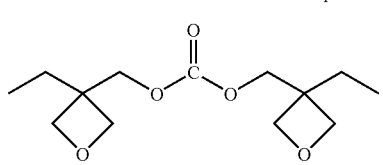

Exemplified Compound 12

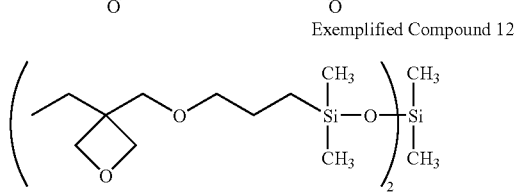

Exemplified Compound 11 is represented by Formula (102), wherein $R^1$ is an ethyl group and $R^3$ is a carboxyl group. And, Exemplified Compound 12 is represented by Formula (102), wherein $R^1$ is an ethyl group and $R^3$ is represented by Formula (105) wherein $R^6$ and $R^7$ each are a methyl group and "n" is 1.

Specific examples of compounds provided with two oxetane rings include the following compounds.

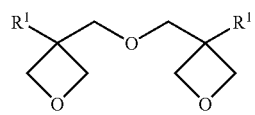

Formula (107)

Further, examples of compounds provided with three to four oxetane rings include compounds represented by following Formula (108).

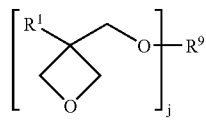

Formula (108)

In Formula (108), $R^1$ is identical to $R^1$ in foregoing Formula (101). As $R^9$, listed are a branched alkylene group having 1-12 carbon atoms such as those represented by A-C described below, a branched poly(alkyleneoxy) group such as those represented by D, also described below, or a branched polysiloxy group such as those represented by E described below as well, while "j" is 3 or 4.

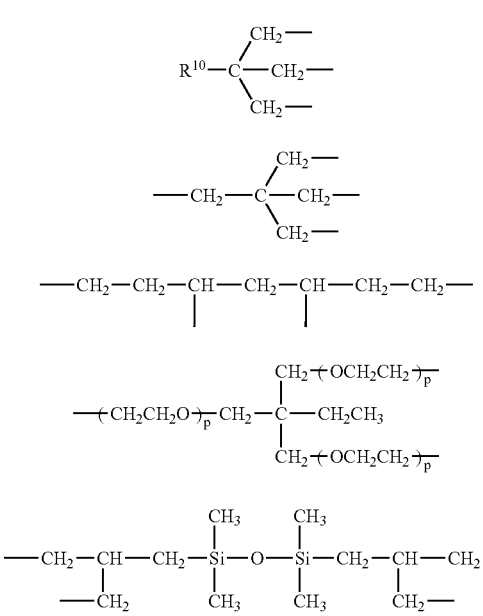

In above A, $R^{10}$ is a lower alkyl group such as a methyl group, an ethyl group or a propyl group. Further, in above D, "p" is an integer of 1-10.

Examples of compounds provided with three to four oxetane rings include Exemplified Compound 13.

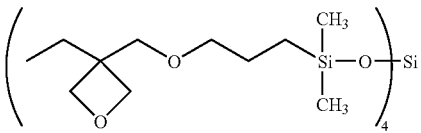

Exemplified Compound 13

Further, examples of compounds provided with 1-4 oxetane rings other than those described above include compounds represented by following Formula (109).

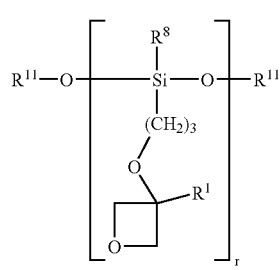

Formula (109)

In Formula (109), $R^8$ is identical to $R^8$ in foregoing Formula (106), while $R^{11}$ is an alkyl group having 1-4 carbon atoms such as a methyl group, an ethyl group, a propyl group or a butyl group, or a trialkylsilyl group, and "r" is an integer of 1-4.

Specific examples of oxetane compounds employed in this invention are shown below.

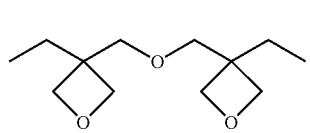

Exemplified Compound 14

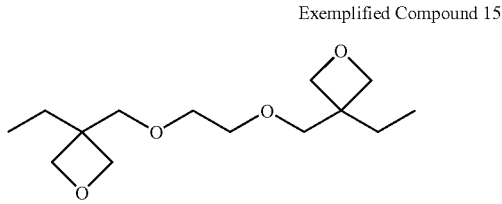

Exemplified Compound 15

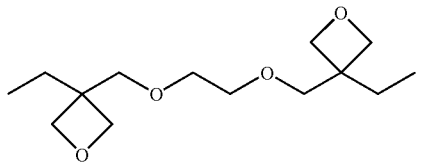

Exemplified Compound 16

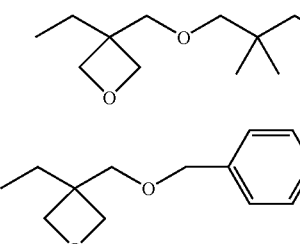

Exemplified Compound 17

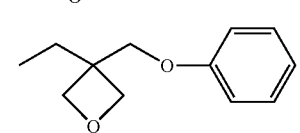

Exemplified Compound 18

Exemplified Compound 19

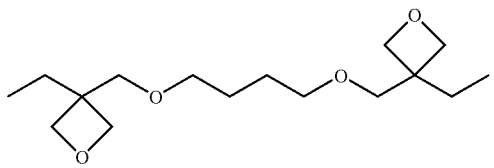

The manufacturing method of each compound provided with an oxetane ring, described above, is not specifically limited, and may follow well known conventional methods. For example, disclosed is a synthesis method in which an oxetane ring is synthesized from a diol, by D. B. Pattison in J. Am. Chem. Soc., Section 3455, pg. 79 (1957). Further, in addition to these, listed are compounds provided with 1-4 oxetane rings having a molecular weight of in as high a range as 1,000-5,000. Specific examples of these compounds include the following.

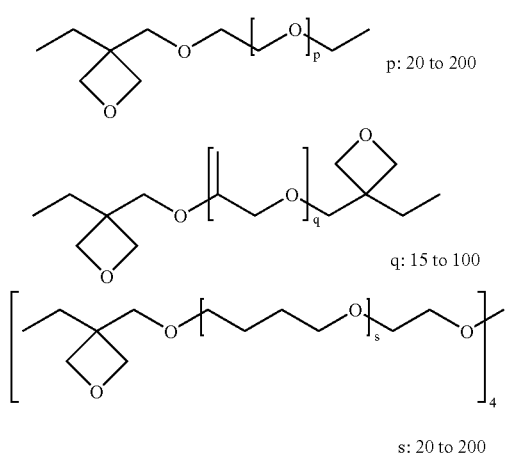

p: 20 to 200 q: 15 to 100 s: 20 to 200

(Poly-functional Alicyclic Epoxy Compound)

In the active ray curable composition of this invention, it is preferable to incorporate a poly-functional alicyclic epoxy compound together with a mono-functional epoxy compound represented by Formula (A) and an oxetane compound with respect to obtaining a sensitivity increasing effect or a physical property improving effect of a cured layer.

Preferable bi-functional alicyclic epoxides are epoxy compounds represented by foregoing Formula (B) (that is poly-functional epoxy compounds) (being also shown below).

Formula (B)

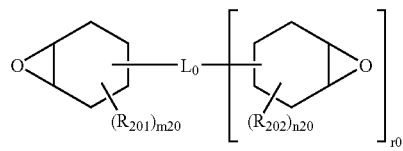

wherein, $R_{201}$ and $R_{202}$ each are a substituent, m20 and n20 each are an integer of 0-2, r0 is an integer of 1-3, $L_0$ is a single bond or a linking group having a carbon number of 1-15 and a valency of r0+1, provided that the linking group may contain an oxygen atom or a sulfur atom in the main chain.

Further, alicyclic epoxy compound represented by Formula (B) will be described.

In Formula (B), $R_{201}$ and $R_{202}$ each represent a substituent, and examples of the substituent include halogen atoms (such as a chlorine atom, a bromine atom and a fluorine atom), alkyl groups having a carbon number of 1-6 (such as a methyl group, an ethyl group, a propyl group, an isopropyl group and a butyl group), alkoxy groups having a carbon number of 1-6 (such as a methoxy group, an ethoxy group, a n-propoxy group, an iso-propoxy group, a n-butoxy group and a tert-butoxy group), acyl groups (such as acetyl group, a propionyl group and a trifluoroacetyl group), acyloxy groups (such as an acetoxy group, a propionyloxy group and trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

$m_{20}$ and $n_{20}$ each are an integer of 0-2 but preferably 0 or 1.

$L_0$ is a single bond or a linking group having a valency of r0+1 and 1-15 carbon atoms, provided that $L_0$ may contain an oxygen atom or a sulfur atom in the main chain.

Examples of divalent linking groups which have 1-15 carbon atoms, provided that they may contain an oxygen atom or a sulfur atom in the main chain, include the following groups, and groups formed by combining these groups with a plural number of —O— groups, —S— groups, —CO— groups and —CS— groups.

methylene group: —$CH_2$—
ethylidene group: >$CHCH_3$
isopropilydene group: >$C(CH_3)_2$
1,2-ethylene group: —$CH_2CH_2$—
1,2-propylene group: —$CH(CH_3)CH_2$—
1,3-propane diyl group: —$CH_2CH_2CH_2$—
2,2-dimethyl-1,3-propane diyl group: —$CH_2C(CH_3)_2CH_2$—
2,2-dimethoxy-1,3-propane diyl group: —$CH_2C(OCH_3)_2CH_2$—
2,2-dimethoxymethyl-1,3-propane diyl group: —$CH_2C(CH_2OCH_3)_2CH_2$—
1-methyl-1,3-propane diyl group: —$CH(CH_3)CH_2CH_2$—
1,4-butane diyl group: —$CH_2CH_2CH_2CH_2$—
1,5-pentane diyl group: —$CH_2CH_2CH_2CH_2CH_2$—
oxydiethylene group: —$CH_2CH_2OCH_2CH_2$—
thiodiethylene group: —$CH_2CH_2SCH_2CH_2$—
3-oxothiodiethylene group: —$CH_2CH_2SOCH_2CH_2$—
3,3-dioxothiodiethylene group: —$CH_2CH_2SO_2CH_2CH_2$—
1,4-dimethyl-3-oxa-1,5-pentane diyl group: —$CH(CH_3)CH_2OCH(CH_3)CH_2$—
3-oxopentane diyl group: —$CH_2CH_2COCH_2CH_2$—
1,5-dioxo-3-oxapentane diyl group: —$COCH_2OCH_2CO$—
4-oxa-1,7-heptane diyl group: —$CH_2CH_2CH_2OCH_2CH_2CH_2$—
3,6-dioxa-1,8-octane diyl group: —$CH_2CH_2OCH2CH_2OCH_2CH_2$—
1,4,7-trimethyl-3,6-dioxa-1,8-octane diyl group: —$CH(CH_3)CH_2OCH(CH_3)CH_2OCH(CH_3)CH_2$—
5,5-dimethyl-3,7-dioxa-1,9-nonane diyl group: —$CH_2CH_2OCH_2C(CH_3)_2CH_2OCH_2CH_2$—
5,5-dimethoxy-3,7-dioxa-1,9-nonane diyl group: —$CH_2CH_2OCH_2C(OCH_3)_2CH_2OCH_2CH_2$—
5,5-dimethoxymethyl-3,7-dioxa-1,9-nonane diyl group: —$CH_2CH_2OCH_2C(CH_2OCH_3)_2CH_2OCH_2CH_2$—

4,7-dioxo-3,8-dioxa-1,10-decane diyl group:
—CH$_2$CH$_2$O—COCH$_2$CH$_2$CO—OCH$_2$CH$_2$—
3,8-dioxo-4,7-dioxa-1,10-decane diyl group:
—CH$_2$CH$_2$CO—OCH$_2$CH$_2$O—COCH$_2$CH$_2$—
1,3-cyclopentane diyl group: -1,3-C$_5$H$_8$—
1,2-cyclohexane diyl group: -1,2-C$_6$H$_{10}$—
1,3-cyclohexane diyl group: -1,3-C$_6$H$_{10}$—
1,4-cyclohexane diyl group: -1,4-C$_6$H$_{10}$—
2,5-tetrahydrofurandi-yl group: -2,5-C$_4$H$_6$O—
p-phenylene group: -p-C$_6$H$_4$—
m-phenylene group: -m-C$_6$H$_4$—
α,α'-o-xylylene group: -o-CH$_2$—C$_6$CH$_4$—CH$_2$—
α,α'-m-xylylene group: -m-CH$_2$—C$_6$CH$_4$—CH$_2$—
α,α'-p-xylylene group: -p-CH$_2$—C$_6$CH$_4$—CH$_2$—
fran-2,5-diyl-bismethylene group: -2,5-CH$_2$—C$_4$H$_2$O—CH$_2$—
thiophene-2,5-diyl-bismethylene group: -2,5-CH$_2$—C$_4$H$_2$S—CH$_2$—
isopropylidenebis-p-phenylene group: -p-C$_6$H$_4$—C(CH$_3$)$_2$-p-C$_6$H$_4$—

Linking groups being at least tri-valent include groups formed by removing a necessary number of hydrogen atoms at appropriate positions from any of the divalent linking groups described above, and groups formed by combining them with a plural number from an —O— group, an —S— group, a —CO— group or a —CS— group.

L$_0$ may contain a substituent. Examples of such substituents include a halogen atom (such as a chlorine atom, a bromine atom and a fluorine atom), an alkyl group having 1-6 carbon atoms (such as a methyl group, an ethyl group, a propyl group, an isopropyl group and a butyl group), an alkoxy group having 1-6 carbon atoms (such as a methoxy group, an ethoxy group, an n-propoxy group, an iso-propoxy group, an n-butoxy group and a tert-butoxy group), an acyl group (such as an acetyl group, a propionyl group and a trifluoroacetyl group), an acyloxy group (such as an acetoxy group, a propionyloxy group and a trifluoroacetoxy group), an alkoxycarbonyl group (such as a methoxycarbonyl group, an ethoxycarbonyl group and a tert-butoxycarbonyl group). Preferable substituents are the alkyl, alkoxy and alkoxycarbonyl groups.

L$_0$ is preferably a divalent linking group having 1-8 carbon atoms, provided that L$_0$ may contain an oxygen atom or a sulfur atom in the main chain, but more preferably a divalent linking group having 1-5 carbon atoms, and a main chain of which is comprised of only carbon atoms.

Specifically preferable alicyclic epoxides are compounds represented by foregoing Formula (B-I) or (B-II), with respect to forming a cured layer having elevated hardness and enhanced adhesion of the cured layer to the substrate.

Formula (B-I)

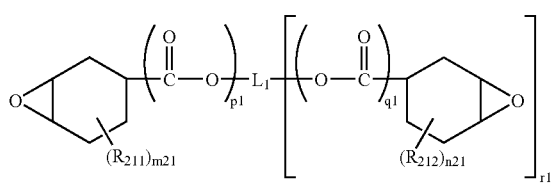

In Formula (B-I), R$_{211}$ and R$_{212}$ each are a substituent, and m21 and n21 each are an integer of 0-2, p1 and q1 each are an integer of 0 or 1, r1 is an integer of 1-3, L$_1$ is a single bond or a linking group, having 1-15 carbon atoms and a valency of r1+1, provided that the linking group may contain an oxygen atom or a sulfur atom in the main chain.

Formula (B-II)

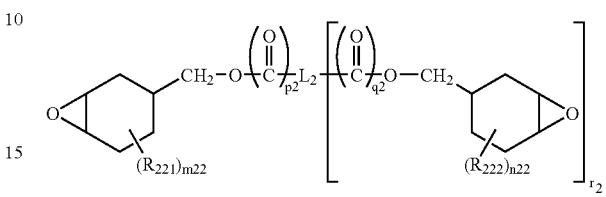

In Formula (B-II), R$_{221}$ and R$_{222}$ each are a substituent, m22 and n22 each are an integer of 0-2, p2 and q2 each are an integer of 0 or 1, r2 is an integer of 1-3, and L$_2$ is a single bond or a linking group, having 1-15 carbon atoms and a valency of r2+1, provided that the linking group may contain an oxygen atom or a sulfur atom in the main chain.

Further, alicyclic epoxy compounds represented by Formula (B-I) or (B-II) will be described.

In above Formulas, R$_{211}$, R$_{212}$, R$_{221}$ and R$_{222}$ represent a substituent, and examples of the substituent include halogen atoms (such as a chlorine atom, a bromine atom and a fluorine atom), alkyl groups having a carbon number of 1-6 (such as a methyl group, an ethyl group, a propyl group, an isopropyl group and a butyl group), alkoxy groups having a carbon number of 1-6 (such as a methoxy group, an ethoxy group, a n-propoxy group, an iso-propoxy group, a n-butoxy group and a tert-butoxy group), acyl groups (such as acetyl group, a propionyl group and a trifluoroacetyl group), acyloxy groups (such as an acetoxy group, a propionyloxy group and trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

m21, n21, m22 and n22 each are an integer of 0-2 but preferably 0 or 1.

L$_1$ is a single bond or a linking group having 1-15 carbon atoms and a valency of r1+1, provided that the linking group may contain an oxygen atom or a sulfur atom in the main chain, and L$_2$ is a single bond or a linking group having 1-15 carbon atoms and a valency of r2+1, provided that the linking group may contain an oxygen atom or a sulfur atom in the main chain.

Examples of a divalent linking group, which has 1-15 carbon atoms and may contain an oxygen atom or a sulfur atom in the main chain, include the same as those described in the description of L$_0$.

As L$_1$ and L$_2$, preferred is a divalent linking group having 1-8 carbon atoms and may contain an oxygen atom or a sulfur atom in the main chain, but more preferably divalent linking groups having 1-5 carbon atoms and the main chain of which is comprised of only carbon atoms.

Specifically preferable alicyclic epoxides are compounds represented by following Formula (B-III) or (B-IV), with respect to high curing sensitivity which is barely affected by variation in printing environment.

Formula (B-III)

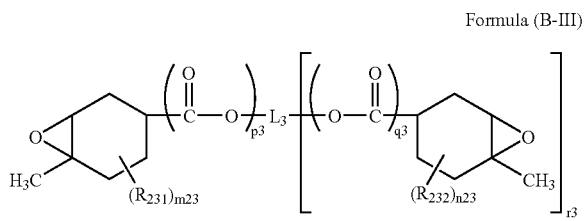

In above Formula, $R_{231}$ and $R_{232}$ each are a substituent, and m23 and n23 each are an integer of 0 or 1, p23 and q23 each are an integer of 0 or 1, r3 is an integer of 1-3, $L_3$ is a single bond or a linking group, having 1-15 carbon atoms and a valency of r3+1, provided that the linking group may contain an oxygen atom or a sulfur atom in the main chain.

Formula (B-IV)

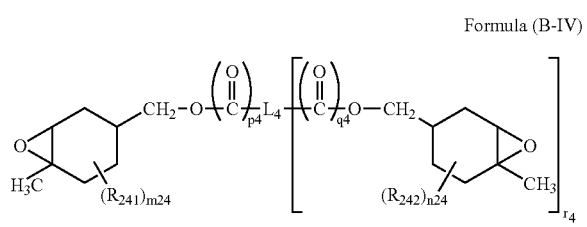

In above Formula, $R_{241}$ and $R_{242}$ each are a substituent, m24 and n24 each are an integer of 0 or 1, p4 and q4 each are an integer of 0 or 1, r4 is an integer of 1-3, and $L_4$ is a single bond or a linking group, having 1-15 carbon atoms and a valency of r4+1, provided that the linking group may contain an oxygen atom or a sulfur atom in the main chain.

Further, alicyclic epoxy compounds represented by Formula (B-III) or (B-IV) will be described.

In above Formulas, $R_{231}$, $R_{232}$, $R_{241}$ and $R_{242}$ each are a substituent, and examples of the substituent include a halogen atom (such as a chlorine atom, a bromine atom or a fluorine atom), an alkyl group having 1-6 carbon atoms (such as a methyl group, an ethyl group, a propyl group, an isopropyl group or a butyl group), an alkoxy group having 1-6 carbon atoms (such as a methoxy group, an ethoxy group, an n-propoxy group, an iso-propoxy group, an n-butoxy group or a tert-butoxy group), an acyl group (such as acetyl group, a propionyl group or a trifluoroacetyl group), an acyloxy group (such as an acetoxy group, a propionyloxy group or trifluoroacetoxy group), an alkoxycarbonyl group (such as a methoxycarbonyl group, an ethoxycarbonyl group or a tert-butoxycarbonyl group). Preferable substituents are the alkyl, alkoxy and alkoxycarbonyl groups.

m23, n23, m24 and n24 each are an integer of 0-2, but preferably 0 or 1.

$L_3$ is a single bond or a linking group of r3+1 valency, which has 1-15 carbon atoms and may contain an oxygen atom or a sulfur atom in the main chain, and $L_4$ is a single bond or a linking group of r4+1 valency, which has 1-15 carbon atoms and may contain an oxygen atom or a sulfur atom in the main chain.

Examples of a divalent linking group, which has 1-15 carbon atoms and may contain an oxygen atom or a sulfur atom in the main chain, include the same as those described in the description of $L_0$.

$L_3$ and $L_4$ are preferably divalent linking groups having 1-8 atoms and may contain an oxygen atom or a sulfur atom in the main chain, and more preferably divalent linking groups which has 1-5 carbon atoms and the main chain of which is comprised of only carbon atoms.

In the following pages, specific examples of preferable alicyclic epoxides are shown, however, this invention is not limited thereto.

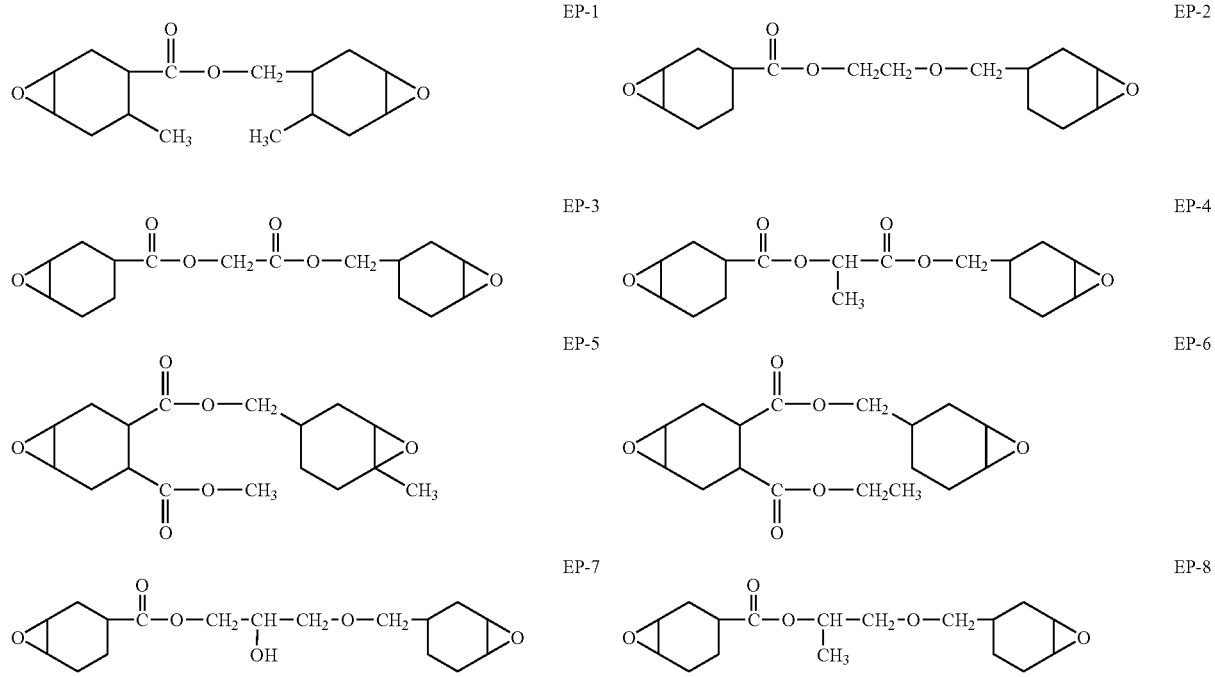

-continued
EP-9
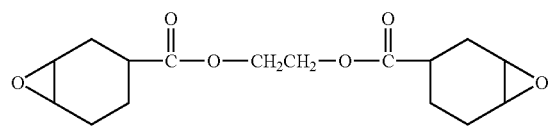
EP-10
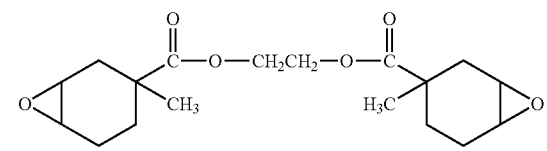
EP-11
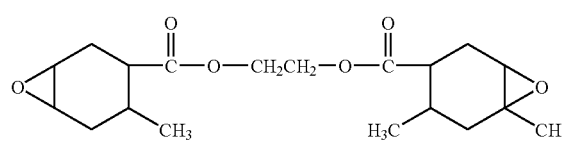
EP-12
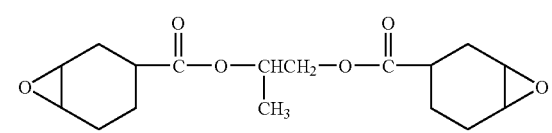
EP-13
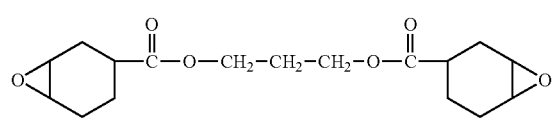
EP-14
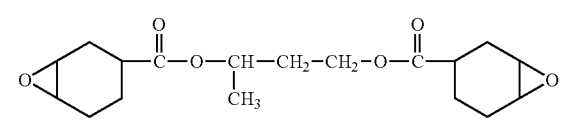
EP-15
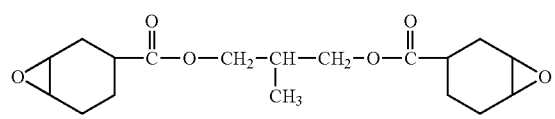
EP-16
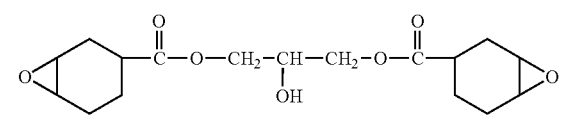
EP-17
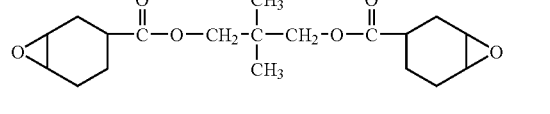
EP-18
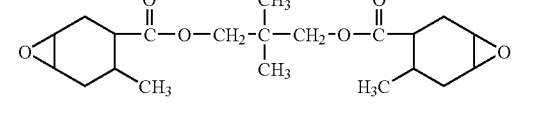
EP-19
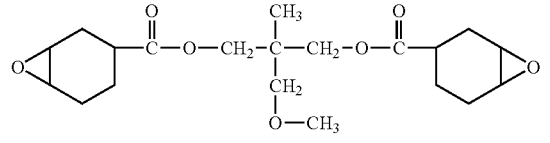
EP-20
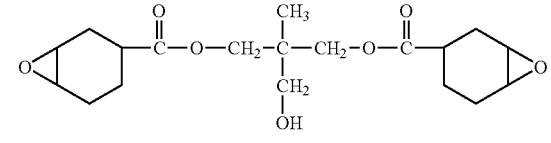
EP-21
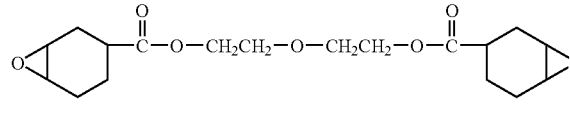
EP-22
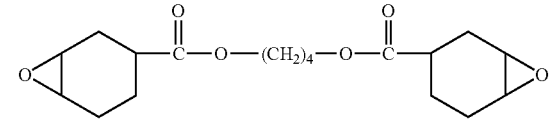
EP-23
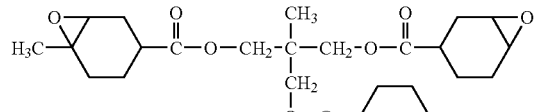
EP-24
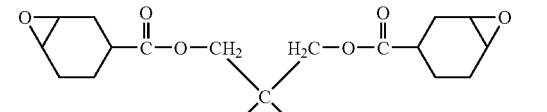
EP-25
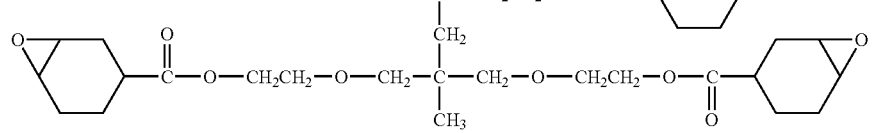

-continued
EP-26
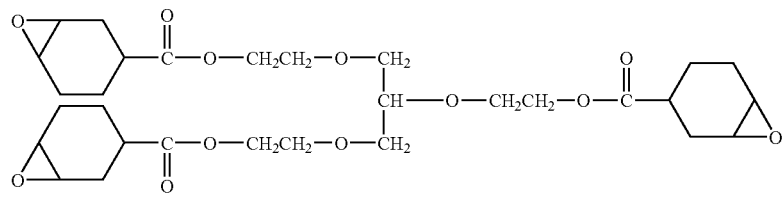
EP-27
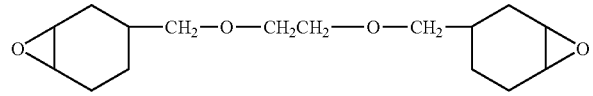
EP-28
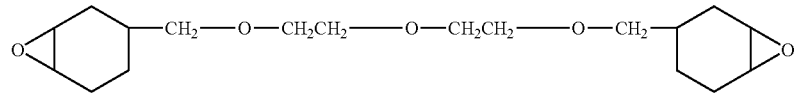
EP-29
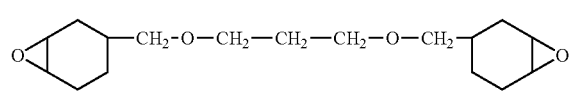
EP-30
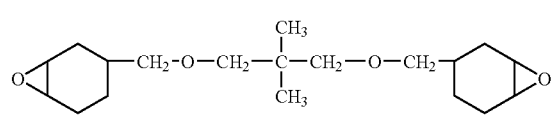
EP-31
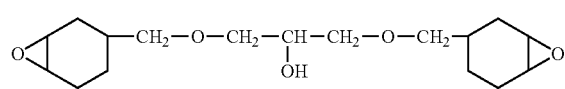
EP-32
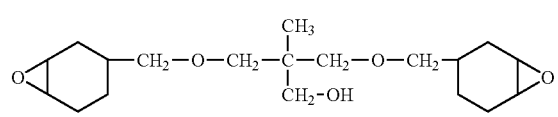
EP-33
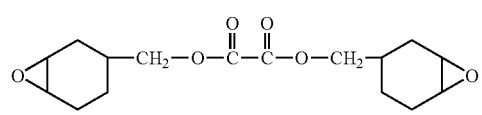
EP-34
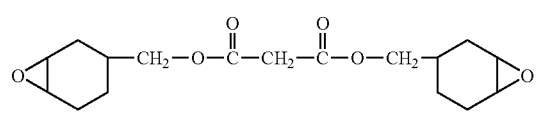
EP-35
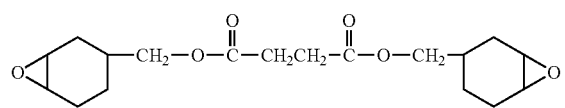
EP-36
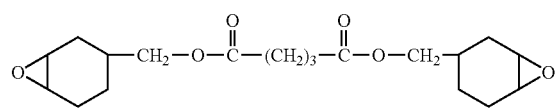
EP-37
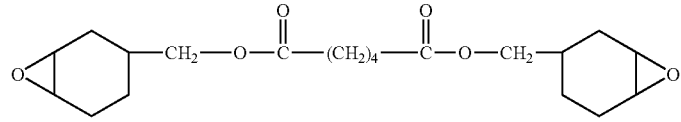
EP-38
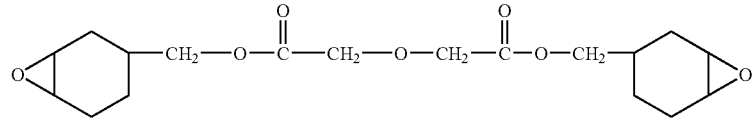
EP-39
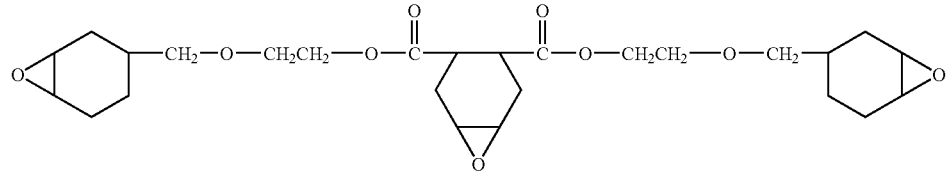
EP-40
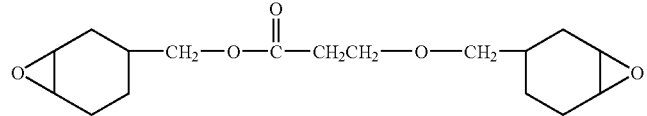

-continued
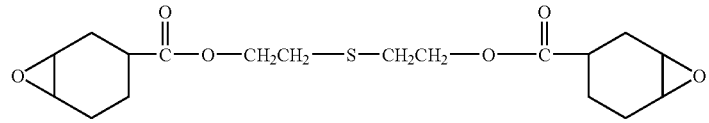
EP-41
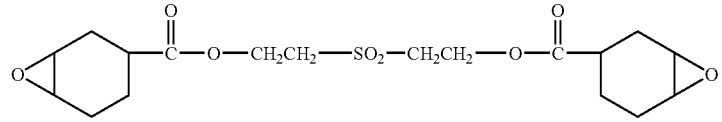
EP-42
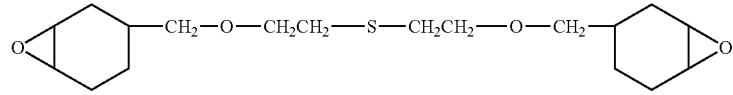
EP-43
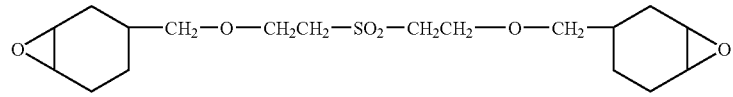
EP-44
EP-45
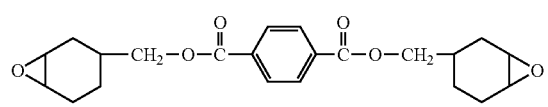
EP-46
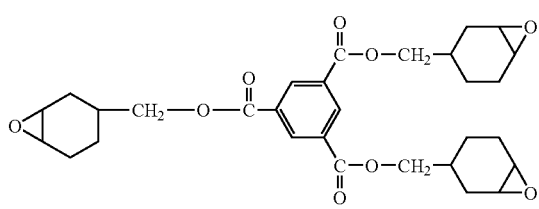
EP-47
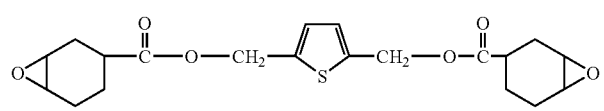
EP-48
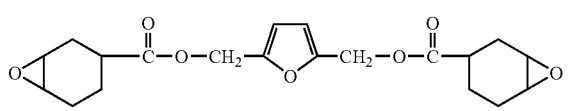
EP-49
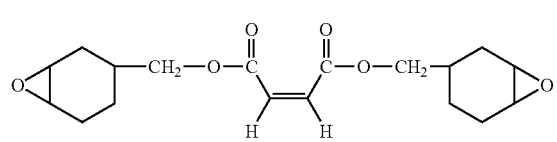
EP-50
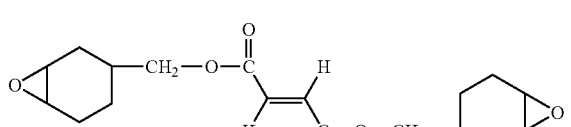
EP-51
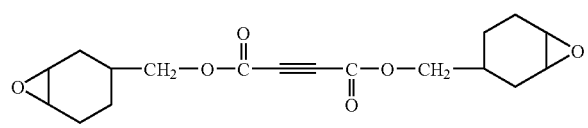
EP-52
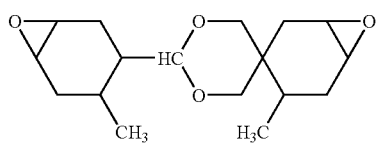
EP-53
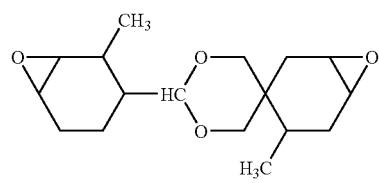
EP-54
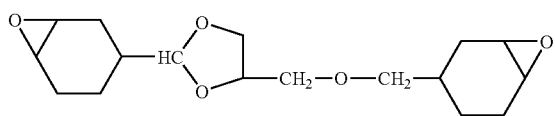
EP-55
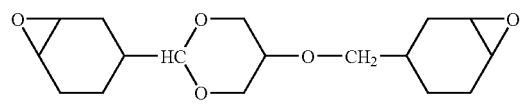
EP-56
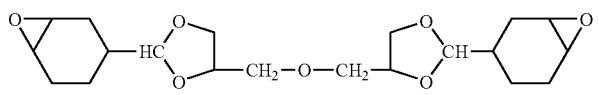

-continued
EP-57
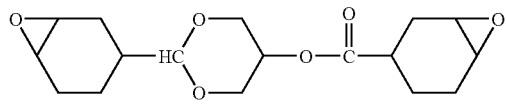
EP-58
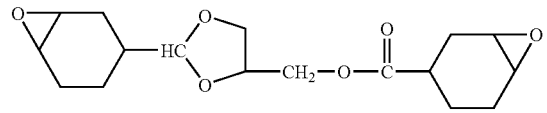
EP-59
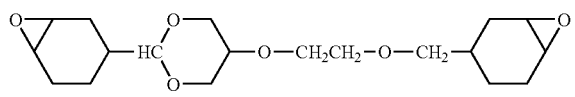
EP-60
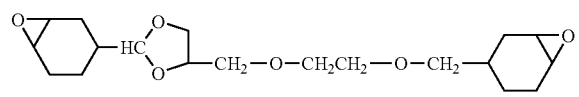
EP-61
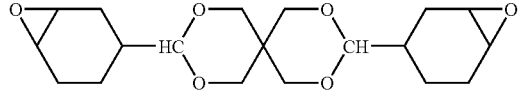
EP-62
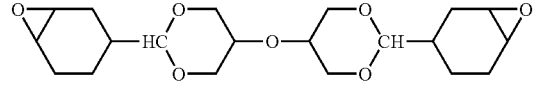
EP-63
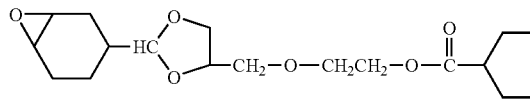
EP-64
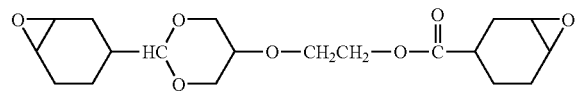
EP-65
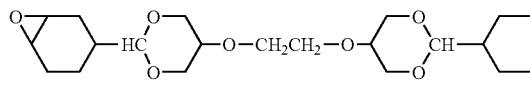
EP-66
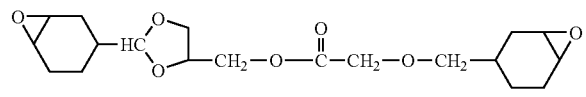
EP-67
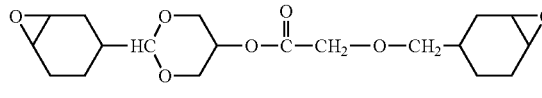
EP-68
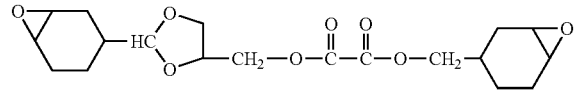
EP-69
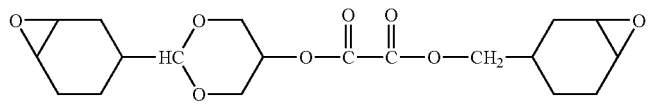
EP-70
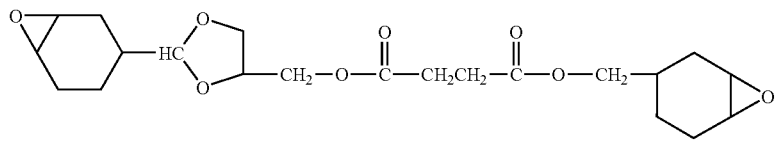
EP-71
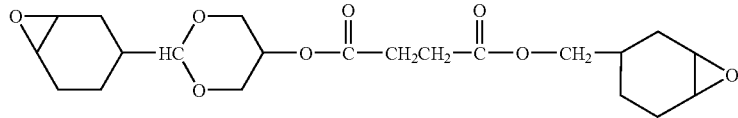
EP-72
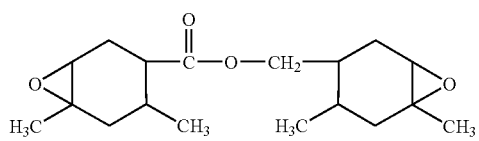
EP-73
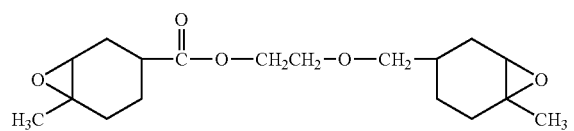
EP-74
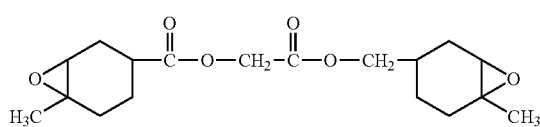
EP-75
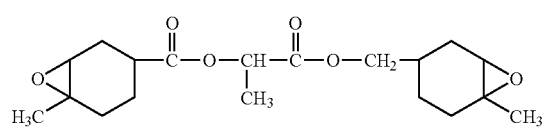

-continued
EP-77
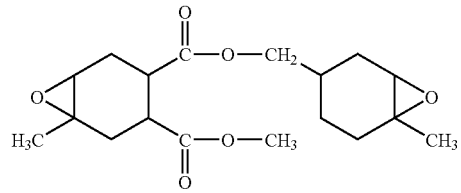
EP-78
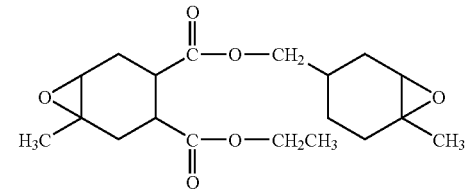
EP-79
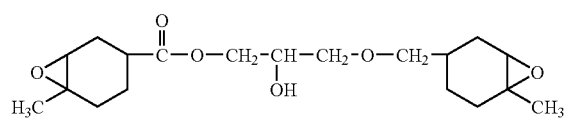
EP-80
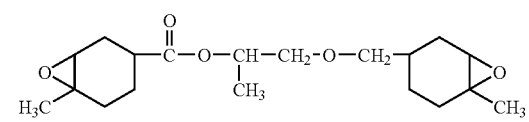
EP-81
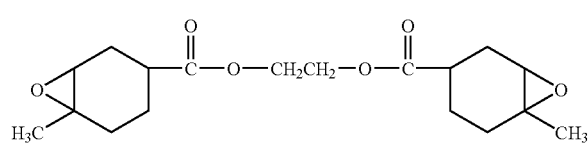
EP-82
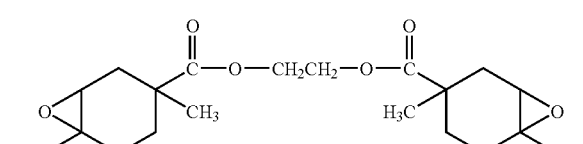
EP-83
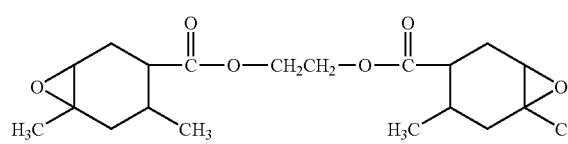
EP-84
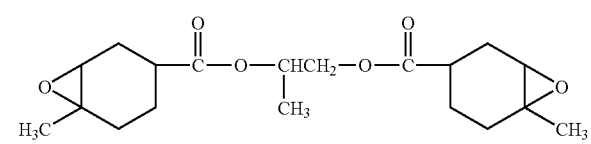
EP-85
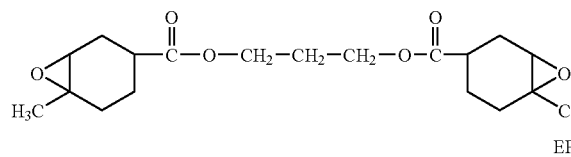
EP-86
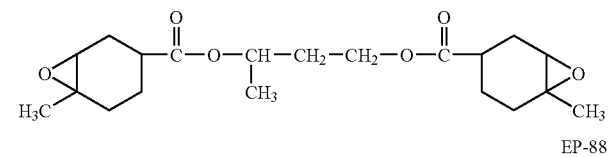
EP-87
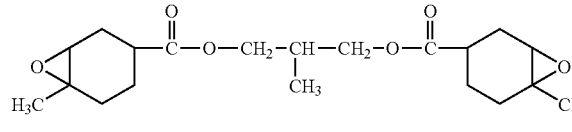
EP-88
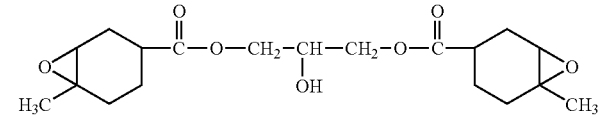
EP-89
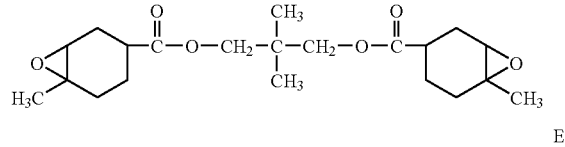
EP-90
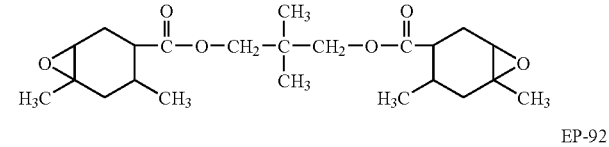
EP-91
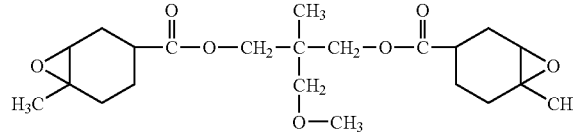
EP-92
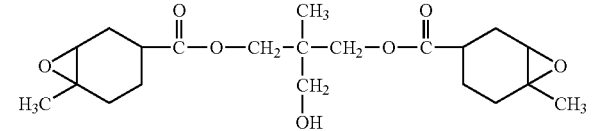
EP-93
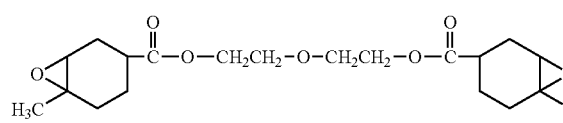
EP-94
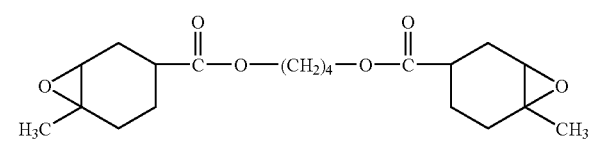

-continued
EP-95 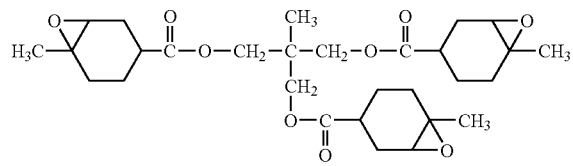 EP-96 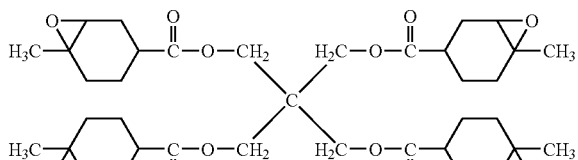
EP-97 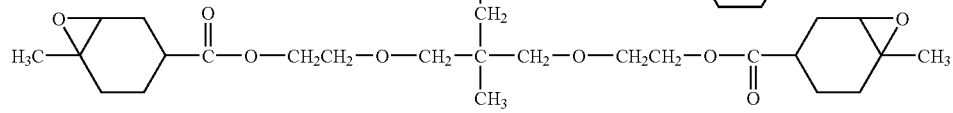
EP-98 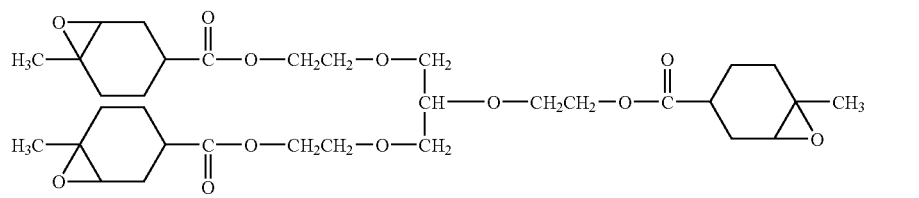
EP-99 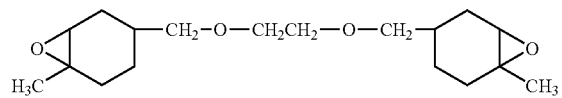
EP-100 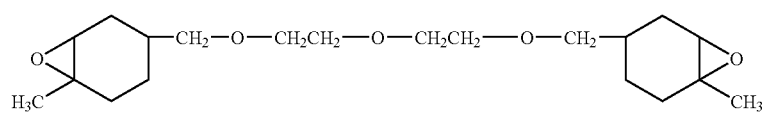
EP-101 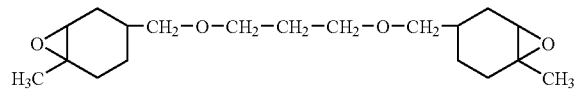 EP-102 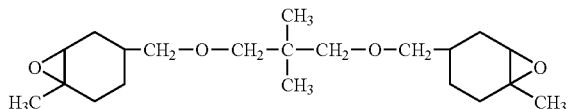
EP-104 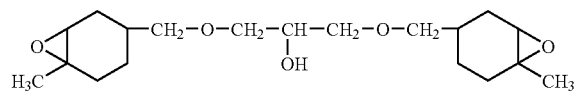 EP-103 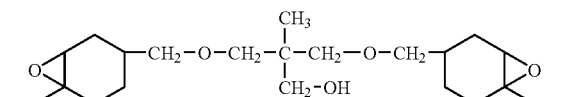
EP-105 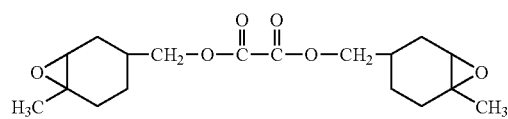 EP-106 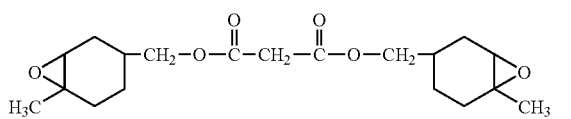
EP-107 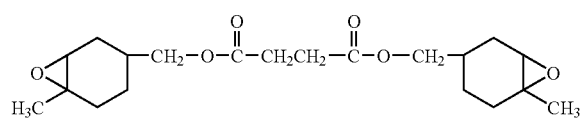 EP-108 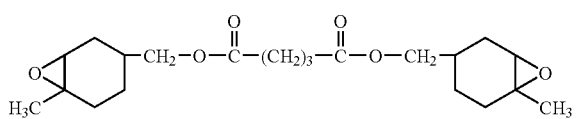
EP-109

-continued
EP-110
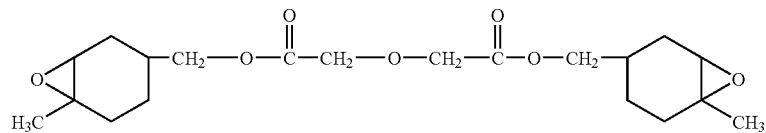
EP-111
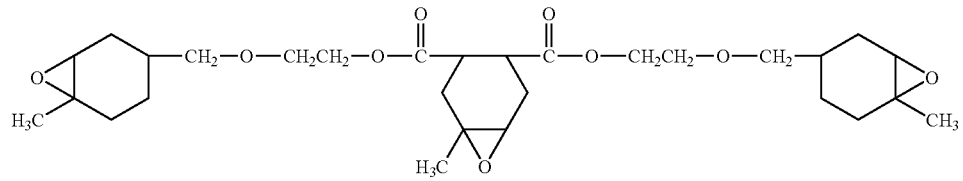
EP-112
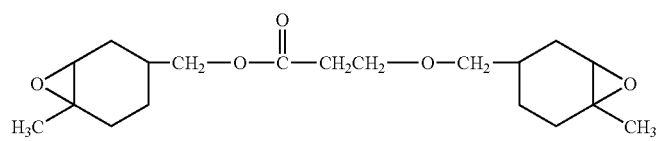
EP-113
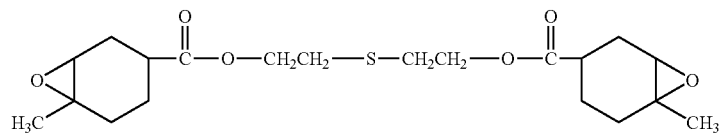
EP-114
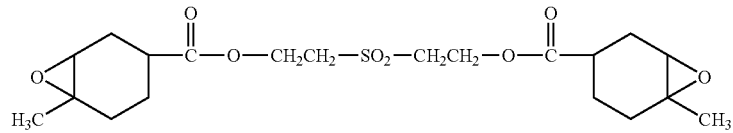
EP-115
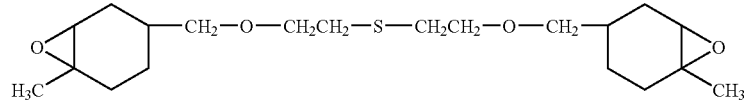
EP-116
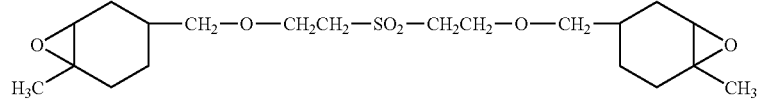
EP-117
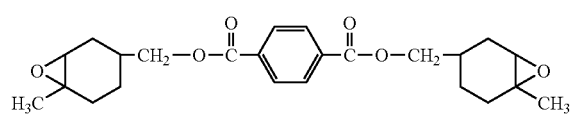
EP-119
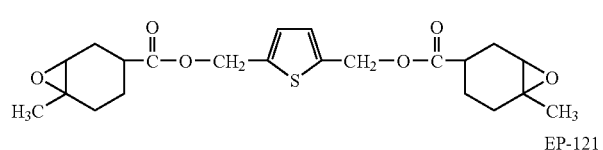
EP-118
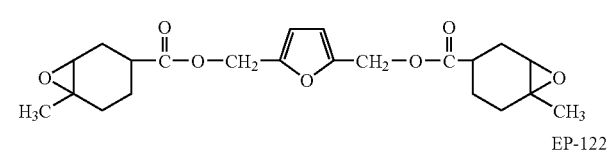
EP-121
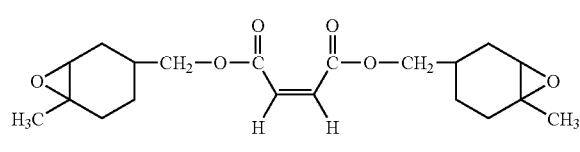
EP-120
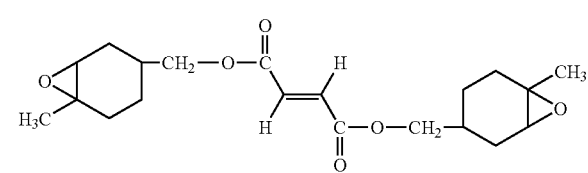

-continued
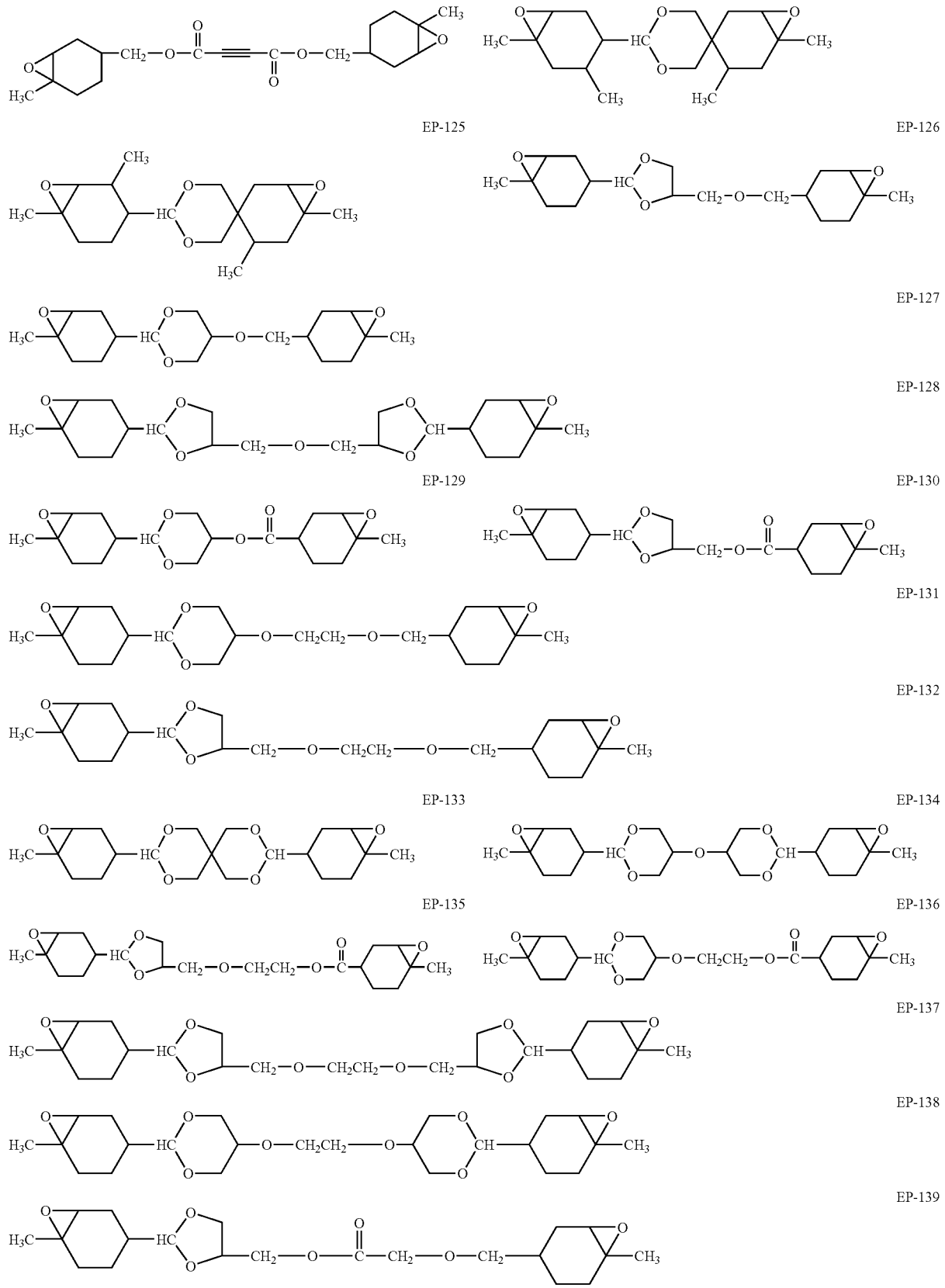

-continued

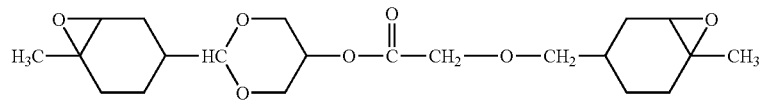
EP-140

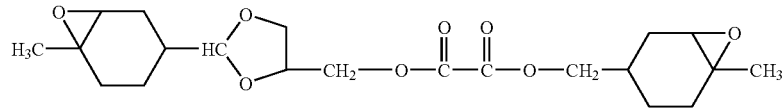
EP-141

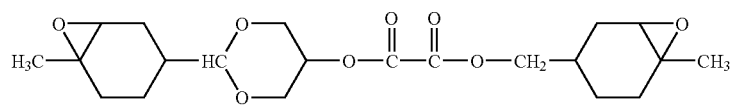
EP-142

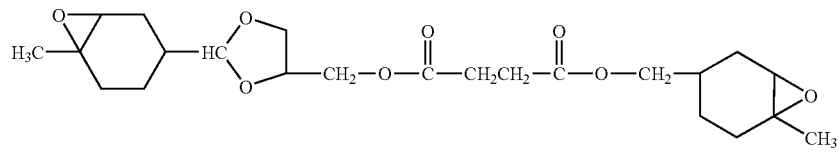
EP-143

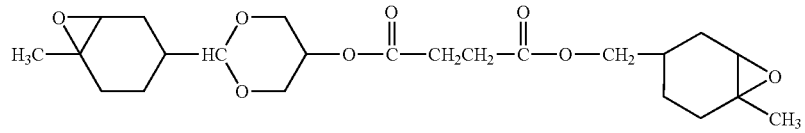
EP-144

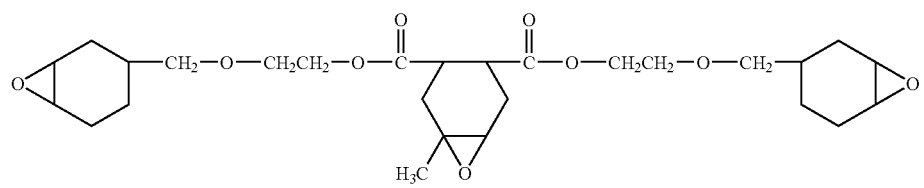
EP-145

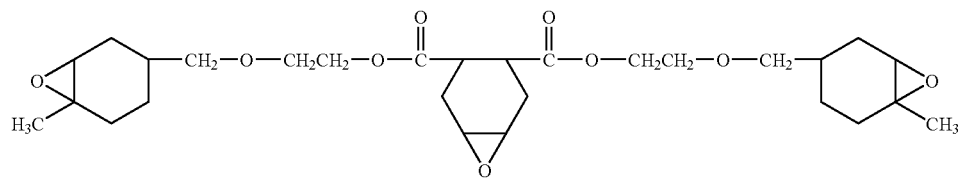
EP-146

The addition amount of an epoxy compound is preferably 10-50 weight %. When it is less than 10 weight %, the curing capability significantly changes depending on the curing environment (being temperature and humidity) to make the composition unviable. When it is over 50 weight %, the physical properties of the layer after curing are weak, making the composition commercially unviable, while the more preferable addition amount is 20-40 weight %.

In this invention, epoxy compounds may be employed either alone or appropriately in combinations of at least two types.

These alicyclic epoxy compounds can be prepared irrespective to the manufacturing method, however, they may be synthesized referring to literature such as Experimental Chemistry 20, 4th edition, Organic Synthesis II, pp. 213-, (1992.) published by Maruzen K. K.; The Chemistry of Heterocyclic Compounds-Small Ring Heterocycles, part 3, Oxiranes, edited by Alfred Hasfner, published by John & Wiley and Sons, An Interscience Publication, New York (1985); Yoshimura, Adhesion vol. 29, No. 12, pg. 32 (1985);. Yoshimura, Adhesion vol. 30, No. 5, pg. 42 (1986); Yoshimura, Adhesion vol. 30, No. 7, pg. 42 (1986); as well as JP-A Nos. 11-100378, 4-36263 and 4-69360.

(Cationic Polymerization Initiator, Photo-Acid Generator)

In the active ray curable composition of this invention, a photo-acid generator which generates acid by irradiation of active rays is preferably incorporated.

As a photo-acid generator employed in cationic polymerization type ink, for example, employed, for example, are compounds which are applied for such function as chemically amplifying type photo-resist and photo-cationic polymerization (please refer to "Organic Materials for Imaging", pages 187-192, edited by The Research Group of Organic Electronics Materials, published by Bunshin Shyuppan (1993)). In the following paragraphs, examples compatible with this invention are listed.

Firstly, listed are $B(C_6F_5)_4^-$, $PF_6^-$, $AsF_6^-$ and $SbF_6^-$ salts; as well as sulfonates such as $p\text{-}CH_3C_6H_4SO_3^-$ salt and $CF_3SO_3^-$ salt; also aromatic onium compounds such as diazonium, ammonium, iodonium, sulfonium and phosphonium.

A counter anion is preferably one having a borate compound and $PF_6^-$ salt, with respect to its high acid generating capability. Specific examples of an onium compound are shown below.

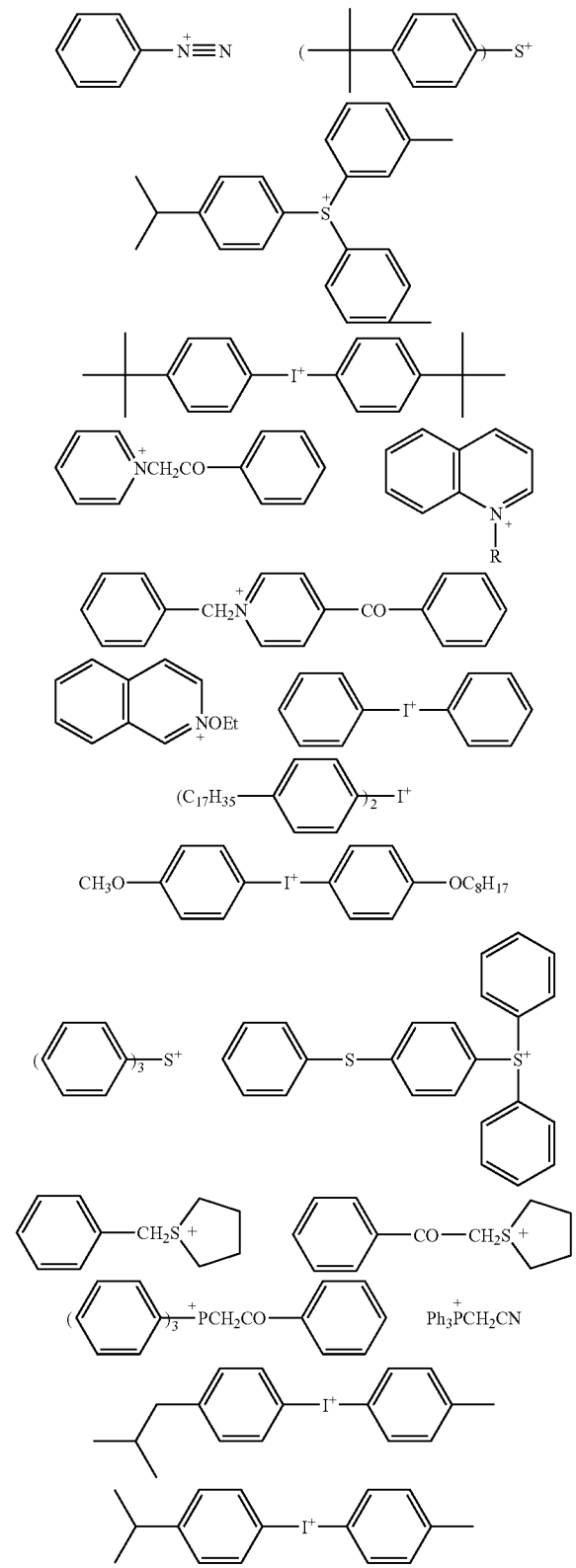

Secondly, listed are sulfonated compounds which generate sulfonic acid, specific examples of which are shown below.

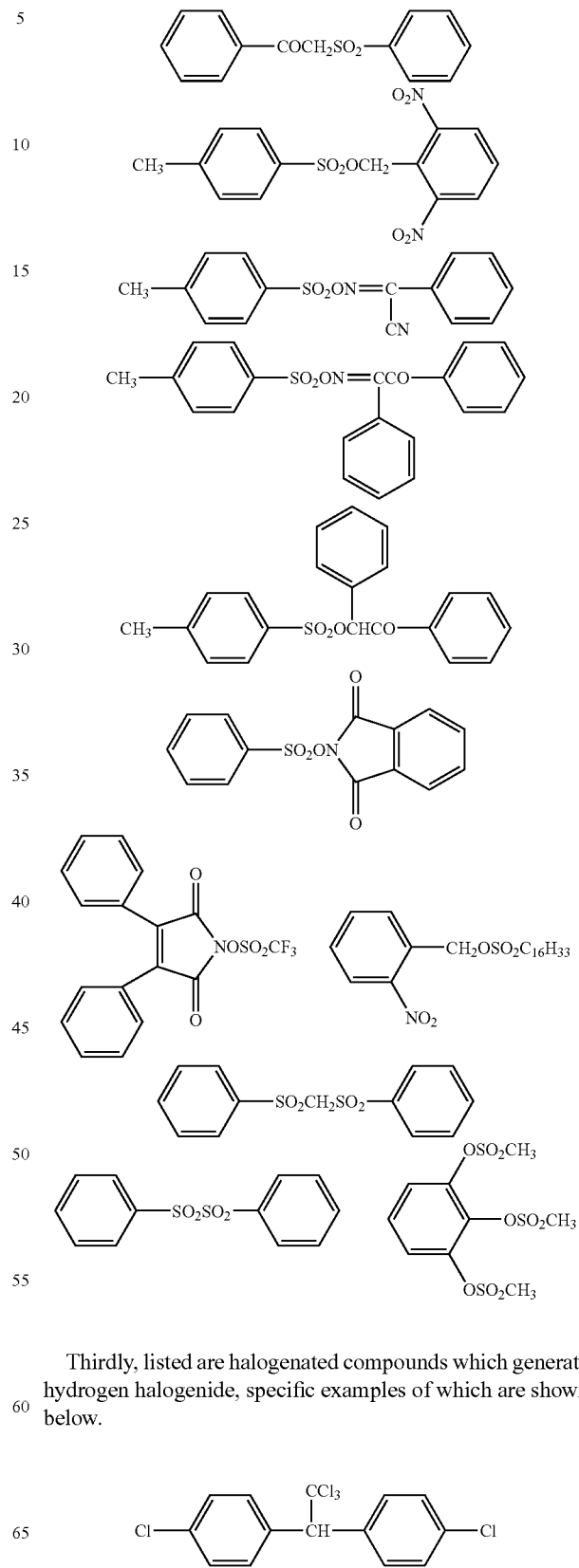

Thirdly, listed are halogenated compounds which generate hydrogen halogenide, specific examples of which are shown below.

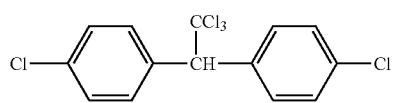

-continued

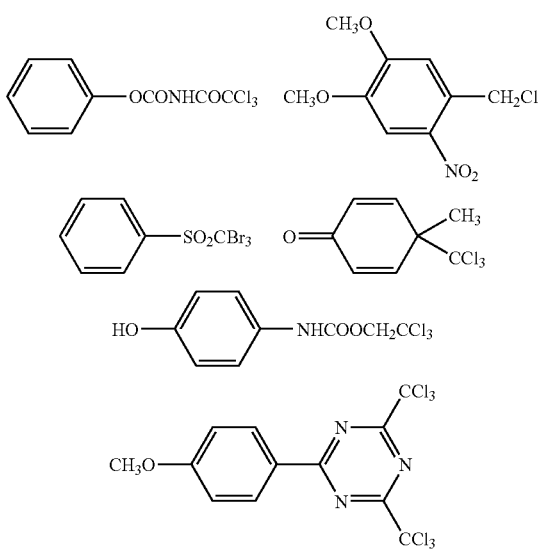

Fourthly, listed can be iron allen complexes.

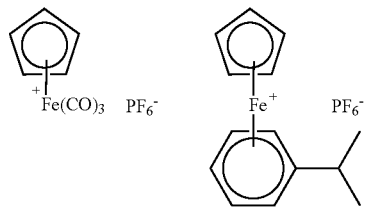

A photo-cationic polymerization initiator utilized in this invention includes acid generators such as aryl sulfonium derivatives (for example, Siracure UVI-6990 and Siracure UVI-6974, manufactured by Union Carbide Corp., Adekaoptomer SP-150, Adekaoptomer SP-152, Adekaoptomer SP-170 and Adekaoptomer SP-172, manufactured by Asahi Denka Industry Co., Ltd.), allyl iodonium salt derivatives (for example, RP-2074, manufactured by Rohdia Corp.), allene-ion complex derivatives (for example, Irgacure 261, manufactured by Ciba-Geigy Corp.), diazonium salt derivatives, triazine type initiators and other halogenide compounds. A photo-cationic polymerization initiator is preferably incorporated at a ratio of 0.2-20 weight parts based on 100 weight parts of a compound exhibiting a cationic polymerizing property. It is difficult to obtain a cured product when the content of a photo-acid generator is less than 0.2 weight parts, while further improved effects of a curing property is not expected even when the content exceeds 20 weight parts. These photocationic polymerization initiators can be utilized by selecting one or at least two types.

Photo-acid generators employable in this invention are preferably onium salts such as a sulfonium salt, an iodonium salt, an ammonium salt and a phosphonium salt, but specifically preferably are sulfonium salt compounds. Structures of the more preferable sulfonium salt compounds include sulfonium salts represented by following Formulas (I-1), (I-2) or (I-3).

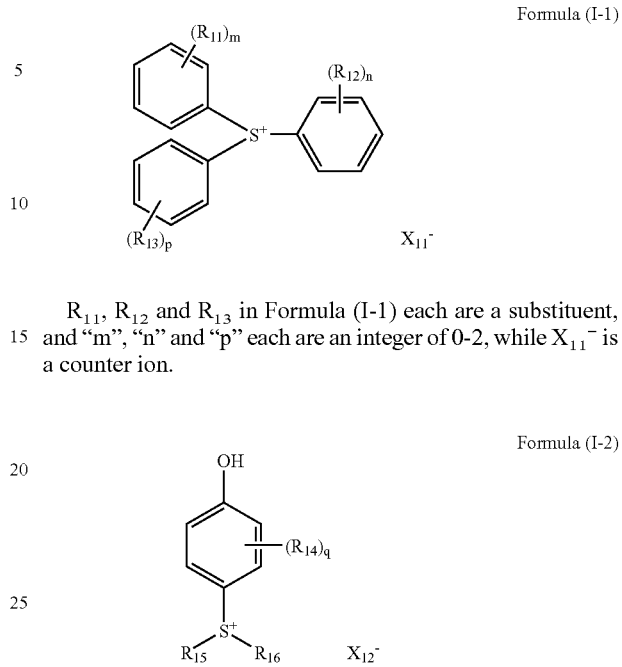

$R_{11}$, $R_{12}$ and $R_{13}$ in Formula (I-1) each are a substituent, and "m", "n" and "p" each are an integer of 0-2, while $X_{11}^-$ is a counter ion.

$R_{14}$ in Formula (I-2) is a substituent, while "q" is an integer of 0-2. $R_{15}$ and $R_{16}$ each are a substituted or unsubstituted alkyl group, a substituted or unsubstituted alkenyl group, a substituted or unsubstituted alkynyl group, or a substituted or unsubstituted aryl group, while $X_{12}^-$ is a counter ion.

$R_{17}$ in Formula (I-3) is a substituent, while "r" is an integer of 0-3. $R_{18}$ is a substituted or unsubstituted alkyl group, and $R_{19}$ and $R_{20}$ each are a substituted or unsubstituted alkyl group, a substituted or unsubstituted alkenyl group, a substituted or unsubstituted alkynyl group, or a substituted or unsubstituted aryl group, while $X_{13}^-$ is a counter ion. Sulfonium salts represented by Formulas (I-1), (I-2) and (I-3) will now be described.

$R_{11}$, $R_{12}$ and $R_{13}$ in Formula (I-1) each are a substituent, examples of the substituents include a halogen atom (such as a chlorine atom, a bromine atom or a fluorine atom), an alkyl group having 1-6 carbon atoms (such as a methyl group, an ethyl group, a propyl group, an iso-propyl group or a butyl group), a cycloalkyl groups having 3-6 carbon atoms (such as a cyclopropyl group, a cyclobutyl group, a cyclopentyl group or a cyclohexyl group), an alkenyl group having 1-6 carbon atoms (such as a vinyl group, a 1-propenyl, a 2-propenyl group or a 2-butenyl group), an alkynyl group having 1-6 carbon atoms (such as an acetylenyl group, a 1-propynyl group, a 2-propynyl group or a 2-butynyl group), an alkoxy groups having 1-6 carbon atoms (such as a methoxy group, an ethoxy group, an n-propoxy group, an iso-propoxy group, an n-butoxy group or a tert-butoxy group), an alkylthio group having 1-6 carbon atoms (such as a methylthio group, an ethylthio group, an n-propylthio group, an iso-propylthio group, an n-butylthio group or a tert-butylthio group), an aryl group having 6-14 carbon atoms (such as a phenyl group, a naphthyl group or an anthrathenyl), an aryloxy group having 6-10 carbon atoms (such as a phenoxy group or a naphthoxy group), an arylthio group having 6-10 carbon atoms (such as a phenythio or a naphthylthio group), an acyl group (such as an acetyl, a propionyl group, a trifluoroacetyl group or benzoyl group), an acyloxy group (such as an acetoxy group, a propionyloxy group, a trifluoroacetoxy group or a benzoyloxy group), an alkoxycarbonyl group (such as a methoxycarbonyl group, an ethoxycarbonyl group or a tert-butoxycarbonyl), a hetero atom-containing aromatic ring group having 4-8 carbon atoms (such as a furyl group or a thienyl group), a nitro group and a cyano group.

Preferable substituents are a halogen atom, an alkyl group, an alkyloxy group, an aryl group, an aryloxy group, an arylthio group and an acyl group.

These substituents may be further substituted when it is possible.

m, n and p each are an integer of 0-2, and each preferably more than or equal to 1.

$X_{11}^-$ represents a counter ion. Counter ions include complex ions such as $BF_4^-$, $B(C_6F_5)_4^-$, $PF_6^-$, $AsF_6^-$ and $SbF_6^-$, sulfonate ions such as $p-CH_3C_6H_4SO_3^-$ and $CF_3SO_3^-$. A counter ion is preferably a borate ion and $PF_6^-$, with respect to high acid generating capability.

$R_{14}$ in Formula (I-2) is a substituent, examples of which include halogen atoms (such as a chlorine atom, a bromine atom and a fluorine atom), an alkyl group having 1-6 carbon atoms (such as a methyl group, an ethyl group, a propyl group, an iso-propyl group or a butyl group), a cycloalkyl group having 3-6 carbon atoms (such as a cyclopropyl group, a cyclobutyl group, a cyclopentyl group or a cyclohexyl group), an alkenyl group having 1-6 carbon atoms (such as a vinyl group, a 1-propenyl group or a 2-butenyl group), an alkynyl group having 1-6 carbon atoms (such as an acetylenyl group, a 1-propynyl group, a 2-propynyl group or a 2-butynyl group), an alkoxy group having 1-6 carbon atoms (such as a methoxy group, an ethoxy group, an n-propoxy group, an iso-propoxy group, an n-butoxy group or a tert-butoxy group), an alkylthio group having 1-6 carbon atoms (such as a methylthio group, an ethylthio group, an n-propylthio group, an iso-propylthio group, an n-butylthio group or a tert-butylthio group), an aryl group having 6-14 carbon atoms (such as a phenyl group, a naphthyl group or an anthrathenyl group), an aryloxy group having 6-10 carbon atoms (such as a phenoxy group or a naphthoxy group), an arylthio group having 6-10 carbon atoms (such as a phenythio group or a naphthylthio group), an acyl group (such as an acetyl, a propionyl group, a trifluoroacetyl group or a benzoyl group), an acyloxy group (such as an acetoxy group, propionyloxy group, a trifluoroacetoxy group or a benzoyloxy group), an alkoxycarbonyl group (such as a methoxycarbonyl group, an ethoxycarbonyl group or a tert-butoxycarbonyl group), a hetero atom-containing aromatic ring group having 4-8 carbon atoms (such as a furyl group or a thienyl group), a nitro group and a cyano group. Preferable substituents are the halogen atom, the alkyl, aryl, alkoxy and aryloxy groups. These substituents may further be substituted when it is possible.

"q" is an integer of 0-2, preferably not less than 1 but more preferably 2. Further, $R_{15}$ and $R_{16}$ each are a substituted or unsubstituted alkyl group, a substituted or unsubstituted alkenyl group, a substituted or unsubstituted alkynyl group, or a substituted or unsubstituted aryl group. Examples of the substituent includes a halogen atom (such as a chlorine atom, a bromine atom or a fluorine atom), an alkyl group having 1-6 carbon atoms (such as a methyl group, an ethyl group, a propyl group, an iso-propyl group or a butyl group), a cycloalkyl group having 3-6 carbon atoms (such as a cyclopropyl group, a cyclobutyl group, a cyclopentyl group or a cyclohexyl group), an alkenyl group having 1-6 carbon atoms (such as a vinyl group, a 1-propenyl group or a 2-butenyl group), an alkynyl group having 1-6 carbon atoms (such as an acetylenyl group, a 1-propynyl group, a 2-propynyl group or a 2-butynyl group), an alkoxy group having 1-6 carbon atoms (such as a methoxy group, an ethoxy group, an n-propoxy group, an iso-propoxy group, an n-butoxy group or a tertbutoxy group), an alkylthio group having 1-6 carbon atoms (such as a methylthio group, an ethylthio group, an n-propylthio group, an iso-propylthio group, an n-butylthio group or a tert-butylthio group), an aryl group having 6-14 carbon atoms (such as a phenyl group, a naphthyl group or an anthrathenyl), an aryloxy groups having 6-10 carbon atoms (such as a phenoxy group or a naphthoxy group), an arylthio group having 6-10 carbon atoms (such as a phenythio group or a naphthylthio group), an acyl group (such as an acetyl, a propionyl group, a trifluoroacetyl group or a benzoyl group), an acyloxy group (such as acetoxy group, propionyloxy group, trifluoroacetoxy group or a benzoyloxy), an alkoxycarbonyl group (such as a methoxycarbonyl group, an ethoxycarbonyl group or a tert-butoxycarbonyl), a hetero atom-containing aromatic ring groups having 4-8 carbon atoms (such as a furyl group or a thienyl group), a nitro group, a cyano group and a hydroxyl group. Preferable substituents are the halogen atom, the alkyl, alkoxy, aryloxy and acyl groups.

$R_{15}$ and $R_{16}$ each are preferably a substituted or unsubstituted alkyl group, or a substituted or unsubstituted aryl group; and the substituent is preferably a halogen atom, an alkyl group, an alkoxy group, an aryl group, an aryloxy group or a hydroxyl group.

$X_{12}^-$ is a counter ion, which includes complex ions such as $BF_4^-$, $B(C_6F_5)_4^-$, $PF_6^-$, $AsF_6^-$ and $SbF_6^-$, and sulfonate ions such as $p-CH_3C_6H_4SO_3^-$ and $CF_3SO_3^-$. Counter ions are preferably a borate ion and $PF_6^-$, with respect to their high acid generating capability.

$R_{17}$ in Formula (I-3) is a substituent, examples of which include a halogen atom (such as a chlorine atom, a bromine atom or a fluorine atom), an alkyl group having 1-6 carbon atoms (such as a methyl group, an ethyl group, a propyl group, an iso-propyl group or a butyl group), a cycloalkyl group having 3-6 carbon atoms (such as a cyclopropyl group, a cyclobutyl group, a cyclopentyl group or a cyclohexyl group), an alkenyl group having 1-6 carbon atoms (such as a vinyl group, a 1-propenyl group or a 2-butenyl group), an alkynyl group having 1-6 carbon atoms (such as an acetylenyl group, a 1-propynyl group, a 2-propynyl group or a 2-butynyl group), an alkoxy group having 1-6 carbon atoms (such as a methoxy group, an ethoxy group, an n-propoxy group, an iso-propoxy group, an n-butoxy group or a tert-butoxy group), an aryl group having 6-14 carbon atoms (such as a phenyl group, a naphthyl group or an anthrathenyl group), an aryloxy group having 6-10 carbon atoms (such as a phenoxy group or a naphthoxy group), an acyl group (such as an acetyl group, a propionyl group, a trifluoroacetyl group or benzoyl group), an acyloxy group (such as an acetoxy group, a propionyloxy group, a trifluoroacetoxy group or a benzoyloxy group), an alkoxycarbonyl group (such as a methoxycarbonyl group, an ethoxycarbonyl group or a tert-butoxycarbonyl group), an aryl group having 6-10 carbon atoms (such as a phenyl group, a naphthyl group or an anthrathenyl group), a hetero atom-incorporating aromatic ring group having 4-8 carbon atoms (such as a furyl group or a thienyl group), as well as a nitro group and a cyano group. Preferable substituents are the halogen atom, the alkyl, aryl, alkoxy and aryloxy groups.

Preferable substituents are the halogen atom, the alkyl, alkoxy, aryl aryloxy and acyl groups.

"r" is an integer of 0-3, preferably not less than 1 but more preferably 2.

$R_{18}$ is a hydrogen atom or a substituted or unsubstituted alkyl group, while $R_{19}$ and $R_{20}$ each are a substituted or unsubstituted alkyl group, a substituted or unsubstituted alkenyl group, a substituted or unsubstituted alkynyl group, or a substituted or unsubstituted aryl group. Examples of these substituents include a halogen atom (such as a chlorine atom, a bromine atom and a fluorine atom), an alkyl group having 1-6 carbon atoms (such as a methyl group, an ethyl group, a propyl group, an iso-propyl group or a butyl group), a cycloalkyl group having 3-6 carbon atoms (such as a cyclopropyl group, a cyclobutyl group, a cyclopentyl group or a cyclohexyl group), an alkenyl group having 1-6 carbon atoms (such as a vinyl group, a 1-propenyl group or a 2-butenyl group), an alkynyl group having 1-6 carbon atoms (such as an acetylenyl group, a 1-propynyl group, a 2-propynyl group or a 2-butynyl group), an alkoxy group having 1-6 carbon atoms (such as a methoxy group, an ethoxy group, an n-propoxy group, an iso-propoxy group, an n-butoxy group or a tert-butoxy group), an aryl group having 6-14 carbon atoms (such as a phenyl group, a naphthyl group or an anthrathenyl group), an acyl group (such as an acetyl group, a propionyl group, a trifluoroacetyl group or a benzoyl group), an acyloxy group (such as an acetoxy group, a propionyloxy group, a trifluoroacetoxy group or a benzoyloxy), an alkoxycarbonyl group (such as a methoxycarbonyl group, an ethoxycarbonyl group or a tert-butoxycarbonyl group), a hetero atom-incorporating aromatic ring group having 4-8 carbon atoms (such as a furyl group or a thienyl group), in addition to a nitro group and a cyano group. Preferable substituents are the halogen atom, the alky, aryl, alkoxy, aryloxy and acyl groups.

$R_{18}$ preferably is a hydrogen atom or an unsubstituted lower alkyl group (such as a methyl group, an ethyl group or a propyl group), and $R_{19}$ and $R_{20}$ each are preferably a substituted or unsubstituted alkyl group, or a substituted or unsubstituted aryl group which are preferably the halogen atom, the alkyl, alkoxy, aryl, aryloxy or the acyl group.

$X_{13}^-$ is a counter ion, which include complex ions such as $BF_4^-$, $B(C_6F_5)_4^-$, $PF_6^-$, $AsF_6^-$ and $SbF_6^-$, and sulfonate ions such as p-$CH_3C_6H_4SO_3^-$ and $CF_3SO_3^-$. The counter ion is preferably a borate ion or $PF_6^-$, due to its high acid generating capability.

In the following pages, specific examples of sulfonium compounds represented by Formulas (I-1), (I-2) and (I-3) will be shown, however, this invention is not limited thereto.

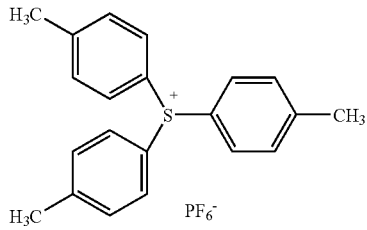

PI-1

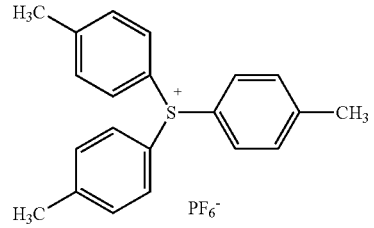

PI-2

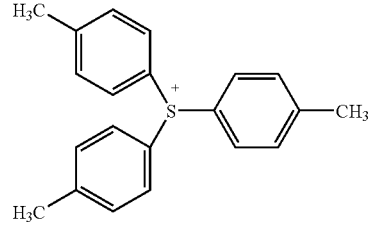

PI-3

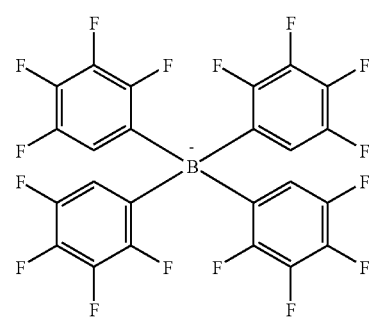

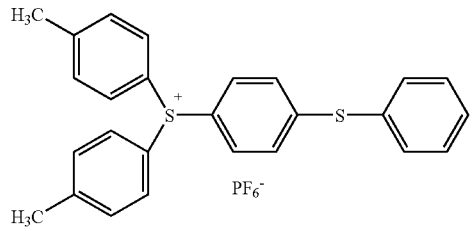

PI-4

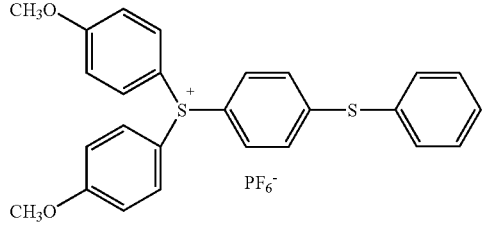

PI-5

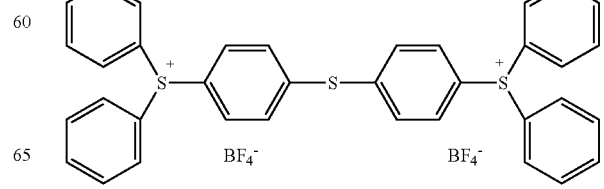

PI-6

-continued
PI-7
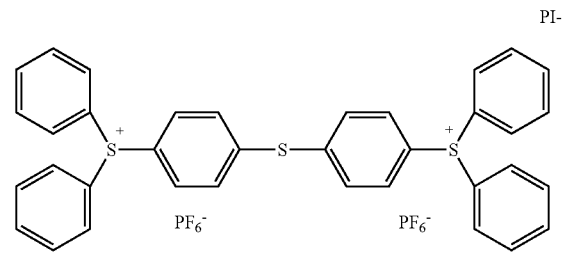
PI-8
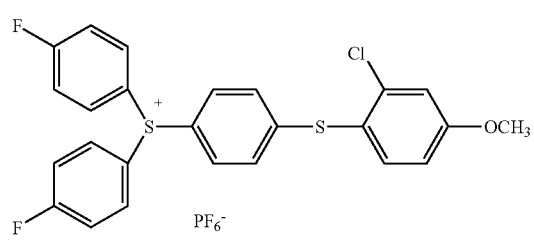
PI-9
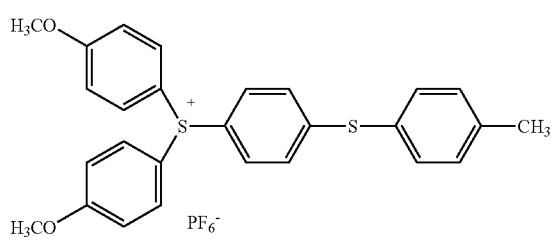
PI-10
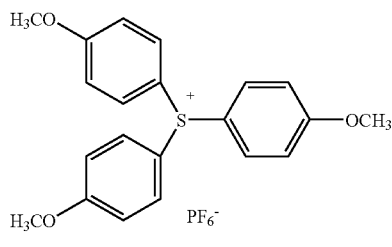
PI-11
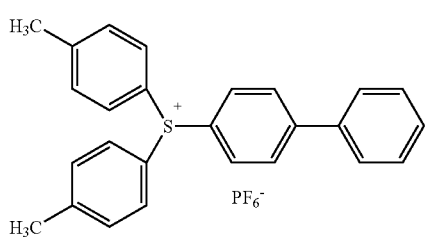
PI-12
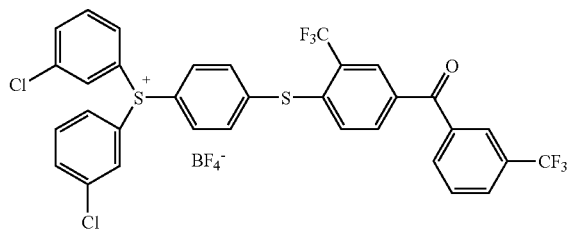
-continued
PI-13
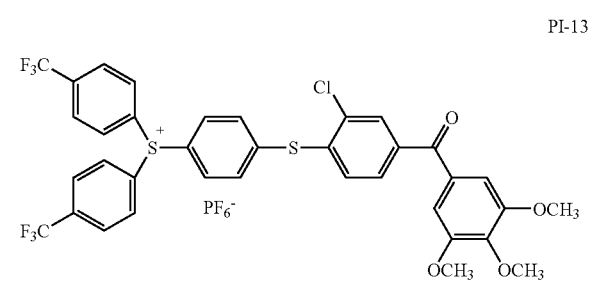
PI-14
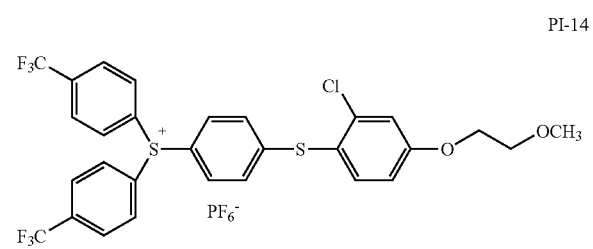
PI-15
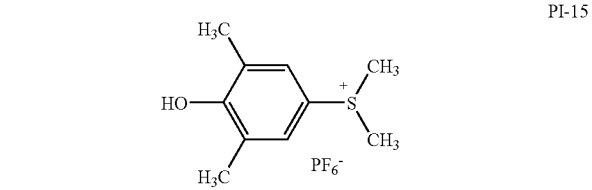
PI-16
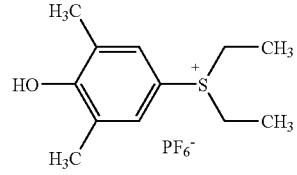
PI-17
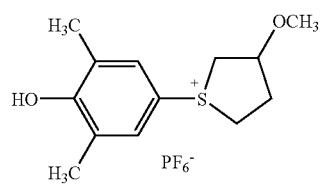
PI-18
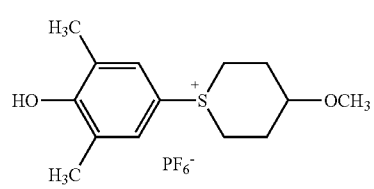
PI-19
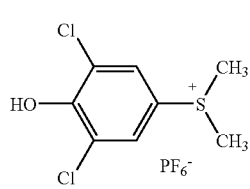

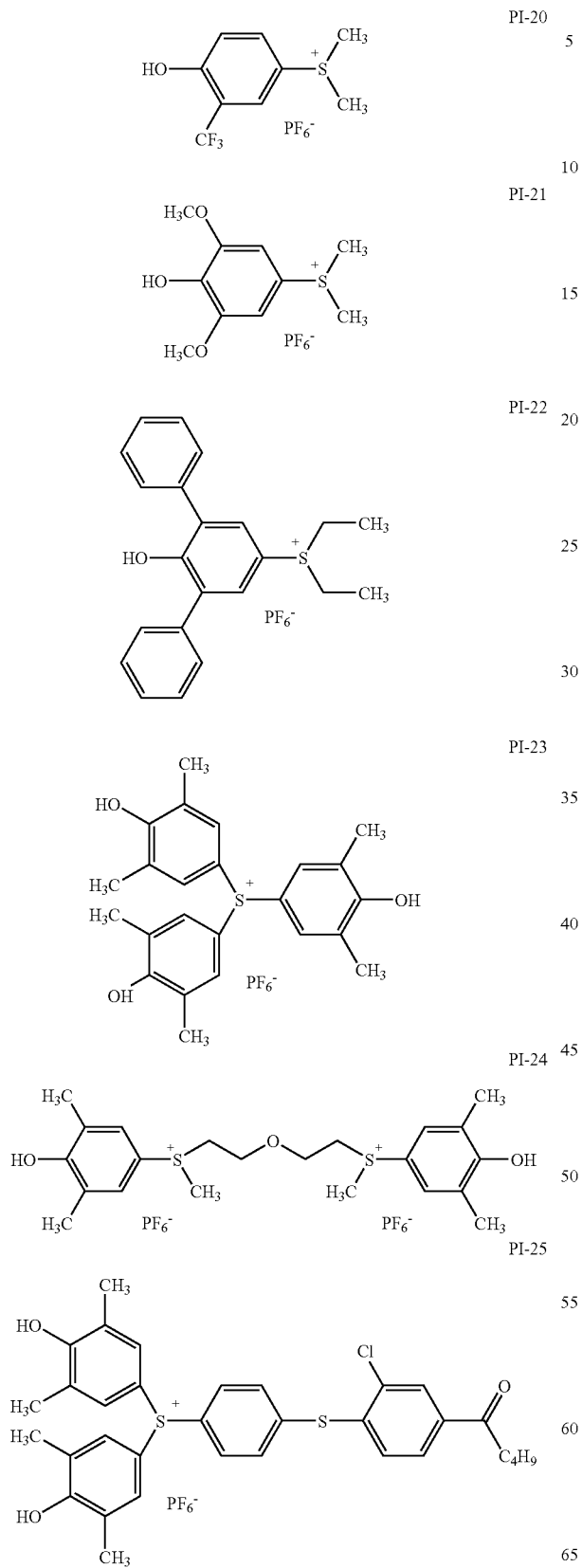

-continued

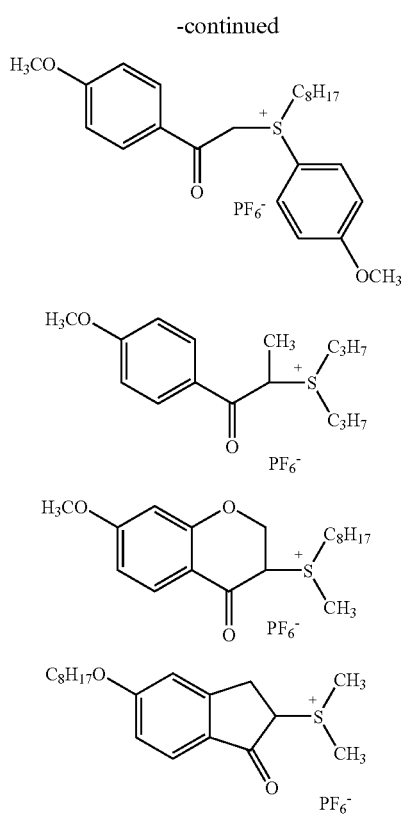

Photo-polymerization accelerators include anthrathene, anthrathene derivatives (for example, Adekaoptomer SP-100, manufactured by Asahi Denka Industry Co., Ltd.), phenothiazine (10-phenothiazine), phenothiazine derivatives (for example, 10-methylphenothiazine, 10-ethylphenothiazine, 10-decylphenothiazine, 10-acetylphenothiazine, 10-decylphenothiazine-5-oxide, 10-decylphenothiazine-5,5-dioxide and 10-acetylphenothiazine-5,5-dioxide). These photo-polymerization accelerators may be employed alone or in combinations of several types.

Pigment/Other Additives

In the active ray curable composition of this invention, various types of additives may be employed, other than the constituent elements described above.

As a colorant employable in the active ray curable ink using the active ray curable composition of this invention, and in the ink-jet ink using the active ray curable ink of this invention (hereinafter, referred to as "ink-jet ink of this invention" or "ink-jet ink"), a colorant which can be dissolved or dispersed in the primary component of a polymerization compound may be employed, however, pigments are preferred due to their weather resistance.

Pigments preferably employable in this invention are listed below.

C. I. Pigment Yellow—1, 3, 12, 13, 14, 17, 81, 83, 87, 95, 109 and 42

C. I. Pigment Orange—16, 36 and 38

C. I. Pigment Red—5, 22, 38, 48:1, 48:2, 48:4, 49:1, 53:1, 57:1, 63:1, 144, 146, 185 and 101

C. I. Pigment Violet—19 and 23

C. I. Pigment Blue—15:1, 15:3, 15:4, 18, 27, 29 and 60

C. I. Pigment Green—7 and 36

C. I. Pigment White—6, 18 and 21, and,

C. I. Pigment Black—7

For dispersion of above pigments, employed may be such devices as a ball mill, an atleiter, a roll mill, an agitator, a Henchel Mixer, a colloidal mill, an ultrasonic homogenizer, a pearl mill, a wet type jet mill or a common paint shaker. A dispersant may also be added at the time of dispersion of the pigment. The dispersant is preferably a polymer dispersant, an example of which includes the Solsperese Series manufactured by Avecia Corp. Further, as a dispersion aid, utilized may be synergists corresponding to various types of pigments. These dispersant and dispersion aids are preferably added at 1-50 weight parts based on 100 weight parts of pigment. A solvent or a polymerization compound is utilized as a dispersion medium, however, solvents are not preferred in active ray curable ink utilized in this invention to perform the reaction•curing immediately after ink deposition. When a solvent remains in a cured image, raised are problems of deterioration of solvent resistance and VOC of the residual solvent. Therefore, a dispersion medium, preferably a polymerization compound, and, in particular, preferable is to select a monomer having the lowest viscosity with respect to dispersion adaptability.

In dispersion of a pigment, the average particle diameter of pigment particles is preferably 0.08-0.5 μm, and the maximum particle diameter is 0.3-10 μm and preferably 0.3-3 μm by selection of specific pigments, a dispersant and a dispersion medium, and suitable setting of dispersion and filtration conditions. By such particle size control, it is possible to reduce clogging of head nozzles, as well as to maintain storage stability, transparency and curing sensitivity of the ink.

In the ink-jet ink of this invention, the colorant concentration is preferably 1-10 weight % based on the total ink weight %.

In this invention, a thermal base generating agent may also be employed to improve ejection stability and storage stability.

As a thermal base generating agent, preferably employed are, for example, a salt of an organic acid and a base, which decomposes by decarboxylation with heating, a compound which decomposes to release amines via an intra-molecular nucleophilic substitution reaction, reactions such as Lossen rearrangement and Beckmann rearrangement, and those agents causing a some reaction with heat to release a base. Specifically useful are, a salt of trichloroactate described in BP No. 998,949, a salt of α-sulfonylacetate described in U.S. Pat. No. 4,060,420, a salt of propiolic acids described in JP-A 59-157637, 2-carboxycarboxamide derivatives, a salt incorporating a thermally decomposing acid employing an alkali metal or alkaline earth metal in addition to an organic base as a base component, described in JP-A 59-168440; hydroxame carbamates utilizing Lossen rearrangement described in JP-A 59-180537, and aldoxime carbamates which generate nitrile via heating described in JP-A 59-195237. In addition to these, useful are thermal base generating agents described in BP No. 998,945, U.S. Pat. No. 3,220,846, BP No. 279,480, JP-A Nos. 50-22625, 61-32844, 61-51139, 61-52638, 61-51140, 61-53634, 61-53640, 61-55644 and 61-55645. Further, specific examples of thermal base generating agents include, guanidine trichloroacetate, methylguanidine trichloroacetate, potassium trichloroacetate, guanidine phenylsulfonylacetate, guanidine p-chlorophenylsulfonylacetate, guanidine p-methanesulfonylphenylsulfonylacetate, potassium phenylpropiolate, guanidine phenylpropiolate, cesium phenylpropiolate, guanidine p-chlorophenylpropiolate, guanidine p-phenylene-bisphenylpropiolate, tetramethylammonium phenylsulfonylacetate and tetramethylammonium phenylsulfonylpropiolate. The thermal base generating agents described above may be employed at a broad range of addition amount.

An ink-jet ink of this invention may contain acid multiplying agents, which newly generate an acid via an acid generated by irradiation of active rays, which are disclosed in such as JP-A Nos. 8-248561 and 9-34106, but are also commonly known in the art.

The ink-jet ink of this invention is manufactured by appropriately dispersing pigment in addition to an active ray curable compound and a pigment dispersant via an ordinary homogenizer such as a sand mill. It is preferable to prepare in advance a highly concentrated solution of pigment and which is diluted with an active ray curable compound. Since sufficient dispersion is possible with ordinary homogenizers, negating excess dispersion energy, nor is much dispersion time required, whereby barely modifying ink components at the time of dispersion, resulting in preparation of ink exhibiting excellent overall stability. Ink is preferably filtered employing a filter of less than 3 µm, more preferably less than 1 µm.

Viscosity and Other Physical Properties

It is preferable that the viscosity of the active ray curable composition of this invention is controlled to be 1-500 mPa·s at 25° C.

Ink-jet ink of this invention is adjusted its viscosity to be as high as 7-40 mPa·s at 25° C. Ink exhibiting a viscosity of 7-40 mPa·s at 25° C. exhibits stable ejection characteristics, especially with a head provided with a common frequency of 4-10 kHz, as well as with a head driven by a frequency of as high as 10-50 kHz. When the viscosity is less than 7 mPa·s, deterioration of ejection following property at high frequency is observed, while when the viscosity is over 40 mPa·s, deterioration of ejection follows even with a viscosity lowering mechanism such as heating the head, resulting from unstable to no ejection.

Further, the ink-jet ink of this invention, when applied in a piezo head, is preferably provided with an electrical conductivity of not more than 10 µS/cm, so as to eliminate electrical corrosion inside the head. Further, in the case of continuous type ejection, electrical conductivity adjustment via an electrolyte is necessary and the electric conductivity needs to be adjusted to at least 0.5 mS/cm.

In this invention, the surface tension at 25° C. of ink is preferably in a range of 25-40 mN/m. Stable ejection is infrequent when the surface tension at 25° C. of ink is less than 25 mN/m, while the desired dot diameter can not be obtained when it is over 40 mN/m. Beyond the range of 25-40 mN/m, it is difficult to obtain uniform dot diameter even when ejection and light irradiation are performed while controlling such parameters as viscosity and water content of ink on various substrates.

To adjust the surface tension, a surface active agent may be appropriately incorporated. Surface active agents utilized in this invention include, for example, anion surface active agents such as dialkylsuccinates, alkylnaphthalenesulfonates and fatty acid salts, nonionic surface active agents such as polyoxyethylene alkylethers, polyoxyethylene alkylalylethers, acetyleneglycols, polyoxyethylene block copolymers, cationic surface active agents such as alkylamine salts and quarternary ammonium salts, and surface active agents provided with a polymerizing group. Of these, particularly, preferable are surface active compounds provided with an polymerizing group such as an unsaturated bond, oxirane and oxetane rings, such as silicone modified acrylate, fluorine modified acrylate, silicone modified epoxy, fluorine modified epoxy, silicone modified oxetane and fluorine modified oxetane.

In the ink-jet ink composition of this invention, various additives other than those described above may be employed. For example, added may be a leveling additive, a matting agent, polyester type resin, polyurethane type resin, vinyl type resin, acryl type resin, rubber type resin and waxes, which adjust physical film properties. It is also effective to add a very tiny amount of an organic solvent to improve adhesion to the recording medium. In this case, addition in a range of promoting solvent resistance and of VOC is effective and the used amount is in the range of 0.1-5.0% but preferably 0.1-3.0%. Further, it is also possible to make a hybrid type ink of radical•cation by combining a radical polymerization monomer and an initiator.

Volume of Droplets, Timing of Irradiation, Heating of Head

In an image forming method of this invention, the ink composition is ejected and deposited on a recording material by an ink-jet recording method, and ink is subsequently cured via irradiation of active rays, such as ultraviolet rays.

In an image forming method of this invention, it is preferable to make a liquid ink be of low viscosity at the time of ejection by heating ink simultaneously with the ink-jet nozzle, at a temperature range of 30-80° C. but preferably 35-60° C.

In this invention, the total deposited ink layer thickness is preferably 2-20 µm, after curing via active ray irradiation. Via active ray curable ink-jet recording in a screen printing application, the total ink layer thickness is presently over 20 µm, however, it is not feasible in soft package printing applications in which a recording material is often a thin plastic material since it causes problems such as stiffness, and texture of the whole printed matter material may also cause significant problems of curling and wrinkling of the such recoding material. Further, in this invention, the volume of droplets ejected from the nozzles is preferably 2-15 pl.

In this invention, timing of irradiation is preferably as soon as possible to form highly precise images, however, irradiation is preferably started only after viscosity or water-content of the ink becomes optional.

More specifically, the irradiation condition of active rays is preferably started 0.001-2.0 second after ink deposition but more preferably 0.001-0.4 second. Further, irradiation is preferably terminated after loss of fluidity of the ink 0.1-3.0 seconds but preferably in 0.2-1.0 second. By setting the above conditions, spreading of dot diameter or bleeding of dots can be prevented.

As an active ray irradiation method, disclosed is the fundamental method in JP-A 60-132767. Based on that invention, light sources are arranged on the both sides of a recording head unit, and a recording head and a light source scan via a shuttle means. Irradiation is performed after a certain time interval following ink deposition. Further, curing is accomplished by a separate undriven light source. In U.S. Pat. No. 6,145,979, disclosed are irradiation methods which employ optical fibers, collimated light directed onto a mirrored surface provided on the recording head unit side and UV light irradiated onto the recording medium. In an image forming method of this invention, any of these irradiation methods may be employed.

Further, a preferable embodiment is a method in which active ray irradiation is divided into two steps, whereby active rays are firstly irradiated according to the foregoing method 0.001-2.0 seconds after ink deposition, followed by further irradiation of active rays after the entire sheet is printed.

Thereby it is possible to reduce shrinkage of the recording sheet caused at the time of ink curing by dividing active ray irradiation into two steps.

Examples of light sources employed in active ray irradiation include such as a mercury arc lamp, a xenon arc lamp, a fluorescent lamp, a carbon arc lamp, a tungsten-halogen copy lamp, a high pressure mercury lamp, a metal halide lamp, an electrodeless UV lamp, a low pressure mercury lamp, a UV laser, a xenon flash tube, a light trap lamp, a black light, a sterilizing lamp, a cold cathode tube and an LED, however, this is not an exclusive list. Of these, the fluorescent lamp is preferred due to low energy consumption and a low initial cost. The peak emission wavelength of light source is 250-370 nm but preferably 270-320 nm, with respect to sensitivity. The illuminance is commonly 1-3,000 mW/cm$^2$ but preferably 1-200 mW/cm$^2$. Further, in the case of curing by electron rays, curing is generally performed at an energy of at most 300 eV, however, almost instantaneous curing is also possible at an irradiation energy of 1-5 Mrad.

Image printing performed on a recording medium (also referred to as a substrate) via the ink-jet ink composition of this invention, a recording medium may be any of a variety of synthetic resins, which have been conventionally employed for various purposes, but specifically include such as polyester, polyvinyl chloride, polyethylene, polyurethane, polypropylene, acrylic resin, polycarbonate, polystyrene, an acrylonitrile-butadiene-styrene copolymer, polyethyleneterephthalate and polybutadieneterephthalate. The thickness and a shape of these resin substrates is basically not limited.

As a substrate employable in this invention, employed may be a non-absorptive substrate in addition to ordinary coated and non-coated paper, but non-absorptive substrates among these is preferably employed.

As a non-absorptive substrate in this invention, employed may be various types of non-absorptive plastic and films thereof, and various types of such plastic films include, for example, PET film, OPS film, OPP film, ONy film, PVC film, PE film and TAC film. As other plastics, polycarbonate, acrylic resin, ABS, polyacetal, PVA and various types of rubber may be employed. Further, metals and glasses are also applicable. The composition of this invention is effective in forming images on PET film, OPS film, OPP film, ONy film and PVC film, which shrink upon heat. In these substrates, curling and deformation of film are common due to curing and shrinkage of the ink, or heat at the time of the curing reaction, and the ink layer shrinkage is not compatible with shrinkage of the substrate.

The surface energy of each type of plastic film described above significantly differs from each other, having been a major problem, in that a dot diameter after deposition will vary depending on the recording medium. Although OPP film at a low surface energy, as well as OPS film at a relatively high surface energy is included in the constitution of this invention, the wettability index as a substrate is preferably 40-60 mN/m.bb.

In this invention, it is advantageous to employ a long web of recording material, due to considerations of recording material cost, packaging expense, manufacturing cost, print operation efficiency and adaptability to a variety of sizes of printing media.

Next, a recording apparatus of this invention will be described.

In the following paragraphs, the recording apparatus of this invention will be described, referring to appropriate drawings. Herein, the recording apparatus of the drawings is only an embodiment of this invention and the recording apparatus of this invention is not limited these drawings.

FIG. 1 is a front view drawing showing the primary portions of a recording apparatus of this invention. Recording apparatus 1 is equipped with head carriage 2, recording head 3, irradiation means 4 and platen portion 5. In recording apparatus 1, platen portion 5 is arranged under recording material P. Platen portion 5 functions to absorb UV rays and absorbs excess UV rays having passed through recording material P. As a result, a highly precise image can be very stably reproduced.

Recording material P is transported while guided by guiding member 6 from the front side to the interior of FIG. 1 by the movement of a transporting means (not shown in the drawing). Head scanning means (also not shown in the drawing) performs scanning of recording head 3 integrated with head carriage 2 by reciprocal motion of head carriage 2 in the Y direction of FIG. 1.

Arranged is head carriage 2 above recording material P, on which mounted are a plurality of recording head 3, corresponding to the number of colors utilized in image printing, by arranging the ejection outlets downward. Head carriage 2, driven by a head scanning means, is arranged to reciprocate along direction Y of FIG. 1 within the main body of recording apparatus 1, and transfers back and forth along the Y direction of FIG. 1.

Herein, FIG. 1 illustrates that head carriage 2 is structured of recording head 3 of white (W), yellow (Y), magenta (M), cyan (C), black (K) and white (W), however, the number of colors of recording head 3 stored in head carriage 2 is appropriately determined depending on actual cases.

Recording head 3 ejects active ray curable ink toward recording material P, which is supplied via an ink supplying means (not shown in the drawing), from an ejection outlet via a plural number of ejection nozzles (not shown in the drawing) arranged inside the recording head. Ultraviolet ray curable ink, ejected from recording head 3, is comprised of a colorant, a polymerizing monomer and an initiator, and is provided with the capability of being cured by a cross-linking and polymerization reaction of a monomer incorporating also the function of an initiator as a catalyst upon irradiation.

Recording head 3 ejects ultraviolet curable ink as drops on a predetermined locations of recording material P, and deposits ink drops onto said locations where designated, during driven scanning of the recording head along the Y direction of FIG. 1, from one edge to the other of recording material P.

After suitably performing the above scanning the required number while ejecting ultraviolet curable ink within the regions where deposition is intended, recording material P is appropriately transferred from the front side to the back direction of FIG. 1 via a transport means and ejection of ultraviolet curable ink by recording head 3 is performed within the next region where deposition is intended and adjacent, in the back direction of FIG. 1, to the above-described region where deposition is intended, while being scanned is repeated by the head scanning means.

An image, comprised of a pattern of ultraviolet curable ink drops is formed on recording material P by repeating the above operation while ejecting ultraviolet curable ink from recording head 3, synchronously with the head scanning means and the transfer means.

Irradiation means 4 is constituted of an ultraviolet lamp, which emits ultraviolet rays within a specific wavelength region at stable exposure energy, and a filter which transmits only ultraviolet rays of a specific wavelength. Herein, as an ultraviolet lamp, applicable are a mercury lamp, a metal halide lamp, an eximer laser, an ultraviolet laser, a cold cathode tube, a black light, and an LED (light emitting diode). A belt form metal halide lamp tube, a cold cathode tube, a mercury lamp tube or a black light is preferred. Specifically, a cold cathode tube and a black light which emit ultraviolet rays of 365 nm are preferred due to prevention of bleeding and efficient dot diameter control, as well as a decrease of wrinkling during curing. Irradiation means 4, used to cure ultraviolet ray curable ink, can be operated at low cost by utilizing a black light as a radiation source.

Irradiation means 4 is nearly the same dimension as the recording apparatus (being an ultraviolet ray curable type ink-jet printer) 1 or not smaller than the region where deposition is intended, within the region in which ultraviolet ray curable ink is ejected and deposited, by recording head 3 in one scanning by operation of the head scanning means.

Irradiation means 4 is arranged by being fixed on both ends of head carriage 2, nearly parallel to recording material P.

As a means to control illuminance at the ink ejection portion, as described above, most effective is naturally to shield entire recording head 3, in addition to this, effective is to make distance h2 between ink ejection portions 31 of recording head 3 and recording material P larger than distance h1 between irradiation means and recording material P (h1<h2), or to increase distance d between recording head 3 and irradiation means 4 (increasing d). Further, the space between recording head 3 and irradiation means 4 is more preferably covered by accordion structure 7.

Herein, the wavelength of ultraviolet rays of irradiation means 4 can be appropriately changed by changing the ultraviolet ray lamp or the filter, which are mounted in irradiation means 4.

Figure 2:
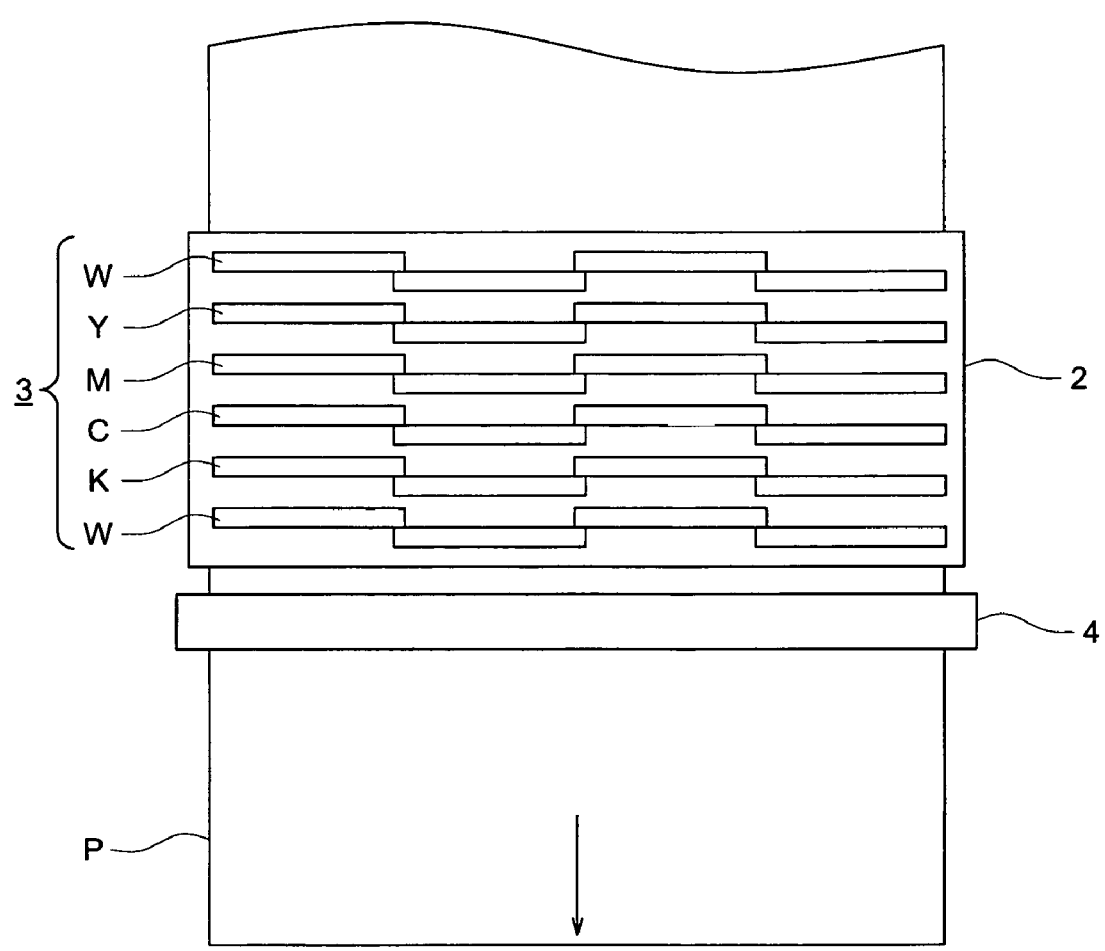
FIG. 2 is a drawing showing another example of the primary constitution of an inkjet recording apparatus.

FIG. 2 shows another example of the primary structure of an ink-jet recording apparatus.

The ink-jet recording apparatus in FIG. 2 is called a line head mode apparatus, in which a plural number of ink-jet recording heads 3 of each color is arranged and fixed on head carriage 2 to enable covering the entire width of recording material P. Head carriage 2 is shielded from light.

On the other hand, irradiation means 4, which is arranged so as to similarly treat the entire width of recording material P, and to cover the whole area of the ink printed sheet, is provided downstream of head carriage 2. As an ultraviolet lamp utilized in irradiation means 4, employed may be those similar to that described in FIG. 1.

In this line head mode, head carriage 2 and irradiation mean 4 are fixed and ink ejection and curing are performed while only recording material P is transported, resulting in image formation.

EXAMPLES

Example 1

Preparation of Curing Composition

A photopolymerization compound, a photopolymerization initiator, a compound of this invention and other additives were added and dissolved as shown in Tables 1 and 2 to prepare photo-curable compositions.

Curing of Curable Composition

A coated layer was formed and cured using the following method. The obtained curable composition was coated on a synthetic paper sheet (Synthetic Paper Upo FGS, produced by Upo Corporation) to a layer thickness of 3 μm, followed within 1 second by irradiation with 800 mJ/cm$^2$ ultraviolet rays via a metal halide lamp, resulting in preparation of a cured product.

Evaluation Method of Cured Product

The physical properties of the obtained cured product were evaluated by the tests shown in the following paragraphs.

1) Pencil Scratch Test: The hardness of each cured product was measured via named "Mitsubishi Uni" pencils with a load of 1,000 g, based on JIS K 5400.

That is, the hardness of a cured layer was tested by a test method employing a pencil scratch tester based on JIS K 5401. The load was 1,000 g and a Mitsubishi Uni pencil was utilized. The evaluation was based on frictional drag on a coated layer. When using two pencils having adjacent density marks, and one group exhibits frictional drags at scratching of at least twice and the other exhibits less than twice, the density mark of a pencil which exhibits frictional drags at scratching of less than twice was designated as a pencil scratch value.

2) Residual Grid Adhesion Ratio Test by Tape Peeling: After adhesive tape was applied onto the cured composition sample in a grid test based on JIS K 5400, followed by being pressed by a single back and forth pass with a 2 kg roller, the tape was quickly peeled off, and the residual number of grid samples was counted.

3) Evaluation of Flexibility: A curable composition was applied onto a synthetic paper sheet (Synthetic Paper Upo FGS produced by Upo Corporation) to a layer thickness of 30 μm, followed by irradiation within 1 second with 800 mJ/cm2 ultraviolet rays from a metal halide lamp to prepare a cured product. The obtained cured layer was evaluated based on the JIS K 5600 bending resistance test, the result of which are shown in Table 3.

TABLE 1

| Sample No. | Mono-functional epoxy compound Type | *1 | Oxetane compound Type | *1 | Poly-functional epoxy compound Type | *1 | Photo-acid generator Type | *1 | Basic compound Type | *1 | Remarks |
|---|---|---|---|---|---|---|---|---|---|---|---|
| 1 | SEP-2 | 10 | OXT-221 | 80 | | | UVI-6992 | 5.0 | A | 0.5 | Invention |
| 2 | SEP-9 | 10 | OXT-221 | 80 | | | UVI-6992 | 5.0 | A | 0.5 | Invention |
| 3 | SEP-12 | 10 | OXT-221 | 80 | | | UVI-6992 | 5.0 | A | 0.5 | Invention |
| 4 | SEP-13 | 10 | OXT-221 | 80 | | | UVI-6992 | 5.0 | A | 0.5 | Invention |
| 5 | SEP-18 | 10 | OXT-221 | 80 | | | UVI-6992 | 5.0 | A | 0.5 | Invention |
| 6 | SEP-19 | 10 | OXT-221 | 80 | | | UVI-6992 | 5.0 | A | 0.5 | Invention |
| 7 | SEP-46 | 10 | OXT-221 | 80 | | | SP-152 | 5.0 | B | 0.5 | Invention |
| 8 | SEP-53 | 10 | OXT-221 | 80 | | | SP-152 | 5.0 | B | 0.5 | Invention |
| 9 | SEP-56 | 10 | OXT-221 | 80 | | | PI-1 | 5.0 | A | 0.5 | Invention |
| 10 | SEP-57 | 10 | OXT-221 | 80 | | | PI-1 | 5.0 | A | 0.5 | Invention |

TABLE 1-continued

| Sample No. | Monofunctional epoxy compound Type | *1 | Oxetane compound Type | *1 | Poly-functional epoxy compound Type | *1 | Photo-acid generator Type | *1 | Basic compound Type | *1 | Remarks |
|---|---|---|---|---|---|---|---|---|---|---|---|
| 11 | SEP-62 | 10 | OXT-221 | 80 | | | PI-1 | 5.0 | A | 0.5 | Invention |
| 12 | SEP-63 | 10 | OXT-221 | 80 | | | PI-1 | 5.0 | A | 0.5 | Invention |
| 13 | SEP-12 | 20 | OXT-221 | 60 | Celloxide 2021P | 20 | PI-2 | 5.0 | A | 0.5 | Invention |
| 14 | SEP-19 | 20 | OXT-221 | 60 | Celloxide 2021P | 20 | PI-2 | 5.0 | A | 0.5 | Invention |
| 15 | SEP-56 | 20 | OXT-221 | 60 | EP-89 | 20 | PI-2 | 5.0 | B | 0.5 | Invention |
| 16 | SEP-63 | 20 | OXT-221 | 60 | EP-89 | 20 | PI-2 | 5.0 | B | 0.5 | Invention |
| 17 | SEP-12 | 20 | OXT-212 | 40 | Celloxide 2021P | 40 | PI-10 | 5.0 | B | 0.5 | Invention |
| 18 | SEP-19 | 20 | OXT-212 | 40 | Celloxide 2021P | 40 | PI-10 | 5.0 | B | 0.5 | Invention |
| 19 | SEP-56 | 20 | OXT-212 | 40 | EP-89 | 40 | PI-10 | 5.0 | B | 0.5 | Invention |
| 20 | SEP-63 | 20 | OXT-212 | 40 | EP-89 | 40 | PI-10 | 5.0 | B | 0.5 | Invention |

*1: Addition amount (weight parts)

TABLE 2

| Sample No. | Monofunctional epoxy compound Type | *1 | Oxetane compound Type | *1 | Poly-functional epoxy compound Type | *1 | Photo-acid generator Type | *1 | Basic compound Type | *1 | Remarks |
|---|---|---|---|---|---|---|---|---|---|---|---|
| 21 | SEP-134 | 10 | OXT-221 | 80 | | | PI-1 | 5.0 | A | 0.5 | Invention |
| 22 | SEP-136 | 10 | OXT-221 | 80 | | | PI-1 | 5.0 | A | 0.5 | Invention |
| 23 | SEP-143 | 10 | OXT-221 | 80 | | | PI-1 | 5.0 | A | 0.5 | Invention |
| 24 | SEP-150 | 10 | OXT-221 | 80 | | | PI-1 | 5.0 | B | 0.5 | Invention |
| 25 | SEP-155 | 10 | OXT-221 | 80 | | | PI-1 | 5.0 | B | 0.5 | Invention |
| 26 | SEP-155 | 20 | OXT-221 | 60 | EP-89 | 20 | PI-1 | 5.0 | A | 0.5 | Invention |
| 27 | SEP-142 | 20 | OXT-221 | 60 | EP-89 | 20 | PI-1 | 5.0 | A | 0.5 | Invention |
| 28 | SEP-159 | 20 | OXT-221 | 60 | EP-89 | 20 | PI-1 | 5.0 | B | 0.5 | Invention |
| 29 | SEP-162 | 20 | OXT-221 | 60 | EP-89 | 20 | PI-1 | 5.0 | B | 0.5 | Invention |
| 30 | SEP-167 | 20 | OXT-221 | 60 | EP-89 | 20 | PI-5 | 5.0 | B | 0.5 | Invention |
| Comp. 101 | | | OXT-221 | 70 | Celloxide 2021P | 30 | UVI-6992 | 5.0 | A | 0.5 | Comparison |
| Comp. 102 | | | OXT-221 | 80 | Celloxide 2021P | 20 | UVI-6992 | 5.0 | A | 0.5 | Comparison |
| Comp. 103 | | | OXT-221 | 80 | EP-89 | 20 | UVI-6992 | 5.0 | A | 0.5 | Comparison |
| Comp. 104 | | | OXT-221 | 70 | Vf7010 | 30 | UVI-6992 | 5.0 | A | 0.5 | Comparison |
| Comp. 105 | | | OXT-221 | 50 | Celloxide 3000 | 50 | UVI-6992 | 5.0 | A | 0.5 | Comparison |
| Comp. 106 | | | OXT-221 | 20 | Celloxide 3000 | 80 | UVI-6992 | 5.0 | A | 0.5 | Comparison |

*1: Addition amount (weight parts)

Compounds used for Example 1 are shown below.
Celloxid 2021P: produced by Daicel Chemical Industries Ltd.
Oxetane A: 2-(4-methoxy-phenyl)-3,3-dimethyl-oxetane
OXT-221: produced by Toagosei Co., Ltd.
OXT-212: produced by Toagosei Co., Ltd.
Vf7010: Vikoflex 7010 (produced by Atofina Corp.)
UVI-6992: produced by Dow Chemicals Co., Ltd., at a 50% solution of propione carbonate
SP-152: Adekaoptomer SP-152, produced by Asahi Denka Co., Ltd.
Basic compound A: N-ethyldiethanolamine
Basic compound B: triisopropanlamine

TABLE 3

| Sample No. | Pencil scratch value (pencil hardness) | Adhesion residual ratio (%) | Bending resistance φ: mm | Remarks |
|---|---|---|---|---|
| 1 | 3H | 85 | 3 mm φ | Inv. |
| 2 | 3H | 85 | 2 mm φ | Inv. |
| 3 | 2H | 80 | 1 mm φ | Inv. |
| 4 | 2H | 80 | *1 | Inv. |
| 5 | 2H | 75 | *1 | Inv. |
| 6 | 2H | 75 | *1 | Inv. |
| 7 | 3H | 85 | 3 mm φ | Inv. |
| 8 | 3H | 85 | 2 mm φ | Inv. |
| 9 | 2H | 80 | 1 mm φ | Inv. |
| 10 | 2H | 80 | *1 | Inv. |
| 11 | 2H | 75 | *1 | Inv. |
| 12 | 2H | 75 | *1 | Inv. |
| 13 | 3H | 85 | *1 | Inv. |
| 14 | 3H | 85 | *1 | Inv. |
| 15 | 3H | 85 | *1 | Inv. |
| 16 | 3H | 85 | *1 | Inv. |
| 17 | 2H | 80 | *1 | Inv. |
| 18 | 2H | 80 | *1 | Inv. |
| 19 | 2H | 80 | *1 | Inv. |
| 20 | 2H | 80 | *1 | Inv. |
| 21 | 3H | 80 | *1 | Inv. |
| 22 | 3H | 80 | *1 | Inv. |
| 23 | 2H | 80 | *1 | Inv. |
| 24 | 3H | 85 | *1 | Inv. |

TABLE 3-continued

| Sample No. | Pencil scratch value (pencil hardness) | Adhesion residual ratio (%) | Bending resistance φ: mm | Remarks |
|---|---|---|---|---|
| 25 | 3H | 85 | *1 | Inv. |
| 26 | 3H | 85 | *1 | Inv. |
| 27 | 3H | 85 | *1 | Inv. |
| 28 | 3H | 85 | *1 | Inv. |
| 29 | 2H | 80 | *1 | Inv. |
| 30 | 2H | 80 | *1 | Inv. |
| Comp. 101 | 2H | 85 | Cracks generated even at 10 mm φ | Comp. |
| Comp. 102 | 3H | 85 | Cracks generated even at 10 mm φ | Comp. |
| Comp. 103 | 3H | 85 | Cracks generated even at 10 mm φ | Comp. |
| Comp. 104 | HB | 40 | 3 mm φ | Comp. |
| Comp. 105 | 3H | 80 | Cracks generated even at 10 mm φ | Comp. |
| Comp. 106 | 2H | 80 | Cracks generated even at 10 mm φ | Comp. |

*1: No cracks even at 1 mm φ
Inv.: Invention
Comp.: Comparison

As is apparent from Table 3 samples of this invention exhibit little deterioration of layer hardness as well as improved adhesion and flexibility.

Example 2

Ink Composition

Dispersant (PB822, produced by Ajinomoto FineTechno Co., Ltd.) of 5 weight parts and each photopolymerization compound described in Table 3 were charged into a stainless steel beaker and dissolved by stirring for 1 hour, while heated on a 65° C. hot plate. Next, after 3 weight parts of each pigment was added into this solution, the solution was charged into a plastic bottle together with 200 g of 1 mm zirconia beads, sealed and subjected to a dispersion treatment using a paint shaker for 2 hours. Next, the zirconia beads were removed, and various types of additives such as each photopolymerization initiator, a basic compound and a surfactant were added in the combinations shown in Tables 4 and 5, after which the resulting solution was filtered through a 0.8 mm membrane filter to minimize printer clogging, resulting in preparation of an ink composition set.

Utilized pigments are as follows:

| | |
|---|---|
| K: | C. I. Pigment Black 7 |
| C: | C. I. Pigment Blue 15:3 |
| M: | C. I. Pigment Red 57:1 |
| Y: | C. I. Pigment Yellow 13 |
| W: | Titanium oxide (anatase type: at a particle diameter of 0.2 μm) |
| Lk: | C. I. Pigment Black 7 |
| Lc: | C. I. Pigment Blue 15:3 |
| Lm: | C. I. Pigment Red 57:1 |
| Ly: | C..I. Pigment Yellow 13 |

Inkjet Image Forming Method

Each curing composition ink prepared above was charged into an ink-jet recording apparatus, which was equipped with piezo-type ink-jet nozzles and comprised the structure of FIG. 1, after which the following image recording was continuously performed on various recording materials in the form of a long roll at a 600 mm width and a 20 m length. The ink supply system was structured of an ink tank, supply piping, a pre-chamber ink tank immediately before the head, piping equipped with a filter and a piezo head, and the portion from the pre-chamber ink tank to the head was insulated and heated at 50° C. Herein, the head portion was heated considering the viscosity of each curable composition ink, and said ink was continuously ejected from the head to eject multi-size dots at a liquid drop volume of 2-15 pl for a resolution of 720×720 dpi (dpi represents the number of dots per 1 linear inch, or per linear 2.54 cm). Further, the recording material was heated at 50° C. by a plane heater. After deposition, the ink was cured almost instantaneously (less than 0.5 second after deposition) by irradiation light source A: being a High Pressure Mercury Lamp VZero085 (manufactured by Integration Technology Corp.) or irradiation light source B: Metal Halide Lamp (MAL400NL, manufactured by Nippon Denchi Co., Ltd., at electrical consumption of 3 kW·hr and 120 W/cm). The total ink layer thickness was measured after image recording and found to be in the range of 2.3-13 μm. Herein, as for formation of ink-jet images, printing was performed according to the above-described method in the range of 30° C.·80% RH and 25° C.·20% RH.

Herein, the illuminance of each irradiation light source was measured as an integrated illuminance at 254 nm via UVPF-AI manufactured by Iwasaki Electric Co., Ltd.

Further, the detail of measuring and full spelling of each abbreviation of each recording material is as follows.

Synthetic Paper: Upo FGS, manufactured by Upo Corporation Co. Ltd.

PVC: Polyvinyl chloride

Measurement of Viscosity: Viscosity at 25° C. and shearing velocity of 1,000 l/s was measured.

Evaluation of Background Staining due to Mist

Background staining, due to mist adhering onto the non-image portions beside the solid color portions, was visually evaluated based on the following criteria.

A: Mist was barely noticeable, which was an excellent level.
B: Slight mist was noticeable, however, it was not at a problematic level.
C: Some mist was noticeable, and was a level which affected image quality.
D: Significant mist was generated, and was at an unacceptable level.

Evaluation of Ejection Capability

After ink was continuously ejected for 30 minutes, the state of ink deficiency was visually observed, and rated as follows.

A: No deficiency was noted, which is an excellent level.
B: Slight deficiency was noted, but was not a problem.
C: Some deficiency was noted, and which affected the image quality.
D: Significant deficiency was noted, which resulted in non-viable images.

Evaluation of Ink-jet Recorded Image

With respect to each image recorded via the image recording method described above, each of the following evaluations was performed. MS ming characters of 6 point size were printed for a targeted density, and roughness of the character was evaluated via a magnifying glass to judge the character quality based on the following criteria.

A: No roughness was observed.
B: Slight roughness was observed.

C: Some roughness was observed, characters are distinguishable, however, at a barely viable level.

D: Significant roughness was observed and characters are blurred, being at a non-viable level.

Color Contamination (Bleeding, Wrinkle)

Printing at 720 dpi was performed so that dots of each Y, M, C and K color were arranged adjacent to each other, after which adjacent dots were magnified via a loupe to visually observe the state of bleeding and wrinkling, resulting in evaluation of color contamination based on the following criteria.

A: The shape of adjacent dots was a true circle and no bleeding are observed.

B: The shape of adjacent dots was a nearly true circle and little bleeding is observed.

C: Adjacent dots exhibited some bleeding and the dot shape was slightly deformed, resulting in a barely viable level.

D: Adjacent dots exhibited bleeding and were mixed with each other, in addition wrinkling was observed at the overlapped portions, resulting in an unviable rating.

Evaluation of Hardness and Bending Resistance of Cured Layer

The physical properties of a cured layer, prepared by printing according to the ink-jet image forming method described above utilizing cyan ink in which cyan pigment is dispersed, were evaluated for the following tests.

1) Pencil Scratch Test: The hardness of each cured product was measured based on JIS K 5400.

2) Evaluation of Flexibility: A curable composition was ejected on synthetic paper (Upo FGS, produced by Upo Corporation) to result in a layer thickness of 30 μm, followed by irradiation of 800 mJ/cm² ultraviolet rays from a metal halide lamp within 1 second to prepare a cured layer. The obtained cured layers were evaluated based on the flexibility evaluation method of JIS K 5600, the results of which are shown in Tables 6 and 7.

TABLE 4

| Sample No. | Monofunctional epoxy compound Type | *1 | Oxetane compound Type | *1 | Polyfunctional epoxy compound Type | *1 | Photo-acid generator Type | *1 | Basic comp. (Add. amount 0.5 weight parts) Type | Surfactant (Add. amount 0.5 weight parts) Type | Compatibility promoting agent (Add. amount 0.5 weight parts) Type | Remark |
|---|---|---|---|---|---|---|---|---|---|---|---|---|
| 31 | SEP-2 | 10 | OXT-221 | 80 | | | UVI-6992 | 5.0 | A | F1405 | 145P | Inv. |
| 32 | SEP-9 | 10 | OXT-221 | 80 | | | UVI-6992 | 5.0 | A | F1405 | 145P | Inv. |
| 33 | SEP-12 | 10 | OXT-221 | 80 | | | UVI-6992 | 5.0 | A | F1405 | 145P | Inv. |
| 34 | SEP-13 | 10 | OXT-221 | 80 | | | UVI-6992 | 5.0 | A | F1405 | 145P | Inv. |
| 35 | SEP-18 | 10 | OXT-221 | 80 | | | UVI-6992 | 5.0 | A | F1405 | 145P | Inv. |
| 36 | SEP-19 | 10 | OXT-221 | 80 | | | UVI-6992 | 5.0 | A | F1405 | 145P | Inv. |
| 37 | SEP-46 | 10 | OXT-221 | 80 | | | SP-152 | 5.0 | B | F1405 | 145P | Inv. |
| 38 | SEP-53 | 10 | OXT-221 | 80 | | | SP-152 | 5.0 | B | F1405 | 145P | Inv. |
| 39 | SEP-56 | 10 | OXT-221 | 80 | | | PI-1 | 5.0 | A | F1405 | 145P | Inv. |
| 40 | SEP-57 | 10 | OXT-221 | 80 | | | PI-1 | 5.0 | A | F1405 | 145P | Inv. |
| 41 | SEP-62 | 10 | OXT-221 | 80 | | | PI-1 | 5.0 | A | F1405 | 145P | Inv. |
| 42 | SEP-63 | 10 | OXT-221 | 80 | | | PI-1 | 5.0 | A | F1405 | 145P | Inv. |
| 43 | SEP-12 | 20 | OXT-221 | 60 | Cx-2021P | 20 | PI-2 | 5.0 | A | F178K | R100 | Inv. |
| 44 | SEP-19 | 20 | OXT-221 | 60 | Cx-2021P | 20 | PI-2 | 5.0 | A | F178K | R100 | Inv. |
| 45 | SEP-56 | 20 | OXT-221 | 60 | EP-89 | 20 | PI-2 | 5.0 | B | F178K | R100 | Inv. |
| 46 | SEP-63 | 20 | OXT-221 | 60 | EP-89 | 20 | PI-2 | 5.0 | B | F178K | R100 | Inv. |
| 47 | SEP-12 | 20 | OXT-212 | 40 | Cx-2021P | 40 | PI-10 | 5.0 | B | F178K | R100 | Inv. |
| 48 | SEP-19 | 20 | OXT-212 | 40 | Cx-2021P | 40 | PI-10 | 5.0 | B | F178K | R100 | Inv. |
| 49 | SEP-56 | 20 | OXT-212 | 40 | EP-89 | 40 | PI-10 | 5.0 | B | F178K | R100 | Inv. |
| 50 | SEP-63 | 20 | OXT-212 | 40 | EP-89 | 40 | PI-10 | 5.0 | B | F178K | R100 | Inv. |

*1: Addition amount (weight parts)
Inv.: Invention

TABLE 5

| Sample No. | Monofunctional epoxy compound Type | *1 | Oxetane compound Type | *1 | Poly-functional epoxy compound Type | *1 | Photo-acid generator Type | *1 | Basic comp. (Add. Amount 0.5 weight parts) Type | Surfactant (Add. Amount 0.5 weight parts) Type | Compatability promoting agent (Add. Amount 0.5 weight parts) Type | Remark |
|---|---|---|---|---|---|---|---|---|---|---|---|---|
| 51 | SEP-134 | 10 | OXT-221 | 80 | | | | 5.0 | A | F1405 | 145P | Inv. |
| 52 | SEP-136 | 10 | OXT-221 | 80 | | | | 5.0 | A | F1405 | 145P | Inv. |
| 53 | SEP-143 | 10 | OXT-221 | 80 | | | | 5.0 | A | F1405 | 145P | Inv. |
| 54 | SEP-150 | 10 | OXT-221 | 80 | | | | 5.0 | B | F1405 | 145P | Inv. |
| 55 | SEP-155 | 10 | OXT-221 | 80 | | | | 5.0 | B | F1405 | 145P | Inv. |
| 56 | SEP-155 | 20 | OXT-221 | 60 | EP-89 | 20 | PI-1 | 5.0 | A | F178k | R100 | Inv. |
| 57 | SEP-142 | 20 | OXT-221 | 60 | EP-89 | 20 | PI-1 | 5.0 | A | F178k | R100 | Inv. |
| 58 | SEP-159 | 20 | OXT-221 | 60 | EP-89 | 20 | PI-1 | 5.0 | B | F178k | R100 | Inv. |
| 59 | SEP-162 | 20 | OXT-221 | 60 | EP-89 | 20 | PI-1 | 5.0 | B | F178k | R100 | Inv. |
| 60 | SEP-167 | 20 | OXT-221 | 60 | EP-89 | 20 | PI-5 | 5.0 | B | F178k | R100 | Inv. |

TABLE 5-continued

| Sample No. | Mono-functional epoxy compound Type | *1 | Oxetane compound Type | *1 | Poly-functional epoxy compound Type | *1 | Photo-acid generator Type | *1 | Basic comp. (Add. Amount 0.5 weight parts) Type | Surfactant (Add. Amount 0.5 weight parts) Type | Compatability promoting agent (Add. Amount 0.5 weight parts) Type | Remark |
|---|---|---|---|---|---|---|---|---|---|---|---|---|
| Comp. 111 | | | OXT-221 | 70 | Cx-2021P | 30 | UVI-6992 | 5.0 | A | F178K | R100 | Comp. |
| Comp. 112 | | | OXT-221 | 80 | Cx-2021P | 20 | UVI-6992 | 5.0 | A | F178K | R100 | Comp. |
| Comp. 113 | | | OXT-221 | 70 | EP-89 | 20 | UVI-6992 | 5.0 | A | F178K | R100 | Comp. |
| Comp. 114 | | | OXT-221 | 50 | Vf 7010 | 30 | UVI-6992 | 5.0 | A | F178K | R100 | Comp. |
| Comp. 115 | | | OXT-221 | 20 | Cx-3000 | 50 | UVI-6992 | 5.0 | A | F178K | R100 | Comp. |
| Comp. 116 | | | OXT-221 | 80 | Cx-3000 | 80 | UVI-6992 | 5.0 | A | F178K | R100 | Comp. |

Employed compounds for Example 2 are shown below.
F1405: Megafax F1405
145P: Haritac 145P (rosin modified maleic acid resin, produced by Harima Chemicals Co., Ltd.)
R100: Haritac R100 (rosin modified maleic acid resin, produced by Harima Chemicals Co., Ltd.)

TABLE 6

| Sample No. | 30° C.•80% RH | | | | 25° C.•20% RH | | | | Hardness of cured layer | Bending resistance φ: mm | Ink ejection capability | Staining by Mist | Remarks |
| | PVC | | Upo FGS | | PVC | | Upo FGS | | | | | | |
| | *1 | *2 | *1 | *2 | *1 | *2 | *1 | *2 | | | | | |
|---|---|---|---|---|---|---|---|---|---|---|---|---|---|
| 31 | A | B | A | B | A | B | A | B | 3H | 3 mm φ | A | A | Inv. |
| 32 | A | B | A | B | A | B | A | B | 2H | 2 mm φ | A | A | Inv. |
| 33 | A | B | B | B | A | B | A | B | 2H | 1 mm φ | A | A | Inv. |
| 34 | A | B | A | B | A | B | A | B | 2H | No cracks even at 1 mm φ | A | A | Inv. |
| 35 | A | B | B | B | A | B | A | B | 2H | No cracks even at 1 mm φ | A | A | Inv. |
| 36 | A | B | B | B | A | B | A | B | 2H | No cracks even at 1 mm φ | A | A | Inv. |
| 37 | A | B | A | B | A | B | A | B | 2H | 3 mm φ | A | A | Inv. |
| 38 | A | B | A | B | A | B | A | B | 2H | 2 mm φ | A | A | Inv. |
| 39 | A | B | B | B | A | B | A | B | 2H | 1 mm φ | A | A | Inv. |
| 40 | A | B | B | B | A | B | A | B | 2H | No cracks even at 1 mm φ | A | A | Inv. |
| 41 | A | B | B | B | A | B | A | B | 2H | No cracks even at 1 mm φ | A | A | Inv. |
| 42 | A | B | B | B | A | B | A | B | 2H | No cracks even at 1 mm φ | A | A | Inv. |
| 43 | A | A | A | B | A | A | A | A | 3H | 1 mm φ | B | B | Inv. |
| 44 | A | A | A | B | A | A | A | A | 3H | 1 mm φ | B | B | Inv. |
| 45 | A | A | A | B | A | A | A | A | 3H | 1 mm φ | B | B | Inv. |
| 46 | A | A | A | B | A | A | A | A | 3H | 1 mm φ | B | B | Inv. |
| 47 | B | B | B | B | A | B | A | B | 2H | No cracks even at 1 mm φ | A | A | Inv. |
| 48 | B | B | B | B | A | B | A | B | 2H | No cracks even at 1 mm φ | A | A | Inv. |
| 49 | B | B | B | B | A | B | A | B | 2H | No cracks even at 1 mm φ | A | A | Inv. |
| 50 | B | B | B | B | A | B | A | B | 2H | No cracks even at 1 mm φ | A | A | Inv. |

*1: Character
*2: Bleeding

TABLE 7

| Sample No. | 30° C.•80% RH | | | | 25° C.•20% RH | | | | Hardness of cured layer | Bending resistance φ: mm | Ink ejection capability | Staining by Mist | Remarks |
| | PVC | | Upo FGS | | PVC | | Upo FGS | | | | | | |
| | *1 | *2 | *1 | *2 | *1 | *2 | *1 | *2 | | | | | |
|---|---|---|---|---|---|---|---|---|---|---|---|---|---|
| 51 | A | B | B | B | A | B | A | B | 2H | No cracks even at 1 mm φ | A | A | Inv. |
| 52 | A | B | B | B | A | B | A | B | 2H | No cracks even at 1 mm φ | A | A | Inv. |
| 53 | A | B | B | B | A | B | A | B | 2H | No cracks even at 1 mm φ | A | A | Inv. |
| 54 | A | B | B | B | A | B | A | B | 2H | No cracks even at 1 mm φ | A | A | Inv. |
| 55 | A | A | A | B | A | A | A | A | 2H | No cracks even at 1 mm φ | A | A | Inv. |
| 56 | A | A | A | B | A | A | A | A | 3H | No cracks even at 1 mm φ | A | A | Inv. |
| 57 | A | A | A | B | A | A | A | A | 3H | No cracks even at 1 mm φ | B | B | Inv. |
| 58 | A | A | A | B | A | A | A | A | 3H | No cracks even at 1 mm φ | B | B | Inv. |
| 59 | A | A | A | B | A | A | A | A | 3H | No cracks even at 1 mm φ | B | B | Inv. |
| 60 | A | A | A | B | A | A | A | A | 3H | No cracks even at 1 mm φ | B | B | Inv. |

TABLE 7-continued

| Sample No. | 30° C.•80% RH | | | | 25° C.•20% RH | | | | Hardness of cured layer | Bending resistance φ: mm | Ink ejection capability | Staining by Mist | Remarks |
|---|---|---|---|---|---|---|---|---|---|---|---|---|---|
| | PVC | | Upo FGS | | PVC | | Upo FGS | | | | | | |
| | *1 | *2 | *1 | *2 | *1 | *2 | *1 | *2 | | | | | |
| Comp. 111 | A | B | A | B | A | B | A | B | 3H | Cracks generated even at 10 mm φ | B | C | Comp. |
| Comp. 112 | A | B | A | B | A | B | A | B | 2H | 8 mm φ | B | C | Comp. |
| Comp. 113 | A | B | A | B | A | B | A | B | 2H | Cracks generated even at 10 mm φ | C | D | Comp. |
| Comp. 114 | D | D | D | D | C | C | C | C | HB | 3 mm φ | B | C | Comp. |
| Comp. 115 | B | B | B | B | A | B | A | B | 3H | 8 mm φ | A | B | Comp. |
| Comp. 116 | B | B | B | B | A | B | A | B | 2H | Cracks generated even at 10 mm φ | A | B | Comp. |

*1: Character
*2: Bleeding

As is apparent from Tables 6 and 7, samples of this invention are excellent in ejection capability as well as improved in image quality. Samples of this invention exhibit an excellent curing capability regardless of differing conditions.

What is claimed is:

1. An active ray curable composition, comprising an epoxy compound represented by Formula (A-I) and an oxetane compound, the active ray curable composition exhibiting a viscosity of 1 to 500 mPa·s at 25° C.:

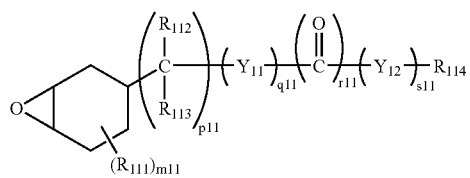

Formula (A-I)

wherein, $R_{111}$ is a substituent, $m_{11}$ is an integer of 0 to 3, $R_{112}$, $R_{113}$ and $R_{114}$ each are independently a hydrogen atom, a substituted or unsubstituted alkyl group, $Y_{11}$ and $Y_{12}$ each are independently O or S, $p_{11}$ is an integer of 0 to 2, $q_{11}$ is an integer of 0 or 1, $r_{11}$ is an integer of 0 or 1, and $s_{11}$ is an integer of 0 or 1.

2. The active ray curable composition of claim 1, wherein the oxetane compound is unsubstituted at the 2-position of an oxetane ring.

3. The active ray curable composition of claim 1, further comprising an epoxy compound represented by Formula (B)

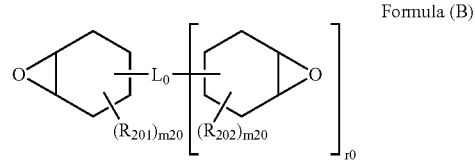

Formula (B)

wherein, $R_{201}$ and $R_{202}$ each are a substituent, and m20 and n20 each are an integer of 0 to 2, r0 is an integer of 1 to 3, and $L_0$ is a single bond or a linking group having 1 to 15 carbon atoms and a valency of r0+1, provided that the linking group may contain an oxygen atom or a sulfur atom in the main chain.

4. The active ray curable composition of claim 1, wherein the epoxy compound represented by Formula (A-I) is a compound represented by Formula (A-II):

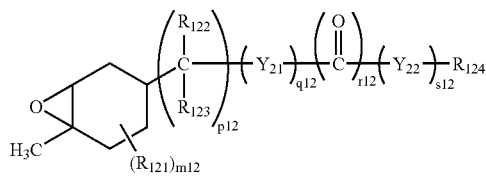

Formula (A-II)

wherein, $R_{121}$ is a substituent, m12 is an integer of 0 to 2, $R_{122}$, $R_{123}$ and $R_{124}$ each are independently a hydrogen atom or a substituted or unsubstituted alkyl group, Y and $Y_{22}$ each are independently O or S, p12 is an integer of 0 to 2, q12, r12 and s12 each are an integer of 0 or 1.

5. The active ray curable composition of claim 1, wherein the epoxy compound represented by Formula (A-I) is a compound represented by Formula (A-III), (A-IV) or (A-V):

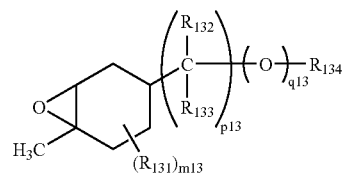

Formula (A-III)

wherein, $R_{131}$ is a substituent, m13 is an integer of 0 to 2, $R_{132}$, $R_{133}$ and $R_{134}$ each are independently a hydrogen atom, or a substituted or unsubstituted alkyl group, p13 is an integer of 0 to 2, and q13 is an integer of 0 or 1;

Formula (A-IV)

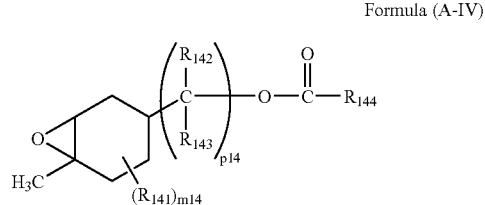

wherein, $R_{141}$ is a substituent, and m14 is an integer of 0 to 2, $R_{142}$, $R_{143}$ and $R_{144}$ each are independently a hydrogen atom, or a substituted or unsubstituted alkyl group, and p14 is an integer of 0 to 2; or Formula (A-V)

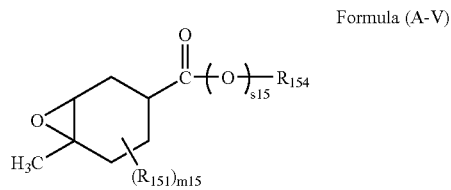

wherein, $R_{151}$ is a substituent, and m15 is an integer of 0 to 2, $R_{154}$ is a hydrogen atom, or a substituted or unsubstituted alkyl group, s15 is 0 or 1.

6. The active ray curable composition of claim 1, wherein the epoxy compound represented by Formula (A-I) is a compound represented by Formula (A-VI):

Formula (A-VI)

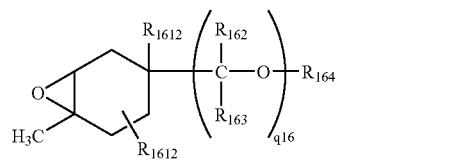

wherein, $R_{1611}$ and $R_{1612}$ each are independently a hydrogen atom or an alkyl group having 1 to 6 carbon atoms, $R_{162}$, $R_{163}$ and $R_{164}$ each are independently a hydrogen atom, or a substituted or unsubstituted alkyl group, and giG is an integer of 0 or 1.

7. The active ray curable composition of claim 3, wherein the epoxy compound represented by Formula (B) is a compound represented by Formula (B-I) or (B-II):

Formula (B-I)

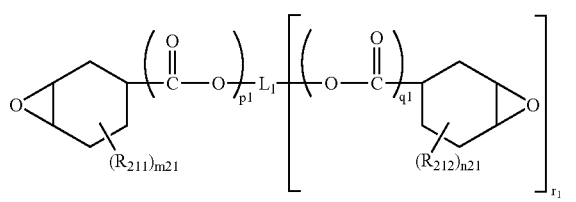

wherein, $R_{211}$ and $R_{212}$ each are a substituent, m21 and n21 each are an integer of 0 to 2, p21 and q21 each are an integer of 0 or 1, r1 is an integer of 1 to 3, $L_1$ is a single bond or a linking group having 1 to 15 carbon atoms and a valency of r1+1, provided that the linking group may contain an oxygen atom or a sulfur atom in the main chain; or Formula (B-II)

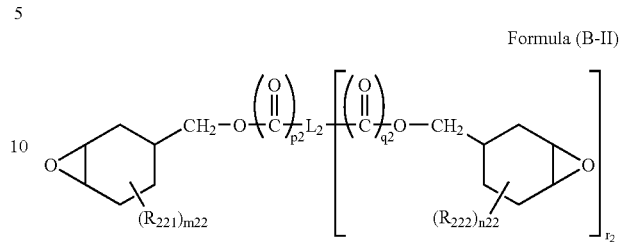

wherein, $R_{221}$ and $R_{222}$ each are a substituent, m22 and n22 each are an integer of 0 to 2, p22 and q22 each are an integer of 0 or 1, r2 is an integer of 1 to 3, and $L_2$ is a single bond or a linking group having 1 to 15 carbon atoms and a valency of r2+1, provided that the linking group may contain an oxygen atom or a sulfur atom in the main chain.

8. The active ray curable composition of claim 3, wherein the epoxy compound represented by Formula (B) is a compound represented by Formula (B-III) or (B-IV):

Formula (B-III)

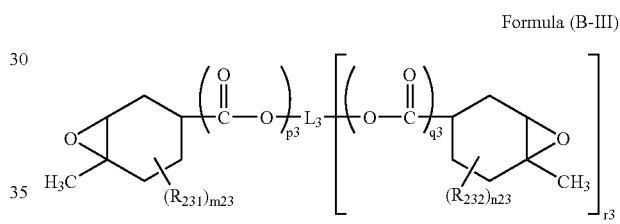

wherein, $R_{231}$ and $R_{232}$ each are a substituent, m23 and n23 each are an integer of 0 or 1, p23 and q23 each are an integer of 0 or 1, r3 is an integer of 1 to 3, and $L_3$ is a single bond or a linking group having 1 to 15 carbon atoms and a valency of r3+1, provided that the linking group may contain an oxygen atom or a sulfur atom in the main chain; or Formula (B-IV)

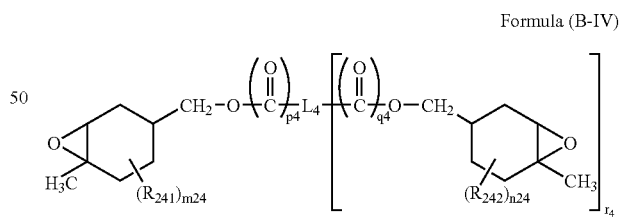

wherein, $R_{241}$ and $R_{242}$ each are a substituent, m24 and n24 each are an integer of 0 or 1, p24 and q24 each are an integer of 0 or 1, r4 is an integer of 1 to 3, and $L_4$ is a single bond or a linking group having 1 to 15 carbon atoms and a valency of r4+1, provided that the linking group may contain an oxygen atom or a sulfur atom in the main chain.

9. The active ray curable composition of claim 2, wherein the oxetane compound which is provided with no substituents at the 2-position of an oxetane ring is a poly-functional oxetane compound provided with at least two oxetane rings.

10. The active ray curable composition of claim 1, wherein the active ray curable composition comprises a compound which generates an acid by irradiation of active rays.

11. The active ray curable composition of claim 10, wherein the compound which generates an acid by irradiation of active rays is an onium salt compound.

12. The active ray curable composition of claim 10, wherein the compound which generates an acid by irradiation of active rays is a sulfonium salt compound.

13. The active ray curable composition of claim 12, wherein the sulfonium compound is a sulfonium salt compound represented by Formula (I-1), (I-2) or (I-3):

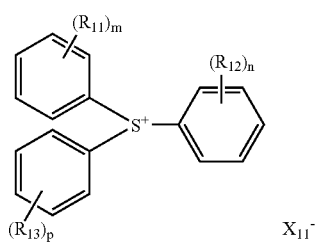

Formula (I-1)

wherein, $R_{11}$, $R_{12}$ and $R_{13}$ each are a substituent, m, n and p each are an integer of 0 to 2, and $X_{11}$— is a counter ion;

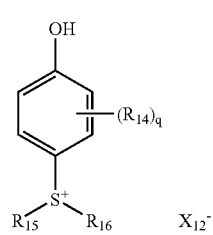

Formula (I-2)

wherein, $R_{14}$ is a substituent, g is an integer of 0 to 2, $R_{15}$ and $R_{16}$ each are a substituted or unsubstituted alkyl group, a substituted or unsubstituted alkenyl group, a substituted or unsubstituted alkinyl group, or a substituted or unsubstituted aryl group, and $X_{12}$— is a counter ion; or

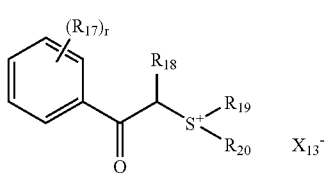

Formula (I-3)

wherein, $R_{17}$ is a substituent, r is an integer of 0 to 3, $R_{18}$ is a hydrogen atom, or a substituted or unsubstituted alkyl group, $R_{19}$ and $R_{19}$ each are a substituted or unsubstituted alkyl group, a substituted or unsubstituted alkenyl group, a substituted or unsubstituted alkinyl group or a substituted or unsubstituted aryl group, and $X_{13}$— is a counter ion.

14. An active ray curable ink comprising the active ray curable composition of claim 1.

15. The active ray curable ink of claim 14, having a viscosity of 7 to 40 mPa·s at 25° C.

16. The active ray curable ink of claim 14, further comprising a pigment.

17. The method of forming an image, comprising the steps of:
   ejecting the active ray curable ink of claim 14 from an inkjet recording head onto a recording material; and
   irradiating the ejected droplets of the ink with active rays,
   wherein a minimum ink droplet volume ejected from each nozzle of the inkjet recording head is 2 to 15 pl.

18. An inkjet recording apparatus which is employed for the method of forming an image of claim 17, wherein ink is ejected after the active ray curable ink and the recording head have been heated within the range of 35 to 100° C.

19. The inkjet recording apparatus which is employed for the method of forming an image of claim 17, wherein the ink is ejected onto the recording material which is heated within the range of 35 to 60° C.

20. An active ray curable composition, comprising an epoxy compound represented by Formula (A) and an oxetane compound,
   the active ray curable composition exhibiting a viscosity of 1 to 500 mPa·s at 250° C.:

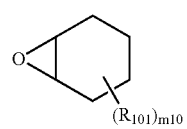

Formula (A)

wherein, $R_{101}$ is a substituent containing no polymerizing groups with a cation or a radical, and m10 is an integer of 1 to 4;

wherein the oxetane compound is unsubstituted at the 2-position of an oxetane ring; and wherein the oxetane compound which is provided with no substituents at the 2-position of an oxetane ring is a poly-functional oxetane compound provided with at least two oxetane rings.

* * * * *